(12) United States Patent
Williams et al.

(10) Patent No.: US 10,696,797 B2
(45) Date of Patent: Jun. 30, 2020

(54) METHOD AND CATALYST SYSTEM FOR PREPARING POLYMERS AND BLOCK COPOLYMERS

(71) Applicant: IP2IPO Innovations Limited, London (GB)

(72) Inventors: Charlotte Katherine Williams, London (GB); Charles Romain, London (GB); Michael Kember, London (GB)

(73) Assignee: IP2IPO Innovations Limited, London (GB)

( * ) Notice: Subject to any disclaimer, the term of this patent is extended or adjusted under 35 U.S.C. 154(b) by 13 days.

(21) Appl. No.: 16/019,246

(22) Filed: Jun. 26, 2018

(65) Prior Publication Data
US 2018/0305501 A1 Oct. 25, 2018

Related U.S. Application Data

(62) Division of application No. 14/891,148, filed as application No. PCT/GB2014/051511 on May 16, 2014, now Pat. No. 10,030,106.

(30) Foreign Application Priority Data
May 17, 2013 (GB) .................... 1308978.4

(51) Int. Cl.
| C08G 81/00 | (2006.01) |
| C08G 63/08 | (2006.01) |
| C08G 63/42 | (2006.01) |
| C08G 63/82 | (2006.01) |
| C08G 63/64 | (2006.01) |
| C08G 63/83 | (2006.01) |

(52) U.S. Cl.
CPC ............ *C08G 81/00* (2013.01); *C08G 63/08* (2013.01); *C08G 63/42* (2013.01); *C08G 63/64* (2013.01); *C08G 63/82* (2013.01); *C08G 63/823* (2013.01); *C08G 63/83* (2013.01)

(58) Field of Classification Search
CPC ...... C08G 81/00; C08G 63/83; C08G 63/823; C08G 63/08; C08G 63/64; C08G 63/42; C08G 63/82
See application file for complete search history.

(56) References Cited

U.S. PATENT DOCUMENTS

| 4,565,845 | A | 4/1986 | Inoue et al. |
| 4,665,134 | A | 5/1987 | Inoue et al. |
| 9,006,347 | B2 | 4/2015 | Williams et al. |
| 9,453,104 | B2 | 9/2016 | Williams et al. |
| 9,994,675 | B2 | 6/2018 | Williams et al. |
| 10,030,102 | B2 | 7/2018 | Keyworth et al. |
| 10,308,762 | B2 | 6/2019 | Williams et al. |
| 2006/0223973 | A1 | 10/2006 | Hinz et al. |
| 2011/0118435 | A1 | 5/2011 | Williams et al. |
| 2012/0136134 | A1 | 5/2012 | Van Der Meulen et al. |
| 2012/0172566 | A1 | 7/2012 | Zhang et al. |
| 2012/0232245 | A1 | 9/2012 | Jeong et al. |
| 2013/0072602 | A1 | 3/2013 | Gürtler et al. |
| 2013/0172524 | A1 | 7/2013 | Farmer |
| 2014/0249279 | A1 | 9/2014 | Williams et al. |
| 2015/0051370 | A1 | 2/2015 | Williams et al. |
| 2016/0108181 | A1 | 4/2016 | Williams et al. |
| 2016/0347906 | A1 | 12/2016 | Williams et al. |
| 2017/0210848 | A1 | 7/2017 | Chapman et al. |
| 2017/0247508 | A1 | 8/2017 | Williams et al. |
| 2018/0148539 | A1 | 5/2018 | Kember et al. |
| 2018/0305501 | A1 | 10/2018 | Williams et al. |
| 2019/0010277 | A1 | 1/2019 | Williams et al. |

FOREIGN PATENT DOCUMENTS

| JP | S6164721 A | 4/1986 |
| KR | 20140042167 A | 4/2014 |
| WO | WO 2008/128548 A2 | 10/2008 |
| WO | WO 2009/130470 A2 | 10/2009 |
| WO | WO 2009/137540 A1 | 11/2009 |
| WO | WO 2010/028362 A1 | 3/2010 |
| WO | WO 2010/110460 A1 | 9/2010 |
| WO | WO 2012/037282 A2 | 3/2012 |
| WO | WO 2013/034750 A2 | 3/2013 |
| WO | WO 2013/130811 A1 | 9/2013 |
| WO | WO 2014/184578 A2 | 11/2014 |
| WO | WO 2016/012785 A1 | 1/2016 |

OTHER PUBLICATIONS

U.S. Appl. No. 12/989,537, filed Jan. 7, 2011, Williams et al.
U.S. Appl. No. 14/526,017, filed Oct. 28, 2014, Williams et al.
U.S. Appl. No. 15/482,448, filed Apr. 7, 2017, Williams et al.
U.S. Appl. No. 14/201,299, filed Mar. 7, 2014, Williams et al.
U.S. Appl. No. 14/891,148, filed Nov. 13, 2015, Williams et al.
U.S. Appl. No. 15/116,678, filed Aug. 4, 2016, Williams et al.
U.S. Appl. No. 15/809,801, filed Nov. 10, 2017, Kember et al.
U.S. Appl. No. 15/752,506, filed Feb. 13, 2018, Williams et al.
GB 1308978.4, Nov. 14, 2013, Great Britain Search Report.
GB 14021091, Aug. 1, 2014, Great Britain Search Report.
PCT/EP2012/067588, Mar. 14, 2013, International Search Report and Written Opinion.
PCT/EP2012/067588, Mar. 20, 2014, International Preliminary Report on Patentability.
PCT/GB2014/051511, Jan. 20, 2015, International Search Report and Written Opinion.
PCT/GB2014/051511, Nov. 26, 2015, International Preliminary Report on Patentability.
PCT/EP2015/052496, Apr. 7, 2015, International Search Report and Written Opinion.
PCT/EP2015/052496, Aug. 18, 2016, International Preliminary Report on Patentability.
PCT/GB2009/001043, Jul. 7, 2009, International Search Report and Written Opinion.

(Continued)

*Primary Examiner* — Robert S Jones
(74) *Attorney, Agent, or Firm* — Wolf, Greenfield & Sacks, P.C.

(57) ABSTRACT

The present invention provides methods for producing block copolymers, either by the sequential addition of monomers, or using a "one-pot" method. The invention also relates to novel methods for producing polyesters by ring opening lactides and/or lactones and by copolymerising anhydrides and epoxides.

20 Claims, 18 Drawing Sheets

(56) References Cited

OTHER PUBLICATIONS

PCT/GB2009/001043, Nov. 4, 2010, International Preliminary Report on Patentability.
PCT/GB2016/052676, Nov. 17, 2016, International Search Report and Written Opinion.
Great Britain Search Report for GB 1308978.4, dated Nov. 14, 2013.
Great Britain Search Report for GB 1402109.1, dated Aug. 1, 2014.
International Preliminary Report on Patentability for PCT/EP2012/067588, dated Mar. 20, 2014.
International Preliminary Report on Patentability for PCT/EP2015/052496, dated Aug. 18, 2016.
International Preliminary Report on Patentability for PCT/GB2009/001043, dated Nov. 4, 2010.
International Preliminary Report on Patentability for PCT/GB2014/051511, dated Nov. 26, 2015.
International Search Report and Written Opinion for PCT/EP2012/067588, dated Mar. 14, 2013.
International Search Report and Written Opinion for PCT/EP2015/052496, dated Apr. 7, 2015.
International Search Report and Written Opinion for PCT/GB2009/001043, dated Jul. 7, 2009.
International Search Report and Written Opinion for PCT/GB2014/051511, dated Jan. 20, 2015.
Aida et al.., Catalytic reaction on both sides of a metalloporphyrin plane. Alternating copolymerization of phthalic anhydride and epoxypropane with an aluminum porphyrin-quaternary salt system. J Am Chem Soc. 1985;107(5):1358-1364.
Aida et al.., Well-controlled polymerization by metalloporphyrin. Synthesis of copolymer with alternating sequence and regulated molecular weight from cyclic acid anhydride and epoxide catalyzed by the system of aluminum porphyrin coupled with quaternary organic salt. Macromolecules. 1985;18:1049.
Allen et al.., High-activity, single-site catalysts for the alternating copolymerization of CO2 and propylene oxide. J Am Chem Soc. Dec. 4, 2002;124(48):14284-5.
Asato et al.., Polynuclear zinc (II) complexes of phenol-imine and—amine macrocycles. J. Chem. Soc. Dalton Trans. 1995; 3897-3904.
Black et al.., Compartmental Schiff-base ligands as selective double-loaded extractants for copper(II). Chem Commun (Camb). Feb. 21, 2002;(4):340-1.
Bok et al.., Bimetallic fluorine-substituted anilido-aldimine zinc complexes for CO2/(cyclohexene oxide) copolymerization. Inorg Chem. May 15, 2006;45(10):4228-37.
Bradley et al.., Homometallic Alkoxides. Alkoxo and Aryloxo Derivatives of Metals. Elsevier. 2001; 1:105-109.
Buchard et al.., A bimetallic iron(III) catalyst for CO2/epoxide coupling. Chem Commun (Camb). Jan. 7, 2011;47(1):212-4. doi: 10.1039/c0cc02205e. Epub Sep. 27, 2010.
Chamberlain et al.., Polymerization of lactide with zinc and magnesium beta-diiminate complexes: stereocontrol and mechanism. J Am Chem Soc. Apr. 11, 2001;123(14):3229-38.
Cheng et al.., Catalytic Reactions Involving C1 Feedstocks: New High-Activity Zn(II)-Based Catalysts for the Alternating Copolymerization of Carbon Dioxide and Epoxides. J Am Chem Soc. 1998;120:11018-19.
Cheng et al.., Single-site beta-diiminate zinc catalysts for the alternating copolymerization of CO2 and epoxides: catalyst synthesis and unprecedented polymerization activity. J Am Chem Soc. Sep. 12, 2001;123(36):8738-49.
Coates et al.., Discrete Metal-Based Catalyst for the Copolymerization of CO2 and Epoxides: Discovery, Reactivity, Optimization, and Mechanism. Angew Chem Int Ed. 2004;43:6618-39.
Cyriac et al.., Immortal CO2/Propylene Oxide Copolymerization: Precise Control of Molecular Weight and Architecture of Various Block Copolymers. Macromolecules. 2010;43(18):7398-401.
Darensbourg et al.., Bis 2,6-difluorophenoxide Dimeric Complexes of Zinc and Cadmium and Their Phosphine Adducts :Lessons Learned Relative to Carbon Dioxide/Cyclohexene Oxide Alternating Copolymerization Processes by Zinc Phenoxides. J Am Chem Soc. 2000;122:12487-96.
Darensbourg et al.., Catalytic Activity of a Series of Zn(II) Phenoxides for the Copolymerization of Epoxides and Carbon Dioxides. J Am Chem Soc. 1999;121:107-16.
Darensbourg et al.., Kinetic Studies of the Alternating Copolymerization of Cyclic Acid Anhydrides and Epoxides, and the Terpolymerization of Cyclic Acid Anhydrides, Epoxides, and CO2 Catalyzed by (salen)CrIIIC1. Macromolecules. 2012;45(5):2242-48.
Darensbourg et al.., Mechanistic aspects of the copolymerization reaction of carbon dioxide and epoxides, using a chiral salen chromium chloride catalyst. J Am Chem Soc. Jun. 5, 2002;124(22):6335-42.
Darensbourg et al.., Solution and solid-state structures of phosphine adducts of monomeric zinc bisphenoxide complexes. Importance of these derivatives in CO2/epoxide copolymerization processes. Inorg Chem. Apr. 3, 2000;39(7):1578-85.
Darensbourg, Making plastics from carbon dioxide: salen metal complexes as catalysts for the production of polycarbonates from epoxides and CO2. Chem Rev. Jun. 2007;107(6):2388-410. Epub Apr. 21, 2007.
Das et al.., Iso- and mixed-valent phenoxy bridged binuclear macrocyclic complexes of cobalt, iron and manganese. Polyhedron. 1994;13(38):2639-45.
Diciccio et al.., Ring-Opening Copolymerization of Maleic Anhydride with Epoxides: A Chain-Growth Approach to Unsaturated Polyesters. J Am Chem Soc. 2011;133:10724-27.
Dutta et al.., Efficient proton-templated synthesis of 18- to 38-membered tetraimino(amino)diphenol macrocyclic ligands: structural features and spectroscopic properties. J Org Chem. Aug. 6, 2004;69(16):5419-27.
Dutta et al.., Model Compounds for Iron Proteins. Structures and Magnetic, Spectroscopic, and Redox Properties of Fe(III)M(II) and [Co(III)Fe(III)](2)O Complexes with (&mgr;-Carboxylato)bis(-phenoxo)dimetalate and (&mgr;-Oxo)diiron(III) Cores. Inorg Chem. Apr. 10, 1996;35(8):2292-2300.
Eberhardt et al.., The Ethylsulfinate Ligand: A Highly Efficient Initiating Group for the Zinc β-Diiminate Catalyzed Copolymerization of CO2 and Epoxides. Organometallics. 2003;22:211-14.
Hosseini et al.., Alternating Ring-Opening Polymerization of Cyclohexene Oxide and Anhydrides: Effect of Catalyst, Cocatalyst, and Anhydride Structure. Macromolecules. 2012;45(4):1770-76.
Hosseini et al.., Interaction energy and polymer density profile in nanocomposites: a coarse grain simulation based on interaction stress. Polym Chem. 2012;3:1158-67.
Hosseini et al.., Semi-aromatic polyesters by alternating ring-opening copolymerization of styrene oxide and anhydrides. Polym Chem. Jan. 2012; 3:1308-1313.
Inoue et al.., Copolymerization of carbon dioxide and epoxide. Polymer Letts. 1969;7:287-92.
Inoue et al.., Immortal polymerization: the outset, development, and application. J Polym. Sci.Part A Polym. Chem. 2000;38:2861-71.
Jeske et al.., Alternating copolymerization of epoxides and cyclic anhydrides: an improved route to aliphatic polyesters. J Am Chem Soc. Sep. 19, 2007;129(37):11330-1. Epub Aug. 28, 2007.
Jutz et al.., Mechanistic Investigation and Reaction Kinetics of the Low-Pressure Copolymerization of Cyclohexene Oxide and Carbon Dioxide Catalyzed by a Dizinc Complex. J Am Chem Soc. 2011;133(43):17395-17405.
Kember et al.., Triblock copolymers from lactide and telechelic poly(cyclohexene carbonate) Polym. Chem., Mar. 2, 2012;3:1196-1201 Supporting Information S1-9.
Kember et al.., Di- and tri-zinc catalysts for the low-pressure copolymerization of CO2 and cyclohexene oxide. Inorg Chem. Oct. 5, 2009;48(19):9535-42. doi: 10.1021/ic901109e.
Kember et al.., Di-cobalt(II) catalysts for the copolymerisation of CO2 and cyclohexene oxide: support for a dinuclear mechanism? Chem Sci. 2012;3:1245-55.

(56) References Cited

OTHER PUBLICATIONS

Kember et al.., Efficient Magnesium Catalysts for the Copolymerization of Epoxides and CO2; Using Water to Synthesize Polycarbonate Polyols. J Am Chem Soc. 2012;134(38):15676-15679.
Kember et al.., Highly active di- and trimetallic cobalt catalysts for the copolymerization of CHO and CO2 at atmospheric pressure. Macromolecules. 2010; 43(5):2291-98. doi: 10.1021/ma902582m.
Kember et al.., Highly active dizinc catalyst for the copolymerization of carbon dioxide and cyclohexene oxide at one atmosphere pressure. Angew Chem Int Ed Engl. 2009;48(5):931-3.
Kember et al.., Triblock copolymers from lactide and telechelic poly(cyclohexene carbonate). Polym Chem. 2012;3:1196-1201.
Kim et al.., Biodegradable Polycarbonate Synthesis by Copolymerization of Carbon Dioxide with Epoxides Using a Heterogeneous Zinc Complex. Macromol. Symp., 2005;224: 181-192. doi:10.1002/masy.200550616.
Knight et al.., Dinuclear zinc complexes using pentadentate phenolate ligands. Inorg Chem. Dec. 15, 2008;47(24):11711-9.
Koning et al.., Synthesis and physical characterization of poly(cyclohexane carbonate), synthesized from CO2 and cyclohexene oxide. Polymer. 2001;42:3995-4004.
Lee et al.., Bimetallic anilido-aldimine zinc complexes for epoxide/CO2 copolymerization. J Am Chem Soc. Mar. 9, 2005;127(9):3031-7.
Lu et al.., Design of highly active binary catalyst systems for CO2/epoxide copolymerization: polymer selectivity, enantioselectivity, and stereochemistry control. J Am Chem Soc. Feb. 8, 2006;128(5):1664-74.
Moore et al.., Mechanism of the alternating copolymerization of epoxides and CO2 using beta-diiminate zinc catalysts: evidence for a bimetallic epoxide enchainment. J Am Chem Soc. Oct. 1, 2003;125(39):11911-24.
Nozaki et al.., Asymmetric catalytic synthesis of polyketones and polycarbonates. Pure Appl Chem. 2004;76(3):541-46.
Paddock et al.., Chemical Co(2) fixation: Cr(III) salen complexes as highly efficient catalysts for the coupling of Co(2) and epoxides. J Am Chem Soc. Nov. 21, 2001;123(46):11498-9.
Pilz et al.., Dinuclear Zinc Complexes Based on Parallel β-Diiminato Binding Sites: Syntheses, Structures, and Properties as CO2/Epoxide Copolymerization Catalysts. Organometallics. 2007;26:3668-76.
Qin et al.., Cobalt-Based Complexes for the Copolymerization of Propylene Oxide and CO2; Active and Selective Catalysts for Polycarbonate Synthesis. Angew Chem Int Ed. 2003;42:5484-87.
Ren et al.., Highly Active, Bifunctional Co(III)-Salen Catalyst for Alternating Copolymerization of CO2 with Cyclohexene Oxide and Terpolymerization with Aliphatic Epoxides. Macromolecules. 2010;43(3):1396-1402.
Robert et al.., Tandem synthesis of alternating polyesters from renewable resources. Nature Comm. 2011;2:586.
Rokicki et al.., The Application of Carbon Dioxide as a Direct Material for Polymer Syntheses in Polymerization and Polycondensation Reactions. J Macromol Sci Rev Macomol Chem Phys 1981;C21(1):135-86.
Saini et al.., Dinuclear metal catalysts: improved performance of heterodinuclear mixed catalysts for CO2-epoxide copolymerization. Chem Commun. 2014;50:4164-67.
Sugimoto et al.., Alternating copolymerization of carbon dioxide and epoxide by dinuclear zinc Schiff base complex. Reactive and Functional Polymers. Nov. 2007; 67(11):1277-83.
Sugimoto et al.., Alternating Copolymerization of Carbon Dioxide and Epoxide by Manganese Porphyrin: The First Example of Polycarbonate Synthesis from 1-atm Carbon Dioxide. J Polym Sci Polym Chem. 2003;41:3549-55.
Sugimoto et al.., Copolymerization of Carbon Dioxide and Epoxide. J Polym Sci Polym Chem. 2004;42:5561-73.
Sugimoto et al.., The Cobalt Porphyrin-Lewis Base System: A Highly Selective Catalyst for Alternating Copolymerization of CO2 and Epoxide under Mild Condition. Macromolecules. 2008;41:312-17.
Van Meerendonk et al.., High-Throughput Automated Parallel Evaluation of Zinc-Based Catalysts for the Copolymerization of CHO and CO2 to Polycarbonates. Macromol Rapid Commun. 2004;25:382-86.
Van Meerendonk et al.., Unexpected Side Reactions and Chain Transfer for Zinc-Catalyzed Copolymerization of Cyclohexene Oxide and Carbon Dioxide. Macromolecules. 2005;38:7306-13.
Williams et al.., A highly active zinc catalyst for the controlled polymerization of lactide. J Am Chem Soc. Sep. 17, 2003;125(37):11350-9.
Williams et al.., Metalloenzyme inspired dizinc catalyst for the polymerization of lactide. Chem Commun (Camb). Sep. 21, 2002;(18):2132-3.
Wu et al.., Tandem metal-coordination copolymerization and organocatalytic ring-opening polymerization via water to synthesize diblock copolymers of styrene oxide/CO2 and lactide. J Am Chem Soc. Oct. 24, 2012;134(42):17739-45. doi: 10.1021/ja307976c. Epub Oct. 9, 2012.
Xiao et al.., Intramolecularly Dinuclear Magnesium Complex Catalyzed Copolymerization of Cyclohexene Oxide with CO2 under Ambient CO2 Pressure: Kinetics and Mechanism. Macromolecules. 2006;39:128-37.
Xiao et al.., Copolymerization of cyclohexene oxide with CO2 by using intramolecular dinuclear zinc catalysts. Chemistry. Jun. 6, 2005;11(12):3668-78.
Kroger et al., Alternating Copolymerization of Carbon Dioxide and Cyclohexene Oxide and Their Terpolymerization with Lactide Catalyzed by Zinc Complexes of N,N Ligands. Adv. Synth Catal. Sep. 2006 248(14):1908-1918.
Langanke et al., Carbon dioxide (CO2) as sustainable feedstock for polyurethane production. Green Chem., 2014;16:1865-1870.
Olsen et al., ϵ-Decalactone: a thermoresilient and toughening comonomer to poly(L-lactide). Biomacromolecules. Aug. 12, 2013;14(8):2883-90. doi: 10.1021/bm400733e. Epub Jul. 11, 2013.

METHOD AND CATALYST SYSTEM FOR PREPARING POLYMERS AND BLOCK COPOLYMERS

This application is a divisional of and claims priority under 35 U.S.C. § 120 to U.S. Application, U.S. Ser. No. 14/891,148, filed Nov. 13, 2015; which is a national stage filing under 35 U.S.C. § 371 of international PCT application, PCT/GB2014/051511, filed May 16, 2014, which claims priority under 35 U.S.C. § 119(a) to United Kingdom application number 1308978.4, filed May 17, 2013, each of which is incorporated herein by reference.

FIELD OF THE INVENTION

The present invention relates to methods for producing block copolymers, either by the sequential addition of monomers, or using a "one-pot" method. In particular, the chemistry of the catalyst active site allows selective polymerisation of particular monomers and control of block sequence in the production of block copolymers comprising polycarbonate blocks and polyester blocks, using a single catalytic system. It is possible to switch between the formation of a polyester and a polycarbonate by controlling the growing polymer chain end and by selecting the identity and amount of the monomers used. The methods described allow the product of the preparation of di-block copolymers, as well as more complex block sequences, including ABA and ABC type block copolymers. The invention also relates to novel methods for producing polyesters by ring opening lactides and/or lactones and by copolymerising anhydrides and epoxides.

BACKGROUND

Block copolymers are polymers having two or more distinct polymeric units, or "blocks". Such polymers are useful in a variety of different applications, and it is particularly preferred to be able to produce block copolymers having polyester and polycarbonate blocks.

Block copolymers can be produced in a variety of different ways. For example, the individual blocks may be prepared separately, and then joined together. Alternatively, a first block, comprising an initiating moiety (also known as a "macroinitiator") can be added to a mixture of one or monomers, and the second block is grown from the end of the pre-formed block. However, such methods require the formation and purification of the first blocks prior to the formation of a second block, and generally involve the use of different catalytic systems to produce each block. These methods can therefore be costly and difficult to use.

The inventors have surprisingly found that it is possible to produce block copolymers comprising two or more blocks, using a single catalytic system, either by the subsequent addition of monomer, or by a "one-pot" method in which all of the monomers are present in the reaction mixture at the start of the reaction.

SUMMARY OF THE INVENTION

In a first aspect, the present invention provides a method for preparing a block copolymer, using a single catalytic system, wherein the single catalytic system comprises a catalyst of formula (I):

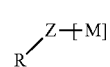

(I)

Wherein:
[M] is a metal complex having at least one metal atom M coordinated by a ligand system;
M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-, each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;
X is C or S
R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate;
the method comprising the steps of:
a) forming a first block by polymerising a first monomer or combination of monomers selected from the groups (i) to (iii):
Group (i): a lactide and/or a lactone,
Group (ii): an epoxide and an anhydride, or
Group (iii): an epoxide and carbon dioxide,
b) optionally contacting the catalyst of formula (I) with a compound [Y] which is capable converting the group —Z—R, wherein Z is absent or a group selected from -E-X(E)- or -E-X(E)E-, to a group —Z—R wherein Z is -E-;
c) forming a second block by polymerising a second monomer or combination of monomers selected from a different group (i) to (iii) to that selected for the first monomer or combination of monomers:
Group (i): a lactide and/or a lactone,
Group (ii): an epoxide and an anhydride, or
Group (iii): an epoxide and carbon dioxide,
wherein when the first monomer or combination of monomers is Group (i), Z is -E-; and
wherein when the first monomer or combination of monomers is Group (ii) or Group (iii),
and the second monomer or combination of monomers is Group (i), step b) is performed after step a).

In a second aspect, the present invention provides a method for producing a block copolymer, said block copolymer having a first and second block, using a single catalytic system, wherein the single catalytic system comprises a catalyst of formula (I):

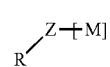

(I)

Wherein:
[M] is a metal complex having at least one metal atom M coordinated by a ligand system;
M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-, each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;

X is C or S

R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may also be selected from halide, phosphinate, azide and nitrate;

the method comprising the steps of:
a) providing a mixture comprising:
  I. an epoxide;
  II. a first monomer or combination of monomers selected from a group (i) to (iii):
    Monomer (i): a lactide and/or a lactone,
    Monomer (ii): an anhydride, or
    Monomer (iii): carbon dioxide, and
  III. a second monomer or combination of monomers selected from a different group (i) to (iii) to that selected for the first monomer or combination of monomers:
    Monomer (i): a lactide and/or a lactone,
    Monomer (ii): an anhydride, or
    Monomer (iii): carbon dioxide; and
b) contacting the mixture with the single catalytic system;

wherein the rate of insertion of the first monomer or combination of monomers into the bond between the metal complex [M] and the ligand —Z—R is faster than the rate of insertion of the second monomer or combination of monomers into the bond between the metal complex [M] and the ligand —Z—R;

wherein when the first monomer or combination of monomers is Group (i), either —Z—R is -E-R, or the mixture comprises a compound [Y]; and wherein when the second monomer or combination of monomers is Group (i), the mixture comprises a compound [Y].

In a third aspect, the present invention provides a method for producing a polyester, comprising contacting a lactone and/or a lactide with a catalyst system having a catalyst of formula (IA):

(IA)

[chemical structure]

wherein
$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;

$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;

$R_4$ is H, or optionally substituted aliphatic, heteroaliphatic, alicyclic, heteroalicyclic, aryl, heteroaryl, alkylheteroaryl or alkylaryl;

$R_5$ is H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

R is hydrogen, or optionally substituted aliphatic, heteroaliphatic, alicyclic, heteroalicyclic, aryl, heteroaryl, alkylheteroaryl silyl, or a polymer;

Z is -E-;

E is —O—, —S—, or $NR^Z$, wherein is H, or optionally substituted aliphatic, heteroaliphatic, alicyclic, heteroalicyclic, aryl, heteroaryl, alkylaryl or alkylheteroaryl;

each G is independently absent or a neutral or anionic donor ligand which is a Lewis base; and M is Zn(II), Cr(II), Co(II), Mn(II), Mg(II), Fe(II), Ti(II), Cr(III)-Z—R, Co(III)Z—R, Mn (III)-Z—R, Fe(III)-Z—R, Ca(II), Ge(II), Al(III)-Z—R, Ti(III)-Z—R, V(III)-Z—R, Ge(IV)-(—Z—R)$_2$ or Ti(IV)-(—Z—R)$_2$.

In a fourth aspect of the invention, there is provided method for producing a polyester, comprising contacting an anhydride and an epoxide with a catalyst system having a catalyst of formula (IA):

(IA)

[chemical structure]

wherein
$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;

$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;

R$_4$ is H, or optionally substituted aliphatic, heteroaliphatic, alicyclic, heteroalicyclic, aryl, heteroaryl, alkylheteroaryl or alkylaryl;

R$_5$ is H, or optionally substituted aliphatic, heteroaliphatic, alicyclic, heteroalicyclic, aryl, heteroaryl, alkylheteroaryl or alkylaryl;

E$_1$ is C, E$_2$ is O, S or NH or E$_1$ is N and E$_2$ is O;

Z is absent, or is selected from -E-, -EX(E)-, or -EX(E)E-;

X is S or C;

E is —O—, —S—, or NR$^Z$, wherein is H, or optionally substituted aliphatic, heteroaliphatic, alicyclic, heteroalicyclic, aryl, heteroaryl, alkylaryl or alkylheteroaryl;

R is hydrogen, or optionally substituted aliphatic, heteroaliphatic, alicyclic, heteroalicyclic, aryl, heteroaryl, alkylaryl, alkylheteroaryl, or silyl, or a polymer; and when Z is absent, R may additional be selected from halide, phosphinate, azide and nitrate;

each G is independently absent or a neutral or anionic donor ligand which is a Lewis base; and M is Zn(II), Cr(II), Co(II), Mn(II), Mg(II), Fe(II), Ti(II), Cr(III)-Z—R, Co(III)-Z—R, Mn (III)-Z—R, Fe(III)-Z—R, Ca(II), Ge(II), Al(III)-Z—R, Ti(III)-Z—R, V(III)-Z—R, Ge(IV)-(—Z—R)$_2$ or Ti(IV)-(—Z—R)$_2$.

In a fifth aspect of the invention, there is provided a polymer obtainable from the method according to any of the first, second, third or fourth aspects of the invention.

Definitions

For the purpose of the present invention, an aliphatic group is a hydrocarbon moiety that may be straight chain or branched and may be completely saturated, or contain one or more units of unsaturation, but which is not aromatic. The term "unsaturated" means a moiety that has one or more double and/or triple bonds. The term "aliphatic" is therefore intended to encompass alkyl, alkenyl or alkynyl groups, and combinations thereof. An aliphatic group is preferably a C$_{1-20}$aliphatic group, that is an aliphatic group with 1, 2, 3, 4, 5, 6, 7, 8, 9, 10, 11, 12, 13, 14, 15, 16, 17, 18, 19 or 20 carbon atoms. Preferably, an aliphatic group is a C$_{1-15}$aliphatic, more preferably a C$_{1-12}$aliphatic, more preferably a C$_{1-10}$aliphatic, even more preferably a C$_{1-8}$aliphatic, such as a C$_{1-6}$aliphatic group.

An alkyl group is preferably a "C$_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Preferably, an alkyl group is a C$_{1-15}$alkyl, preferably a C$_{1-12}$alkyl, more preferably a C$_{1-10}$alkyl, even more preferably a C$_{1-8}$alkyl, even more preferably a C$_{1-6}$alkyl group. In certain embodiments, an alkyl group is a "C$_{1-6}$ alkyl group", that is an alkyl group that is a straight or branched chain with 1 to 6 carbons. The alkyl group therefore has 1, 2, 3, 4, 5 or 6 carbon atoms. Specifically, examples of "C$_{1-20}$ alkyl group" include methyl group, ethyl group, n-propyl group, iso-propyl group, n-butyl group, iso-butyl group, sec-butyl group, tert-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

Alkenyl and alkynyl groups are preferably "C$_{2-20}$alkenyl" and "C$_{2-20}$alkynyl" respectively, that is an alkenyl or alkynyl group which is a straight chain or branched chain with 2 to 20 carbons. The alkenyl or alkynyl group therefore has 2, 3, 4, 5, 6, 7, 8, 9, 10, 11, 12, 13, 14, 15, 16, 17, 18, 19 or 20 carbon atoms. Preferably, an alkenyl group or an alkynyl group is "C$_{2-15}$alkenyl" and "C$_{2-15}$alkynyl", more preferably "C$_{2-12}$alkenyl" and "C$_{2-12}$alkynyl", even more preferably "C$_{2-10}$alkenyl" and "C$_{2-10}$alkynyl", even more preferably "C$_{2-8}$alkenyl" and "C$_{2-8}$alkynyl", most preferably "C$_{2-6}$alkenyl" and "C$_{2-6}$alkynyl" groups respectively.

A heteroaliphatic group is an aliphatic group as described above, which additionally contains one or more heteroatoms. Heteroaliphatic groups therefore preferably contain from 2 to 21 atoms, preferably from 2 to 16 atoms, more preferably from 2 to 13 atoms, more preferably from 2 to 11 atoms, more preferably from 2 to 9 atoms, even more preferably from 2 to 7 atoms, wherein at least one atom is a carbon atom. Particularly preferred heteroatoms are selected from O, S, N, P and Si. When heteroaliphatic groups have two or more heteroatoms, the heteroatoms may be the same or different.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Preferably, an alicyclic group has from 3 to 15, more preferably from 3 to 12, even more preferably from 3 to 10, even more preferably from 3 to 8 carbon atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substitutents, such as —CH$_2$-cyclohexyl.

Cycloalkyl, cycloalkenyl and cycloalkynyl groups have from 3 to 20 carbon atoms. The cycloalkyl, cycloalkenyl and cycloalkynyl groups therefore have 3, 4, 5, 6, 7, 8, 9, 10, 11, 12, 13, 14, 15, 16, 17, 18, 19 or 20 carbon atoms. Cycloalkyl, cycloalkenyl and cycloalkynyl groups preferably have from 3 to 15, more preferably from 3 to 12, even more preferably from 3 to 10, even more preferably from 3 to 8 carbon atoms. When an alicyclic group has from 3 to 8 carbon atoms, this means that the alicyclic group has 3, 4, 5, 6, 7 or 8 carbon atoms. Specifically, examples of the C$_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are preferably selected from O, S, N, P and Si. Heteroalicyclic groups preferably contain from one to four heteroatoms, which may be the same or different. Heterocyclic groups preferably contain from 4 to 20 atoms, more preferably from 4 to 14 atoms, even more preferably from 4 to 12 atoms.

An aryl group is a monocyclic or polycyclic ring system having from 5 to 20 carbon atoms. An aryl group is preferably a "C$_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "C$_{6-10}$ aryl group" include phenyl group, biphenyl group, indenyl group, naphthyl group or azulenyl group and the like. It should be noted that condensed rings such as indan and tetrahydro naphthalene are also included in the aryl group.

A heteroaryl group is an aryl group having, in addition to carbon atoms, from one to four ring heteroatoms which are preferably selected from O, S, N, P and Si. A heteroaryl group preferably has from 5 to 20, more preferably from 5 to 14 ring atoms. Specifically, examples of a heteroaryl group includes pyridine, imidazole, N-methylimidazole and 4-dimethylaminopyridine.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide" or "halogen" are used interchangeably and, as used herein mean a fluorine atom, a chlorine atom, a bromine atom, an iodine atom and the like, preferably a fluorine atom, a bromine atom or a chlorine atom, and more preferably a fluorine atom or a bromine atom.

A haloalkyl group is preferably a "$C_{1-20}$ haloalkyl group", more preferably a "$C_{1-15}$ haloalkyl group", more preferably a "$C_{1-12}$ haloalkyl group", more preferably a "$C_{1-10}$ haloalkyl group", even more preferably a "$C_{1-8}$ haloalkyl group", even more preferably a "$C_{1-6}$ haloalkyl group" and is a $C_{1-20}$ alkyl, a $C_{1-15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, preferably 1, 2 or 3 halogen atom(s). Specifically, examples of "$C_{1-20}$ haloalkyl group" include fluoromethyl group, difluoromethyl group, trifluoromethyl group, fluoroethyl group, difluroethyl group, trifluoroethyl group, chloromethyl group, bromomethyl group, iodomethyl group and the like.

An alkoxy group is preferably a "$C_{1-20}$ alkoxy group", more preferably a "$C_{1-15}$ alkoxy group", more preferably a "$C_{1-12}$ alkoxy group", more preferably a "$C_{1-10}$ alkoxy group", even more preferably a "$C_{1-8}$ alkoxy group", even more preferably a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$alkoxy group" include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An alkylthio group is preferably a "$C_{1-20}$ alkylthio group", more preferably a "$C_{1-15}$ alkylthio group", more preferably a "$C_{1-12}$ alkylthio group", more preferably a "$C_{1-10}$ alkylthio group", even more preferably a "$C_{1-8}$ alkylthio group", even more preferably a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-5}$ alkyl, or $C_{1-6}$ alkyl group respectively.

An alkylaryl group can comprise any of the alkyl or aryl groups discussed above. Preferably the alkylaryl group is a "$C_{6-12}$ aryl $C_{1-20}$ alkyl group", more preferably a preferably a "$C_{6-12}$ aryl $C_{1-16}$ alkyl group", even more preferably a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, preferably, the alkylaryl group is —CH$_2$-Ph or —CH$_2$CH$_2$-Ph. An alkylaryl group can also be referred to as "aralkyl".

An alkylheteroaryl group can comprise any of the alkyl or heteroaryl groups discussed above. Preferably the alkylheteroaryl group is a "heteroaryl $C_{1-20}$ alkyl group", more preferably a preferably a "heteroaryl $C_{1-16}$ alkyl group", even more preferably a "heteroaryl $C_{1-6}$ alkyl group" and is a heteroaryl group as defined above bonded at any position to an alkyl group as defined above. The point of attachment of the alkylheteroaryl group to a molecule may be via the alkyl portion. An alkylheteroaryl group can also be referred to as "heteroaralkyl".

An ether group is preferably a group OR$_6$ wherein R$_6$ can be an aliphatic, heteroaliphatic, alicyclic, heteroalicyclic, aryl or heteroaryl group as defined above. In certain embodiments, R$_6$ can be an unsubstituted aliphatic, alicyclic or aryl. Preferably, R$_6$ is an alkyl group selected from methyl, ethyl or propyl. A thioether group is preferably a group SR$_6$ wherein R$_6$ is as defined above.

A silyl group is preferably a group —Si(R$_7$)$_3$, wherein each R$_7$ can be independently an aliphatic, heteroaliphatic, alicyclic, heteroalicyclic, aryl or heteroaryl group as defined above. In certain embodiments, each R$_7$ is independently an unsubstituted aliphatic, alicyclic or aryl. Preferably, each R$_7$ is an alkyl group selected from methyl, ethyl or propyl.

A silyl ether group is preferably a group OSi(R$_8$)$_3$ wherein each R$_8$ can be independently an aliphatic, heteroaliphatic, alicyclic, heteroalicyclic, aryl or heteroaryl group as defined above. In certain embodiments, each R$_8$ can be independently an unsubstituted aliphatic, alicyclic or aryl. Preferably, each R$_8$ is an alkyl group selected from methyl, ethyl or propyl.

A nitrile group is a group CN.

An azide group is a group —N$_3$.

An imine group is a group —CRNR, preferably a group —CHNR$_9$ wherein R$_9$ is an aliphatic, heteroaliphatic, alicyclic, heteroalicyclic, aryl or heteroaryl group as defined above. In certain embodiments, R$_9$ is unsubstituted aliphatic, alicyclic or aryl. Preferably R$_9$ is an alkyl group selected from methyl, ethyl or propyl.

An acetylide group contains a triple bond —C≡C—R$_{10}$, preferably wherein R$_{10}$ can be an aliphatic, heteroaliphatic, alicyclic, heteroalicyclic, aryl or heteroaryl group as defined above. For the purposes of the invention when R$_{10}$ is alkyl, the triple bond can be present at any position along the alkyl chain. In certain embodiments, R$_{10}$ is unsubstituted aliphatic, alicyclic or aryl. Preferably R$_{10}$ is methyl, ethyl, propyl or phenyl.

An amino group is preferably —NH$_2$, —NHR$_{11}$ or —N(R$_{11}$)$_2$ wherein R$_{11}$ can be an aliphatic, heteroaliphatic, alicyclic, heteroalicyclic, a silylalkyl, aryl or heteroaryl group as defined above. It will be appreciated that when the amino group is N(R$_{11}$)$_2$, each R$_{11}$ group can be independently selected from an aliphatic, heteroaliphatic, alicyclic, heteroalicyclic a silylalkyl group, heteroaryl or an aryl group as defined above. In certain embodiments, each R$_{11}$ is independently an unsubstituted aliphatic, alicyclic or aryl. Preferably R$_{11}$ is methyl, ethyl, propyl, SiMe$_3$ or phenyl. Where W of the chain transfer agent is amine, the amine is preferably NH$_2$ or NHR$_{11}$.

An alkylamino group may be a group —NHR$_{11}$ or —N(R$_{11}$)$_2$ as defined above.

An amido group is preferably —NR$_{12}$C(O)— or —C(O)—NR$_{12}$— wherein R$_{12}$ can be hydrogen, an aliphatic, heteroaliphatic, alicyclic, heteroalicyclic, aryl or heteroaryl group as defined above. In certain embodiments, R$_{12}$ is unsubstituted aliphatic, alicyclic or aryl. Preferably R$_{12}$ is hydrogen, methyl, ethyl, propyl or phenyl.

An ester group is preferably —OC(O)R$_{13}$— or —C(O)OR$_{13}$— wherein R$_{13}$ can be hydrogen, an aliphatic, heteroaliphatic, alicyclic, heteroalicyclic, aryl or heteroaryl group as defined above. In certain embodiments, R$_{13}$ is unsubstituted aliphatic, alicyclic or aryl. Preferably R$_{13}$ is hydrogen, methyl, ethyl, propyl or phenyl.

A sulfoxide is preferably —SOR$_{14}$, a sulfonate group is preferably —OS(O)$_2$R$_{14}$, a sulfinate group is preferably —S(O)O—R$_{14}$, wherein R$_{14}$ can be hydrogen, an aliphatic, heteroaliphatic, alicyclic, heteroalicyclic, aryl or heteroaryl group as defined above. In certain embodiments, R$_{14}$ is unsubstituted aliphatic, alicyclic or aryl. Preferably R$_{14}$ is hydrogen, methyl, ethyl, propyl or phenyl.

A carboxylate group is preferably OC(O)R$_{15}$, wherein R$_{15}$ can be hydrogen, an aliphatic, heteroaliphatic, alicyclic, heteroalicyclic, aryl or heteroaryl group as defined above. In certain embodiments, R$_{15}$ is unsubstituted aliphatic, alicyclic or aryl. Preferably R$_{15}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is preferably MeC(O)N(R$_{16}$)$_2$ wherein R$_{16}$ can be hydrogen, an aliphatic, heteroaliphatic, alicyclic, heteroalicyclic, aryl or heteroaryl group as defined above. In certain embodiments, R$_{16}$ is unsubstituted aliphatic, alicyclic or aryl. Preferably R$_{16}$ is hydrogen, methyl, ethyl, propyl or phenyl.

A phosphinate group is preferably a group —OP(O)(R$_{17}$)$_2$ wherein each R$_{17}$ is independently selected from hydrogen, or an aliphatic, heteroaliphatic, alicyclic, heteroalicyclic, aryl or heteroaryl group as defined above. In certain embodiments, R$_{17}$ is aliphatic, alicyclic or aryl, which are optionally substituted by aliphatic, alicyclic, aryl or C$_{1-6}$alkoxy. Preferably R$_{17}$ is optionally substituted aryl or C$_{1-20}$ alkyl, more preferably phenyl optionally substituted by C$_{1-6}$alkoxy (preferably methoxy) or unsubstituted C$_{1-20}$alkyl (such as hexyl, octyl, decyl, dodecyl, tetradecyl, hexadecyl, stearyl).

It will be appreciated that where any of the above groups are present in a Lewis base G, one or more additional R$^G$ groups may be present, as appropriate, to complete the valency. For example, in the context of an ether an additional R$^G$ group may be present to give R$^G$OR$_6$, wherein R$^G$ is hydrogen, an optionally substituted aliphatic, heteroaliphatic, alicyclic, heteroalicyclic, aryl or heteroaryl group as defined above. Preferably, R$^G$ is hydrogen or aliphatic, alicyclic or aryl.

Any of the aliphatic, heteroaliphatic, alicyclic, heteroalicyclic, aryl, heteroaryl, haloalkyl, alkoxy, alkylthio, alkylaryl, ether, ester, sulfoxide, sulfonate, sulfinate, carboxylate, silyl ether, imine, acetylide, amino, alkylamino, phosphinate or amido groups wherever mentioned in the definitions above, may optionally be substituted by halogen, hydroxyl, nitro, carbonate, alkoxy, aryloxy, heteroaryloxy, amino, alkylamino, imine, nitrile, acetylide, or optionally substituted aliphatic, heteroaliphatic, alicyclic, heteroalicyclic, aryl or heteroaryl groups (for example, optionally substituted by halogen, hydroxyl, nitro, carbonate, alkoxy, amino, alkylamino, imine, nitrile or acetylide).

For the purposes of all aspects of the present invention, the epoxide, anhydride, lactide and lactone substrates are not limited.

The term epoxide therefore relates to any compound comprising an epoxide moiety. In preferred embodiments, the epoxides which are useful in the present invention have the following formula:

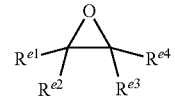

Wherein each R$^{e1}$, R$^{e2}$, R$^{e3}$ and R$^{e4}$ is independently selected from hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl, or a polymeric species (e.g. polybis(phenol)A); or two or more of R$^{e1}$, R$^{e2}$, R$^{e3}$ and R$^{e4}$ can be taken together to form a saturated, partially saturated or unsaturated 3 to 12 membered, optionally substituted ring system, optionally containing one or more heteroatoms.

Preferred examples of epoxides for the purposes of the present invention include propylene oxide, cyclohexene oxide, substituted cyclohexene oxides (such as limonene oxide, C$_{10}$H$_{16}$O or 2-(3,4-epoxycyclohexyl)ethyltrimethoxysilane, C$_{11}$H$_{22}$O), alkylene oxides (such as ethylene oxide and substituted ethylene oxides), substituted oxiranes (such as epichlorohydrin, 1,2-epoxybutane, glycidyl ethers), styrene oxide or substituted styrene oxides. For example, epoxides, may have the following structures:

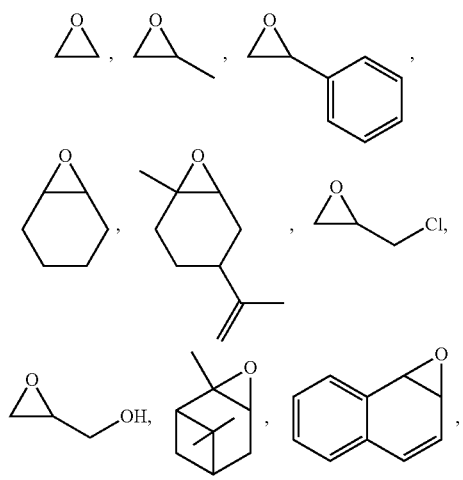

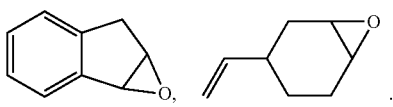

The term anhydride relates to any compound comprising an anhydride moiety in a ring system (i.e. a cyclic anhydride). In preferred embodiments, the anhydrides which are useful in the present invention have the following formula:

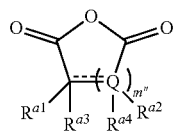

Wherein m" is 1, 2, 3, 4, 5, or 6 (preferably 1 or 2), each $R^{a1}$, $R^{a2}$, $R^{a3}$ and $R^{a4}$ is independently selected from hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl, or a polymeric species (e.g. polybis(phenol)A); or two or more of $R^{e1}$, $R^{e2}$, $R^{e3}$ and $R^{e4}$ can be taken together to form a saturated, partially saturated or unsaturated 3 to 12 membered, optionally substituted ring system, optionally containing one or more heteroatoms, or can be taken together to form a double bond. Each Q is independently C, O, N or S, preferably C, wherein $R^{a3}$ and $R^{a4}$ are either present, or absent, and ===== can either be = or —, according to the valency of Q. It will be appreciated that when Q is C, and ===== is =, $R^{a3}$ and $R^{a4}$ (or two $R^{a4}$ on adjacent carbon atoms) are absent. Preferable anhydrides are set out below.

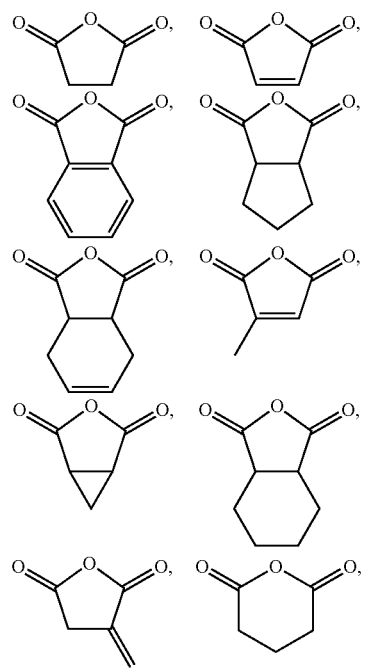

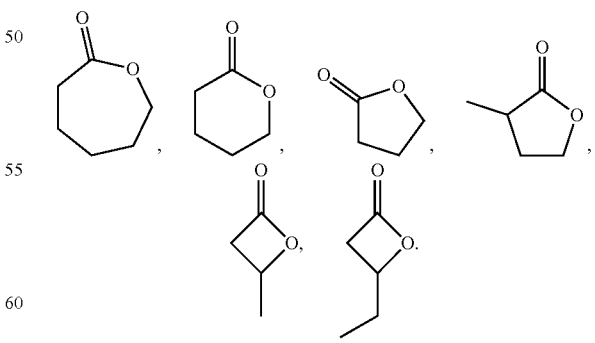

The term lactone relates to any cyclic compound comprising a —C(O)O— moiety in the ring. In preferred embodiments, the lactones which are useful in the present invention have the following formula:

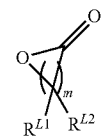

Wherein m is 1 to 20 (e.g. 1, 2, 3, 4, 5, 6, 7, 8, 9, 10, 11, 12, 13, 14, 15, 16, 17, 18, 19 or 20), preferably 2, 4, or 5; and $R^{L1}$ and $R^{L2}$ are independently selected from hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl. Two or more of $R^{L1}$ and $R^{L2}$ can be taken together to form a saturated, partially saturated or unsaturated 3 to 12 membered, optionally substituted ring system, optionally containing one or more heteroatoms. When m is 2 or more, the $R^{L1}$ and $R^{L2}$ on each carbon atom may be the same or different. Preferably $R^{L1}$ and $R^{L2}$ are selected from hydrogen or alkyl. Preferably, the lactone has the following structure:

The term lactide is a cyclic compound containing two ester groups. In preferred embodiments, the lactides which are useful in the present invention have the following formula:

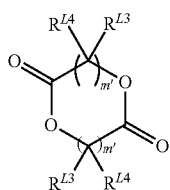

Wherein m' is 1, 2, 3, 4, 5, 6, 7, 8, 9 or 10, (preferably 1 or 2, more preferably, 1) and $R^{L3}$ and $R^{L4}$ are independently selected from hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl. Two or more of $R^{L3}$ and $R^{L4}$ can be taken together to form a saturated, partially saturated or unsaturated 3 to 12 membered, optionally substituted ring system, optionally containing one or more heteroatoms, When m' is 2 or more, the $R^{L3}$ and $R^{L4}$ on each carbon atom may be the same or different or one or more $R^{L3}$ and $R^{L4}$ on adjacent carbon atoms can be absent, thereby forming a double or triple bond. It will be appreciated that while the compound has two moieties represented by $(-CR^{L3}R^{L4})_{m'}$, both moieties will be identical. In particularly preferred embodiments, m' is 1, $R^{L4}$ is H, and $R^{L3}$ is H, hydroxyl or a $C_{1-6}$alkyl, preferably methyl. The stereochemistry of the moiety represented by $(-CR^{L3}R^{L4})_{m'}$, can either be the same (for example RR-lactide or SS-lactide), or different (for example, meso-lactide). The lactide may be a racemic mixture, or may be an optically pure isomer. Preferably, the lactide has the following formula:

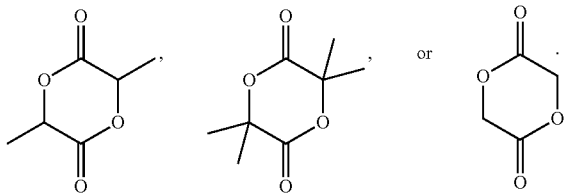

The term "lactone and/or lactide" used herein encompasses a lactone, a lactide and a combination of a lactone and a lactide. Preferably, the term "lactone and/or lactide" means a lactone or a lactide.

Preferred optional substituents of the groups $R^{e1}$, $R^{e2}$, $R^{e3}$, $R^{e4}$, $R^{a1}$, $R^{a2}$, $R^{a3}$, $R^{a4}$, $R^{L1}$, $R^{L2}$, $R^{L3}$ and $R^{L4}$ include halogen, nitro, hydroxyl, unsubstituted aliphatic, unsubstituted heteroaliphatic unsubstituted aryl, unsubstituted heteroaryl, alkoxy, aryloxy, heteroaryloxy, amino, alkylamino, imine, nitrile, acetylide, and carboxylate.

DETAILED DESCRIPTION

In a first aspect, the present invention provides a method for preparing a block copolymer, using a single catalytic system, wherein the single catalytic system comprises a catalyst of formula (I):

(I)

Wherein:
[M] is a metal complex having at least one metal atom M coordinated by a ligand system;

M is Zn, Cr, Co, Mn, Mg, Fe, Ti, Ca, Ge, Al, Mo, W, Ru, Ni or V;

Z is absent, or is independently selected from -E-, -EX(E)-, or -EX(E)E-, each E is independently selected from O, S or $NR^Z$, wherein $R^Z$ is H, or optionally substituted aliphatic, heteroaliphatic, alicyclic, heteroalicyclic, aryl, heteroaryl, alkylaryl or alkylheteroaryl;

X is C or S

R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phosphinate, azide and nitrate;

the method comprising the steps of:
d) forming a first block by polymerising a first monomer or combination of monomers selected from the groups (i) to (iii):
Group (i): a lactide and/or a lactone,
Group (ii): an epoxide and an anhydride, or
Group (iii): an epoxide and carbon dioxide,
e) optionally contacting the catalyst of formula (I) with a compound [Y] which is capable converting the group —Z—R, wherein Z is absent or a group selected from -E-X(E)- or -E-X(E)E-, to a group —Z—R wherein Z is -E-;
f) forming a second block by polymerising a second monomer or combination of monomers selected from a different group (i) to (iii) to that selected for the first monomer or combination of monomers:
Group (i): a lactide and/or a lactone,
Group (ii): an epoxide and an anhydride, or
Group (iii): an epoxide and carbon dioxide,
wherein when the first monomer or combination of monomers is Group (i), Z is -E-; and wherein when the first monomer or combination of monomers is Group (ii) or Group (iii), and the second monomer or combination of monomers is Group (i), step b) is performed after step a).

It will be appreciated that the definition of the catalyst system for use in the method of the present invention is not limiting and encompasses any catalyst of formula (I), in particular any catalyst of formula (I) suitable for polymerisation of an epoxide with carbon dioxide, or an anhydride, to form a polycarbonate polyol or polyester polyol respectively.

Such known catalyst systems generally comprise a metal, and a ligand. The metal can be selected from Zn, Ni, Ru, Mo, Fe, Mn, Mo, Cr, V, Co, Ti, W, Al, Ca, Ge or Mg. In preferred embodiments, the metal is Zn, Mg, or Co, more preferably Mg or Zn. The catalyst can comprises one or more metal atoms, such as two metal atoms. The ligand can be a monodentate or poly dentate ligand, such as a bi-dentate, tri-dentate or tetradentate ligand.

In particular, the methods of the present invention can use a metal co-ordination compound comprising the following tetradentate ligands as disclosed in WO2010/028362, the contents of which are incorporated herein by reference: salen derivatives; derivatives of salan ligands; bis-2-hydroxybenzamido derivatives; derivatives of the Trost ligand; porphyrin derivatives; derivatives of tetrabenzoporphyrin ligands; derivatives of corrole ligands; phthalocyaninate derivatives; and dibenzotetramethyltetraaza[14]annulene derivatives.

The invention relates to catalysts comprising metal complexes comprising two or metal atoms complexed to one or more multidentate ligand(s) as disclosed in WO2012/037282, the contents of which are incorporated herein by reference.

The invention further encompasses the use of catalysts comprising bulky β-diiminate (BDI) ligands for example (BDI)-ZnO$^i$Pr as disclosed in Coates et al, J.A.C.S., (2001), 123, 3229-3238, the contents of which are incorporated herein by reference. An additional example of such a catalyst includes the salen Co(III)X/onium salt catalyst system as disclosed in Lu et al, J.A.C.S., (2012), 134, 17739-17745, the contents of which are incorporated herein by reference.

The invention further encompasses, and preferably relates to, catalysts comprising two metal atoms complexed to a multidentate ligand system as disclosed in WO2009/130470 and WO2013/034750, the entire contents of which are incorporated herein by reference.

Other examples of known catalyst systems for use in the method of the present invention include (BDI)Zn—OAc as disclosed in R. C. Jeske, A. M. DiCiccio, G. W. Coates, *J. Am. Chem. Soc.* 2007, 129, 11330-11331, (salen)Cr—Cl as disclosed in D. J. Darensbourg, R. R. Poland, C. Escobedo, *Macromolecules* 2012, 45, 2242-2248, (salen)M-Cl, where M is Cr, Al, Co or Mn, as disclosed in C. Robert, F. De Montigny, C. M. Thomas, *Nature Comm.* 2011, 2, 586, (salen)-Co—O$_2$CPH as disclosed in M. DiCicco, G. W. Coates, *J. Am. Soc.* 2011, 133, 10724-10727, (Tp-porph) Al—Cl as disclosed in T. Aida, S. Inoue, *J. Am. Chem. Soc.* 1985, 107, 1358-1364 and T. Aida, K. Sanuki, S. Inoue, *Macromolecules* 1985, 18, 1049; (sal*)MCl where M is Al, Cr or Co as disclosed in E. Hosseini Nejad, C. G. W. van Melis, T. J. Vermeer, C. E. Koning, R. Duchateau, *Macromolecules,* 2012, 45, 1770-1776, (Ph-salen)Cr—Cl as disclosed in E. Hosseini Nejad, A. Paoniasari, C. E. Koning, R. Duchateau, *Polym. Chem,* 2012, 3, 1308, the contents of all of which are incorporated herein by reference.

In preferred embodiments of the first aspect, the catalyst of formula (I) is preferably a complex of formula (IA):

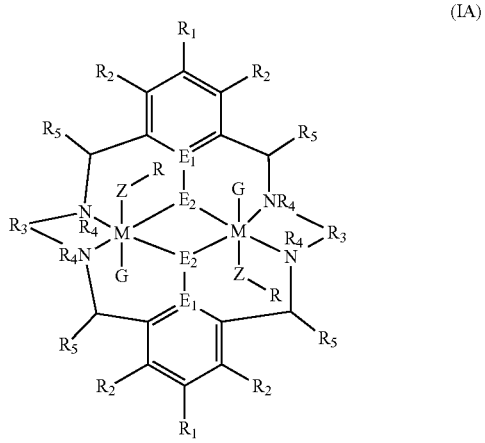

(IA)

wherein $R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;

$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;

$R_4$ is H, or optionally substituted aliphatic, heteroaliphatic, alicyclic, heteroalicyclic, aryl, heteroaryl, alkylheteroaryl or alkylaryl;

$R_5$ is H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

Z is absent, or is selected from -E-, -EX(E)-, or -EX(E)E-;

X is C or S;

E is —O—, —S—, or NR$^Z$, wherein is H, or optionally substituted aliphatic, heteroaliphatic, alicyclic, heteroalicyclic, aryl, heteroaryl, alkylaryl or alkylheteroaryl;

R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may additionally be selected from halide, phonsphinate, azide and nitro;

each G is independently absent or a neutral or anionic donor ligand which is a Lewis base; and M is Zn(II), Cr(II), Co(II), Mn(II), Mg(II), Fe(II), Ti(II), Cr(III)-Z—R, Co(III)-Z—R, Mn (III)-Z—R, Fe(III)-Z—R, Ca(II), Ge(II), Al(III)-Z—R, Ti(III)-Z—R, V(III)-Z—R, Ge(IV)-(—Z—R)$_2$ or Ti(IV)-(—Z—R)$_2$.

$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or optionally substituted alkyl, alkenyl, alkynyl, haloalkyl, aryl, heteroaryl, alicyclic or heteroalicyclic. $R_1$ and $R_2$ may be the same or different. $R_1$ and $R_2$ are preferably independently selected from hydrogen, tBu, Me, CF$_3$, phenyl, F, Cl, Br, I, NMe$_2$, NEt$_2$, NO$_2$, OMe, OSiEt$_3$, CNMe, CN or CCPh, more preferably hydrogen, OMe, Me, NO$_2$, halogen or tBu (e.g. hydrogen or tBu). In certain embodiments, $R_2$ is hydrogen and $R_1$ is any one of the groups defined above, preferably NO$_2$, halogen, tBu, OMe or Me, more preferably tBu, OMe or Me.

$R_3$ is a disubstituted alkyl, alkenyl, alkynyl, heteroalkyl, heteroalkenyl or heteroalkynyl group which may optionally be interrupted by an aryl, heteroaryl, alicyclic or heterolicyclic group, or may be a disubstituted aryl or cycloalkyl group which acts as a bridging group between two nitrogen centres in the catalyst of formula (IA). Thus, where $R_3$ is a alkylene group, such as dimethylpropylene, the $R_3$ group has the structure —CH$_2$—C(CH$_3$)$_2$—CH$_2$—. The definitions of the alkyl, aryl, cycloalkyl etc groups set out above therefore also relate respectively to the alkylene, arylene, cycloalkylene etc groups set out for $R_3$. In certain embodiments, $R_3$ is optionally substituted alkylene, alkenylene, alkynylene, heteroalkylene, heteroalkenylene, heteroalkynylene, arylene, heteroarylene or cycloalkylene; wherein alkylene, alkenylene, alkynylene, heteroalkylene, heteroalkenylene and heteroalkynylene may optionally be interrupted by aryl, heteroaryl, alicyclic or heteroalicyclic. In particularly preferred embodiments, $R_3$ is a propylene group which is optionally substituted by aliphatic (preferably C$_{1-6}$alkyl) or aryl groups. Preferably $R_3$ is ethylene, 2,2-dimethylpropylene, propylene, butylene, phenylene, cyclohexylene or biphenylene, more preferably 2,2-dimethylpropylene. When $R_3$ is cyclohexylene, it can be the racemic, RR— or SS— forms.

$R_4$ is H, or optionally substituted aliphatic, heteroaliphatic, alicyclic, heteroalicyclic, aryl, heteroaryl, alkylheteroaryl or alkylaryl. Preferably $R_4$ is independently selected from hydrogen, or optionally substituted alkyl, alkenyl, alkynyl, aryl or heteroaryl. Exemplary options for $R_4$ include H, Me, Et, Bn, iPr, tBu or Ph. More preferably, $R_4$ is hydrogen.

$R_5$ is H, or optionally substituted aliphatic, heteroaliphatic, alicyclic, heteroalicyclic, aryl, heteroaryl, alkylheteroaryl or alkylaryl. Preferably $R_5$ is independently selected from hydrogen, or optionally substituted aliphatic or aryl. More preferably, $R_5$ is selected from hydrogen, alkyl or aryl. Exemplary $R_5$ groups include hydrogen, methyl, trifluoromethyl, ethyl and phenyl (preferably hydrogen, trifluoromethyl and methyl). In particularly preferred embodiments, all instances of $R_5$ are hydrogen.

In certain embodiments, $R_1$, $R_2$, $R_3$, $R_4$ and $R_5$ are each independently optionally substituted by halogen, hydroxyl, nitro, carbonate, alkoxy, aryloxy, heteroaryloxy, amino, alkylamino, imine, nitrile, acetylide, or unsubstituted aliphatic, heteroaliphatic, alicyclic, heteroalicyclic, aryl or heteroaryl. Preferably $R_1$, $R_2$, $R_3$, $R_4$ and $R_5$ are each independently optionally substituted by halogen, hydroxyl, nitro, carbonate, alkoxy, aryloxy, imine, nitrile, acetylide, unsubstituted aliphatic, unsubstituted alicyclic and unsubstituted aryl.

In certain embodiments, $E_1$ is C, $E_2$ is O, S or NH, and preferably $E_2$ is O. In other embodiments, $E_1$ is N and $E_2$ is O. In particularly preferred embodiments, $E_1$ is C and $E_2$ is O.

G is either present or absent. When G is not absent, it is a group which is capable of donating a lone pair of electrons (i.e. a Lewis base). In certain embodiments, G is a nitrogen containing Lewis base. Each G may independently be neutral or negatively charged. If G is negatively charged, then one or more positive counterions will be required to balance out the change of the complex. Suitable positive counterions include group 1 metal ions (Na$^+$, K$^+$, etc), group 2 metal ions (Mg$^{2+}$, Ca$^{2+}$, etc), imidazolium ions, positively charged optionally substituted heteroaryl, heteroalicyclic or heteroaliphatic groups, ammonium ions (i.e. N(R$^{12}$)$_4$$^+$), iminium ions (i.e. (R$^{12}$)$_2$C=N(R$^{12}$)$_2$$^+$, such as bis(triphenylphosphine)iminium ions) or phosphonium ions (P(R$^{12}$)$_4$$^+$), wherein each R$^{12}$ is independently selected from hydrogen or optionally substituted aliphatic, heteroaliphatic, alicyclic, heteroalicyclic, aryl or heteroaryl. Exemplary counterions include [H—B]$^+$ wherein B is selected from triethylamine, 1,8-diazabicyclo[5.4.0]undec-7-ene and 7-methyl-1,5,7-triazabicyclo[4.4.0]dec-5-ene.

G is preferably independently selected from an optionally substituted heteroaliphatic group, an optionally substituted heteroalicyclic group, an optionally substituted heteroaryl group, a halide, hydroxide, hydride, a carboxylate, an ether, a thioether, carbene, a phosphine, a phosphine oxide, an amine, an acetamide, acetonitrile, an ester, a sulfoxide, a sulfonate and water. More preferably, G is independently selected from water, an alcohol, a substituted or unsubstituted heteroaryl (imidazole, methyl imidazole, pyridine, 4-dimethylaminopyridine, pyrrole, pyrazole, etc), an ether (dimethyl ether, diethylether, cyclic ethers, etc), a thioether, carbene, a phosphine, a phosphine oxide, a substituted or unsubstituted heteroalicyclic (morpholine, piperidine, tetrahydrofuran, tetrahydrothiophene, etc), an amine, an alkyl amine (trimethylamine, triethylamine, etc), acetonitrile, an ester (ethyl acetate, etc), an acetamide (dimethylacetamide, etc), a sulfoxide (dimethylsulfoxide, etc), a carboxylate, a hydroxide, hydride, a halide, a nitrate, a sulfonate, etc. In some embodiments, one or both instances of G is independently selected from optionally substituted heteroaryl, optionally substituted heteroaliphatic, optionally substituted heteroalicyclic, halide, hydroxide, hydride, an ether, a thioether, carbene, a phosphine, a phosphine oxide, an amine, an alkyl amine, acetonitrile, an ester, an acetamide, a sulfoxide, a carboxylate, a nitrate or a sulfonate. In certain embodiments, G may be a halide; hydroxide; hydride; water; a heteroaryl, heteroalicyclic or carboxylate group which are optionally substituted by alkyl, alkenyl, alkynyl, alkoxy, halogen, hydroxyl, nitro or nitrile. In preferred embodiments, G is independently selected from halide; water; a heteroaryl optionally substituted by alkyl (e.g. methyl, ethyl etc), alkenyl, alkynyl, alkoxy (preferably methoxy), halogen, hydroxyl, nitro or nitrile. In some embodiments, one or both instances of G is negatively charged (for example, halide). In further embodiments, one or both instances of G is an optionally substituted heteroaryl. Exemplary G groups include chloride, bromide, pyridine, methylimidazole (for example N-methyl imidazole) and dimethylaminopyridine (for example, 4-methylaminopyridine).

Preferably G is absent.

It will be appreciated that when a G group is present, the G group may be associated with a single M metal centre as shown in formula (IA), or the G group may be associated with both metal centres and form a bridge between the two metal centres.

Preferably M is Zn(II), Cr(III), Cr(II), Co(III), Co(II), Mn(III), Mn(II), Mg(II), Fe(II), Fe(III), Ca(II), Ge(II), Ti(II), Al(III), Ti(III), V(III), Ge(IV) or Ti(IV), more preferably Zn(II), Cr(III), Co(II), Mn(II), Mg(II), Fe(II) or Fe(III), and most preferably Zn(II) or Mg(II). It will be appreciated that when M is Cr(III), Co(III), Mn(III) or Fe(III), the catalyst of formula (IA) will contain an additional —Z—R group co-ordinated to the metal centre, wherein —R—R is as defined herein. It will also be appreciated that when M is Ge(IV) or Ti(IV), the catalyst of formula (IA) will contain two additional —Z—R groups co-ordinated to the metal centre, wherein —Z—R is as defined above. In certain embodiments, when M is Ge(IV) or Ti(IV), both G may be absent.

The skilled person will also appreciate that each M may be the same (for example, both M may be Mg, Zn, Fe or Co) or each M may be different and can be present in any combination (for example, Fe and Zn, Co and Zn, Mg and Fe, Co and Fe, Mg and Co, Cr and Mg, Cr and Zn, Mn and Mg, Mn and Zn, Mn and Fe, Cr and Fe, Cr and Co, Al and Mg, Al and Zn etc). When M is the same metal, it will be appreciated that each M may be in the same oxidation state (for example both M may be Co(II), Fe(II) or Fe(III)), or in a different oxidation state (for example, one M may be Co(II) and the other M may be Co(III), one M may be Fe(II) and the other M may be Fe(III), or one M may be Cr(II) and the other M may be Cr(III)).

—Z— is either absent or selected from -E-, -E-X(E)- or -E-X(E)-E-.

X is C or S, preferably C.

E is O, S, or NR$^Z$.

When Z is -E-X(E)-, -E-X(E)- is preferably —O—(CO)—, —NR$^Z$—CO—, —O—C(=NR$^Z$)—, —O—C(S)—, —O—S(O)—, —NR$^Z$—S(O)— or —O—S(=NR$^Z$)—.

When Z is -E-X(E)-E-, -E-X(E)-E-. is preferably —O—(CO)—O, —NR$^Z$—C(O)—O—, —NR$^Z$—C(O)—NR$^Z$, —O—C(=NR$^Z$)—O—, —O—C(=NR$^Z$)—NR$^Z$—, —O—C(S)—O—, —O—C(O)—NR$^Z$, —O—S(O)—O—, —NR$^Z$—S(O)—O—, —O—S(O)—NR$^Z$.

Preferably, each occurrence of E is O.

In certain embodiments, each E is O and X is C.

Each $NR^Z$ is independently H, or optionally substituted aliphatic, heteroaliphatic, alicyclic, heteroalicyclic, aryl, heteroaryl, alkylaryl or alkylheteroaryl. Preferably $NR^Z$ is hydrogen or $C_{1-6}$alkyl.

R is hydrogen, or optionally substituted aliphatic, heteroaliphatic, alicyclic, heteroalicyclic, aryl, heteroaryl, alkylaryl, alkylheteroaryl or silyl. Preferably, R is an optionally substituted alkyl, alkenyl, alkynyl, aryl, alkylaryl, cycloalkyl, cycloalkenyl, cycloalkynyl, heteroaryl, cycloheteroalkyl, alkylheteroaryl or silyl. More preferably, R is $C_{1-12}$alkyl, cycloalkyl or aryl (for example, methyl, ethyl, n-propyl, isopropyl, n-butyl, tert-butyl, phenyl, cyclohexyl etc).

When —Z— is absent, in addition to the above groups, R may also be a halide, phosphinate, azide or nitrate.

Preferably, R may be substituted by halogen, hydroxyl, nitro, unsubstituted aryl, unsubstituted alkyl, unsubstituted alkenyl, unsubstituted alkoxy and unsubstituted aryloxy. For example, R may be an alkyl group substituted by halogen, for instance R may be $CF_3$.

It will also be appreciated that R can be a polymer chain. For example, R may be a polycarbonate or a polyester.

The catalyst of formula (IA) has two or more occurrences of —Z—R, depending on the oxidation state of the metal M. Each —Z—R may be the same, or different.

The skilled person will also understand that the moiety in the group —R which is attached to the group —Z— will not be a heteroatom (for example, O, S or N) or a group C=E', where E' is a heteroatom (for example O, S, or N).

In particularly preferred embodiments, $R_1$ and $R_2$ are independently hydrogen, or optionally substituted alkyl, alkenyl, halogen, hydroxyl, nitro, alkoxy, aryl, heteroaryl, alkylaryl and alkylheteroaryl; $R_3$ is optionally substituted alkylene or arylene; $R_4$ is hydrogen, or optionally substituted alkyl or heteroaryl; $R_5$ is hydrogen or optionally substituted alkyl; $E_1$ is C and $E_2$ is O; M is Mg, Zn, Fe or Co; Z is either absent or selected from —O—R, O—C(O)—R or —OC(O)—O—R; R is optionally substituted alkyl, alkenyl, cycloalkyl, aryl, heteroaryl, alkylaryl or alkylheteroaryl; or when Z is absent, R is phosphinate or halide; G is either absent, or is selected from optionally substituted heteroaryl or halide. It will be appreciated that when G is a halogen, a counterion must be present. Preferably, the counterion is $[H-B]^+$, wherein B is preferably selected from $NEt_3$, 1,8-diazabicyclo[5.4.0]undec-7-ene (DBU) and 7-methyl-1,5,7-triazabicyclo[4.4.0]dec-5-ene (MTBD).

Exemplary catalysts of formula (IA) are as follows:

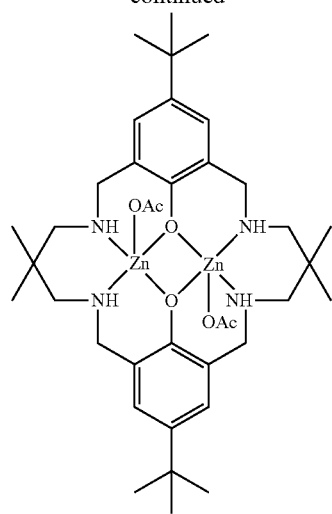

$[L^1Zn_2(OAc)_2]$

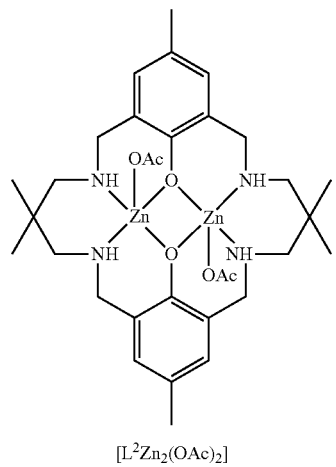

$[L^2Zn_2(OAc)_2]$

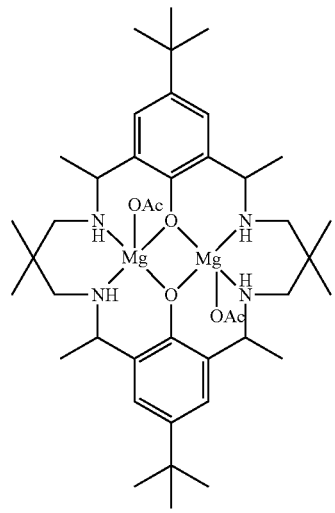

$[L^4Mg_2(OAc)_2]$

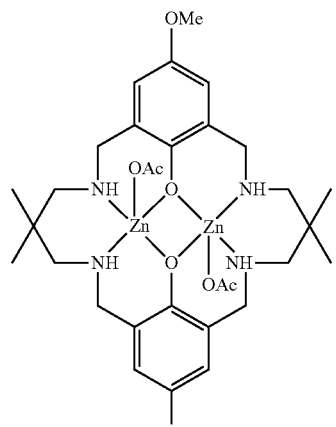

$[L^3Zn_2(OAc)_2]$

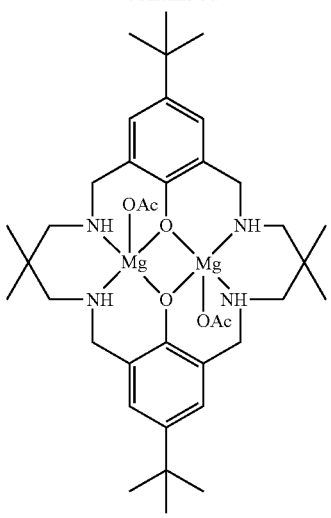

[L¹Mg₂(OAc)₂]

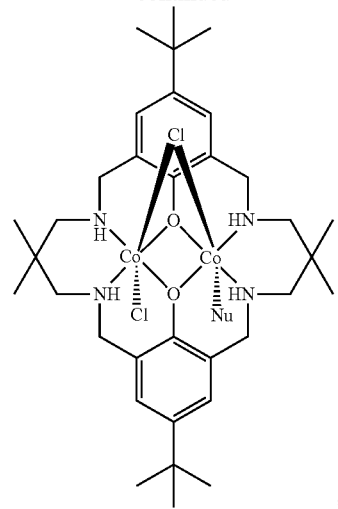

[L¹Co₂Cl₂Nu]
Nu = N-methylimidazole
= pyridine
= dimethylaminopyridine

[L¹Mg₂Cl₂(methylimidazole)],
[L₁Mg₂Cl₂(dimethylaminopyridine)],
[L₁Mg₂Br₂(dimethylaminopyridine)],
[L¹Zn₂(F₃CCOO)₂],
[L¹Zn₂(OOCC(CH₃)₃)₂],
[L¹Zn₂(OC₆H₅)₂],
[L¹Fe₂Cl₄],
[L¹Co₂(OAc)₃],
[L¹Zn₂(adamantyl carbonate)₂],
[L¹Zn₂(pentafluorobenzoate)₂],
[L¹Zn₂(diphenylphosphinate)₂],
[L¹Zn₂(bis(4-methoxy)phenyl phosphinate)₂],
[L¹Zn₂(hexanoate)₂],
[L¹Zn₂(octanoate)₂],
[L¹Zn₂(dodecanoate)₂],
[L¹Mg₂(F₃CCOO)₂],
[L¹Mg₂Br₂],
[L¹Zn₂(C₆F₅)₂],
[L¹Zn₂(C₆H₅)₂] and
[L¹Zn₂(OiPr)₂].

The compound [Y] which can be used in the first aspect of the present invention must be capable of converting the group —Z—R, wherein Z is absent or a group selected from -E-C(E)- or -E-C(E)E-, to a group —Z—R wherein Z is -E-. In other words, the compound [Y] must be capable of inserting into the bond between the metal atom in the metal complex [M] and the group —Z—R in order to switch the ligand attached to the metal atom from —R, -E-C(E)-R or E-C(E)-E-R to -E-R.

The compound [Y] may be a compound having a three, four or five membered saturated ring and at least one heteroatom selected from O, S or N. In preferred embodiments, the compound [Y] may be an epoxide, an aziridine, an episulfide, an oxetane, a thietane, an azetidine, a saturated furan, a saturated thiophene or a pyrrolidine.

In certain embodiments, the compound [Y] has the following formula:

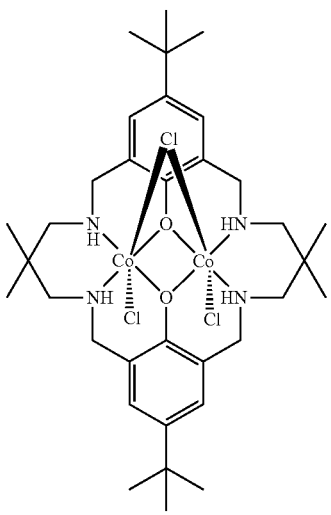

[L¹Co₂Cl₃]⁻[B-H]⁺
[B-H]⁺ represents any counterion, for example,
B may be NEt₃, 1,8-diazabicyclo[5.4.0]undec-7-ene (DBU),
7-methyl-1,5,7-triazabicyclo[4.4.0]dec-5-ene (MTBD), etc

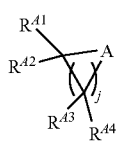

Wherein

A is O, S or NR$^A$; (preferably A is O)

j is 1, 2, or 3;

R$^A$ is hydrogen, halogen, hydroxyl, alkoxy, aryloxy, heteroaryloxy, or aliphatic, heteroaliphatic, alicyclic, heteroalicyclic, aryl, heteroaryl, alkylaryl or alkylheteroaryl;

Each R$^{A1}$, R$^{A2}$, R$^{A3}$ and R$^{A4}$ is independently selected hydrogen, halogen, hydroxyl, nitro, alkoxy, aryloxy, heteroaryloxy, amino, alkylamino, imine, nitrile, acetylide, carboxylate or optionally substituted aliphatic, heteroaliphatic, alicyclic, heteroalicyclic, aryl, heteroaryl, alkylaryl or alkylheteroaryl; or two or more of R$^{A1}$, R$^{A2}$, R$^{A3}$ and R$^{A4}$ can be taken together to form a saturated, partially saturated or unsaturated 3 to 12 membered, optionally substituted ring system, optionally containing one or more heteroatoms. For example, each R$^{A1}$, R$^{A2}$, R$^{A3}$ and R$^{A4}$ may be H; R$^{A1}$, R$^{A2}$ and R$^{A3}$ may be H and one or more R$^{A4}$ may be aryl or aliphatic, preferably phenyl or alkyl; R$^{A1}$ and R$^{A4}$ may be H, and R$^{A2}$ and R$^{A3}$ may be taken together to form a six to 10 membered carbon ring (saturated, unsaturated or partially saturated. For example, the compound [Y] may be:

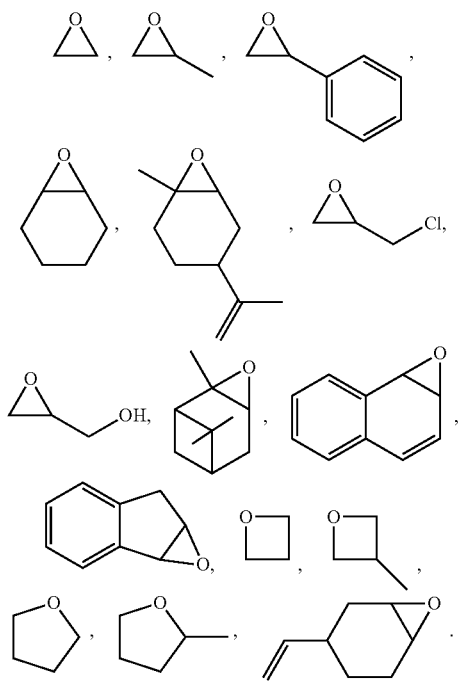

Preferred optional substituents of the groups R$^{A1}$, R$^{A2}$, R$^{A3}$ and R$^{A4}$ include halogen, nitro, hydroxyl, unsubstituted aliphatic, unsubstituted heteroaliphatic unsubstituted aryl, unsubstituted heteroaryl, alkoxy, aryloxy, heteroaryloxy, amino, alkylamino, imine, nitrile, acetylide, and carboxylate.

In preferred embodiments, the compound [Y] is an epoxide. When the compound [Y] is an epoxide, it will be appreciated that it may be the same, or different, to the epoxide monomer to be polymerised. In highly preferred embodiments, the compound [Y] is an epoxide which is the same as the epoxide to be polymerised by the method of the first aspect.

The polymerisation of an epoxide and carbon dioxide has been performed in the presence of various catalysts of formula (I), for example, the catalysts described in WO2009/130470 and WO 2013/034750 (each of which are herein incorporated by reference in their entirety). The reaction between the monomers, carbon dioxide and the epoxide, at the metal atom M proceeds by the following pathway in which the carbon dioxide inserts into the bond between the metal atom and the labile ligand -E-R (represented below by —O—R) to form a carbonate group attached to the metal atom, followed by the insertion of an epoxide between the carbonate group and the metal atom, in order to regenerate the group —O—R:

Scheme 1: copolymerisation of an epoxide and carbon dioxide

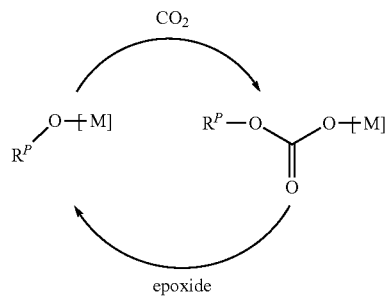

epoxide

The skilled person will understand that R$^P$ represents the growing polymer chain and will therefore increase in size after each addition of CO$_2$/epoxide monomer.

The polycarbonates produced by the reaction between an epoxide and carbon dioxide in the presence of a catalyst of formula (I) may be represented as follows:

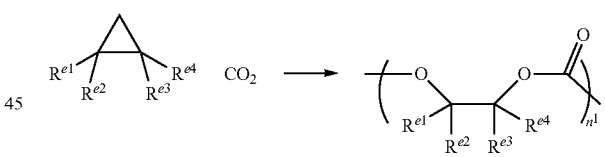

Wherein n$_1$ is 1 to 1,000,000, for example 10 to 100,000, such as 100 to 10,000, e.g. 10 to 1,000.

It will be understood that the moiety attached to the metal atom M will either be -E-R or -E-X(E)-R (i.e. E is O and R is R$^P$). As the copolymerisation of carbon dioxide and an epoxide is generally carried out using a vast excess of carbon dioxide (due to the low cost and availability of this reagent, and to ensure entire consumption of the epoxide monomer), the moiety attached to the metal complex [M] will predominantly be —O—C(O)—O—R once the reaction has terminated.

It has been surprisingly found that the catalysts as described in WO 2009/130470 and WO 2013/034750 are also capable of polymerising an epoxide and an anhydride. This reaction is as set out in the fourth aspect of the application below, with the catalysts defined as catalysts of formula (IA).

The reaction between the anhydride and the epoxide monomers at the metal complex [M] proceeds by the following pathway in which the anhydride inserts into the bond between the metal atom and the labile ligand -E-R (represented below by —O—$R^P$) to form an ester group attached to the metal atom, followed by the insertion of an epoxide between the ester group and the metal atom, in order to regenerate the group —O—$R^P$:

Scheme 1: Copolymerisation of an epoxide and anhydride monomers

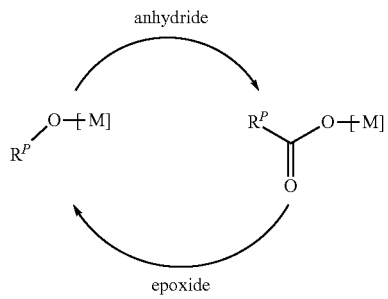

$R^P$ represents the growing polymer chain, and therefore increases in size upon the addition of each epoxide/anhydride monomer.

The polyesters produced by the reaction between an epoxide and an anhydride in the presence of a catalyst of formula (I) may be represented as follows:

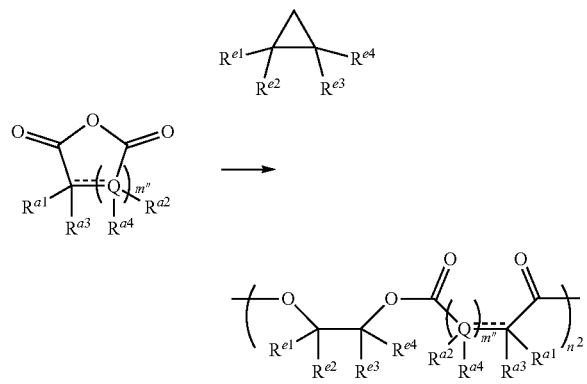

Wherein $n_2$ is 1 to 1,000,000, for example 10 to 100,000, such as 100 to 10,000, e.g. 10 to 1,000.

The inventors have found that, in the copolymerisation of an epoxide and an anhydride, the moiety attached to the metal complex [M] will either be —O—C(O)—R or —O—R. When the reaction terminates, the moiety attached to the metal complex will depend on which of the monomers is in excess.

The present invention further provides the use of catalysts of formula (IA) for initiating the ring opening of lactide and/or lactone monomers. When used in this manner, it is required that the labile ligand is —Z—R is —O—R, S—R or —$NR^Z$—R.

The ring opening of a lactide and a lactone in the presence of a catalyst system having a catalyst of formula (I) may be represented as follows:

Scheme 3: Ring opening of a lactone

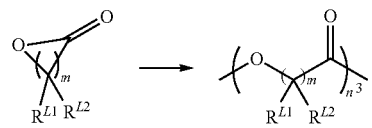

Scheme 4: Ring opening of a lactide

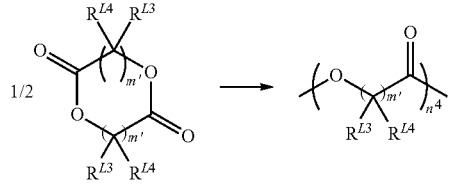

In the above schemes, $n_3$ and $n_4$ are independently selected from 1 to 10,000, for example, 1 to 5000, such as 10 to 1000.

The inventive methods described herein can therefore be used to ring open a lactide and/or a lactone in order to make dimers, trimers, tetramers, penatmers etc (i.e. when $n^3$ or $n^4$=2, 3, 4, 5) or polymers (i.e. when $n^3$ or $n^4$=1 to 10,000). This method is described in the third aspect of the present invention.

The complexes of formula (I), in particular compounds of formula (IA), retain their active centres after the initial polymerisation has proceeded to completion. In other words, the metal complex [M] at the end of the polymer chain is a "dormant" catalytic species once one or more of the initial monomer species has been used up. This means that propagation may resume upon the introduction of additional monomer(s).

In a particular embodiment of the first aspect of the invention, there is provided a method for producing a polycarbonate-polyester block copolymer, the method comprising initially polymerising carbon dioxide and an epoxide in the presence of a single catalytic system having a catalyst of formula (I) to form a polycarbonate block and, adding anhydride (and optionally further epoxide, which may be the same or different to the epoxide used to produce the first block) to the reaction mixture. This reaction may be represented as follows:

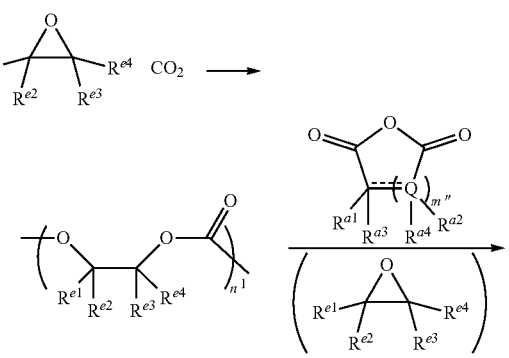

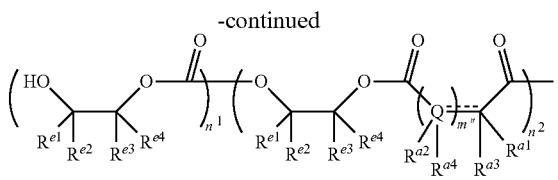

In an alternative embodiment, there is provided a method for producing a polyester-polycarbonate block copolymer, the method comprising initially polymerising an epoxide and an anhydride epoxide in the presence of a single catalytic system having a catalyst of formula (I) to form a polyester block, and subsequently adding carbon dioxide (and optionally further epoxide, which may be the same or different to the epoxide used to produce the first block) to the reaction mixture. This reaction may be represented as follows:

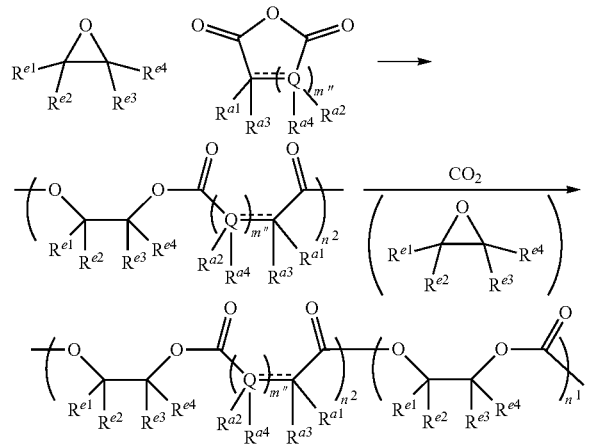

In both of the above reactions, it will be appreciated that further epoxide will need to be added to the reaction mixture in order to produce the second block if all of the epoxide has been consumed in the production of the first block.

As discussed above, the moiety attached to the metal complex [M] after the copolymerisation of an anhydride or carbon dioxide with an epoxide has taken place will be an ester group (—OC(O)—R) or a carbonate group (—OC(O)—O—R), respectively, if the reaction is carried out with an excess of carbon dioxide/anhydride.

The inventors have recognised that, in order to use lactides and/or lactones in the method of the first aspect, it is necessary to specifically tailor the group attached to the metal complex [M] so that ring opening polymerisation can proceed.

The inventors have found that it is possible to "convert" the moiety attached to the metal complex [M] by adding a compound [Y] to the single catalytic system comprising a catalyst of formula (I). The compound [Y] is capable converting the group —Z—R, wherein Z is absent or a group selected from -E-X(E)- or -E-X(E)E- (for example, —O—C(O)—R or —O—C(O)—O—R), to a group -E-R (for example, —O—R). The compound [Y] inserts in between the metal complex [M] and the group —R, -E-X(E)-R or -E-X(E)-E-R, thereby ensuring that the moiety attached to the metal complex [M] is -E-R.

In an alternative embodiment of the first aspect, there is provided a method for producing a polyester-polyester, or a polycarbonate-polyester block copolymer, the method comprising initially polymerising an epoxide and an anhydride, or an epoxide and carbon dioxide, using a single catalyst system having a catalyst of formula (I) to form a first polyester block or a polycarbonate block, respectively, converting the moiety attached to the metal complex [M] at the end of the polymer chain from an ester group (—OC(O)—) or a carbonate group (—OC(O)—O—), to a group -E- (for example an alkoxy group, and alkylthio group or a primary or secondary amine group) using a compound [Y], and then adding a lactide and/or a lactone. These reactions maybe represented as follows:

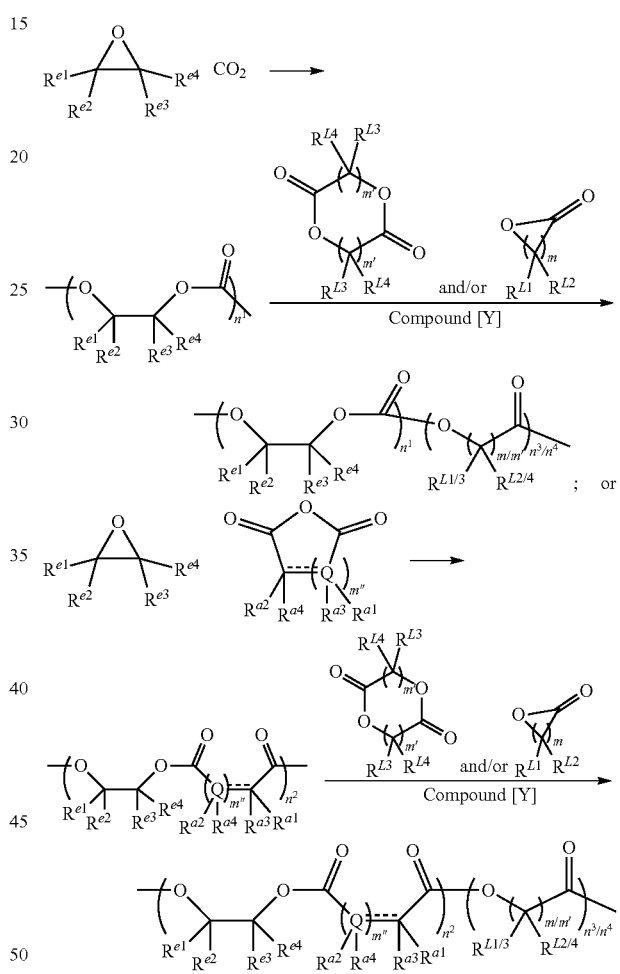

The skilled person will appreciate that the compound [Y] may be added after the first block has been prepared. Alternatively, it will be appreciated that if all of the epoxide is not consumed in the formation of the first block, the remaining epoxide monomer will insert into the bond between the complex [M] and the ester group —OC(O)—R or the carbonate group —O—C(O)O—R, thereby functioning as the compound [Y]. Therefore, the compound [Y] may be present in the initial reaction mixture, for example, in the form of an excess of epoxide.

The lactide and/or lactone may be added at the same time as, or after, the addition of compound [Y] to the single catalytic system.

In an alternative embodiment of the first aspect, there is provided a method for producing a polyester-polyester, or polyester-polycarbonate block copolymer, the method comprising ring opening a lactide and/or a lactone, and subsequently adding an epoxide and carbon dioxide or an epoxide and an anhydride. It will be appreciated that if the first block is prepared by ring opening of a lactide and/or a lactone, the catalyst system must contain a catalyst of formula (I), where the labile ligand —Z—R is -E-R.

It is possible that the epoxide monomer used to produce the second block may be added to the single catalytic system at the same time as the anhydride/carbon dioxide, or it may be present in the single catalytic system prior to the production of the first block.

This reaction can be represented as follows:

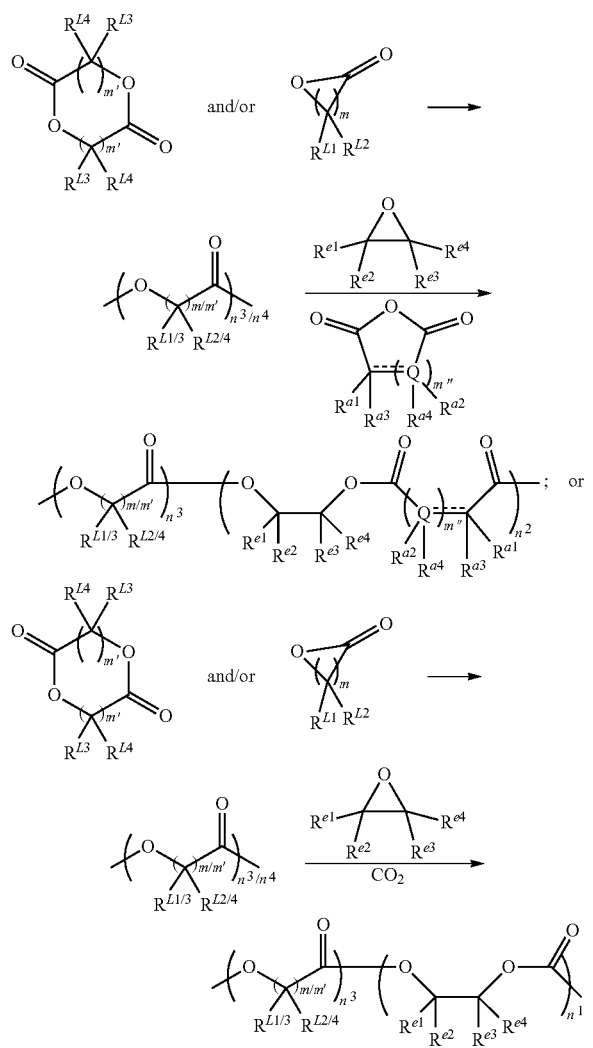

It will be appreciated that when the first block is prepared by ring opening a lactide and/or a lactone, a compound [Y] can be used to transform catalysts of formula (I) where —Z—R is not -E-R into catalysts where —Z—R is -E-R.

Alternatively, catalysts of formula (I) where —Z—R is —R (i.e. wherein E is absent) can be transformed into catalysts formula (I) where —Z—R is -E-R by contacting the catalyst of formula (I) with compound containing an alcohol, a thiol or a primary or secondary amine. For example, the compound may an aliphatic, heteroaliphatic, aryl, heteroaryl, alicyclic or heteroalicyclic group which is substituted by one or more (e.g. two or more) —OH, —SH, or —NHR$^Z$ groups. For instance, the compound may be isopropyl alcohol, 1, 2-cyclohenanediol, 1,2-ethylene glycol, 1,2-propylene glycol, 1,3-propylene glycol, benzyl alcohol, ethanol, methanol, n-propanol, a hexose, a pentose, poly(ethyleneglycol), etc. Thus, it is possible to produce the desired catalyst for step a) of the first aspect in situ.

In certain embodiments, the method of the first aspect further comprises the step of forming a third block by polymerising a third monomer or combination of monomers selected from the groups:
  Group (I): a lactide and/or a lactone;
  Group (ii): an epoxide and an anhydride; and
  Group (iii): an epoxide and carbon dioxide.

If Group (i) is added to the single catalytic system, the method may also comprise the step of contacting the single catalytic system with a compound [Y]. This may be done prior to, or at the same time as, contacting the single catalytic system with the third monomer or combination of monomers.

In certain embodiments, the third monomer or combination of monomers is different from the Group of monomer used to produce the first and second blocks. In other embodiments, the third monomer or combination of monomers is selected from the same group of monomer or combination of monomers used to produce the first block.

The tri-block copolymer produced may be an ABC block copolymer, i.e. each of the blocks is different. Alternatively, the tri-block copolymer may be an ABA block copolymer, i.e. when the first and the third blocks are the same.

The skilled person will also appreciate that the method according to the first aspect can also be used to produce block copolymers having four, five, six, seven, etc blocks, and that the order and identity of the blocks can be tailored accordingly. For example, the method of the first aspect may be used to produce block copolymers having alternating blocks, such as ABABA, or ABCABC. Alternatively, each of the blocks may be different.

It will be appreciated that for each of the various embodiments described for the first aspect, the single catalytic system may comprise any compound according to formula (I), and preferably comprises a compound of formula (IA).

In a second aspect, the present invention provides a method for producing a block copolymer, said block copolymer having a first and second block, using a single catalytic system, wherein the single catalytic system comprises a catalyst of formula (I):

Wherein:
[M] is a metal complex having at least one metal atom M coordinated by a ligand system;
M is Zn, Cr, Co, Mn, Mg, Fe, Ti, Ca, Ge, Al, Mo, W, Ru, Ni or V;
Z is absent, or is independently selected from -E-, -EX(E)-, or -EX(E)E-,
each E is independently selected from O, S or NR$^Z$, wherein R$^Z$ is H, or optionally substituted aliphatic, heteroaliphatic, alicyclic, heteroalicyclic, aryl, heteroaryl, alkylaryl or alkylheteroaryl;
X is C or S R is hydrogen, or optionally substituted aliphatic, heteroaliphatic, alicyclic, heteroalicyclic, aryl, heteroaryl, alkylaryl, alkylheteroaryl, silyl or a polymer; and when Z is absent, R may also be selected from halide, phosphinate, azide and nitrate;

the method comprising the steps of:

c) providing a mixture comprising:
  I. an epoxide;
  II. a first monomer or combination of monomers selected from a group (i) to (iii):
    Monomer (i): a lactide and/or a lactone,
    Monomer (ii): an anhydride, or
    Monomer (iii): carbon dioxide, and
  III. a second monomer or combination of monomers selected from a different group (i) to (iii) to that selected for the first monomer or combination of monomers:
    Monomer (i): a lactide and/or a lactone,
    Monomer (ii): an anhydride, or
    Monomer (iii): carbon dioxide; and
d) contacting the mixture with the single catalytic system;

wherein the rate of insertion of the first monomer or combination of monomers into the bond between the metal complex [M] and the ligand —Z—R is faster than the rate of insertion of the second monomer or combination of monomers into the bond between the metal complex [M] and the ligand —Z—R.

When the first monomer or combination of monomers is Group (i), either —Z—R is -E-R, or the mixture comprises a compound [Y].

When the second monomer or combination of monomers is Group (i), the mixture comprises a compound [Y].

By "one-pot", it is meant that the block copolymers are formed in situ, in the presence of the single catalytic system, without any sequential addition of monomer. In other words, all of the monomers are added to the reaction mixture, with the single catalyst system comprising a catalyst of formula (I), at the start of the reaction. The reaction will then selectively form block copolymers from the pool of monomers available, with exquisite selectivity.

The catalyst system can comprise a catalyst of formula (IA) as defined in the first aspect. The compound [Y] is as defined in the first aspect.

The inventors have discovered that nature of the polymer block formed will depend on the moiety at the end of the growing polymer chain attached to the metal complex [M], as well as the relative rates (r) at which each of the monomers insert into the bond between the metal complex and the ligand —Z—R. r depends on the rate constant of the monomer and the concentration of each of the components in the reaction mixture. The relative rates of insertion of the monomers can be determined by exposing one or more of the monomers to a catalyst of formula (I), and monitoring the rate at which the monomer(s) is consumed, or the rate at which polymer is produced. This can be done, for example, using quantitative spectroscopic or analytic techniques which are well known in the art, such as attenuated total reflectance IR spectroscopy (ATRIR), NMR, optical absorption spectroscopy, IR, or titration.

For example, when —Z—R is a group which is capable of polymerising a lactide and/or a lactone, an epoxide and carbon dioxide, and an epoxide and an anhydride (i.e. -E-R, in particular —O—R) the different rates of insertion may be represented as follows:

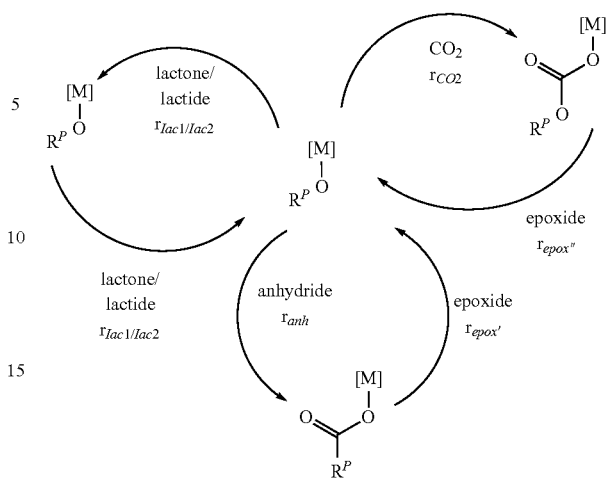

It will be appreciated that $R^P$ represents the growing polymer chain, and its' structure will depend on the identity of the monomers being polymerised. It will be understood that the relative rates of insertion will affect the order in which the blocks are produced.

In certain instances, $r_{anh}$ may be faster than $r_{CO2}$. Alternatively, $r_{CO2}$ may be faster than $r_{anh}$. In certain instances, $r_{lac1/lac2}$ is slower than both $r_{anh}$ and $r_{CO2}$, and faster than $r_{epox'}$ and $r_{epox''}$. However, $r_{lac1/lac2}$ may be faster than $r_{anh}$, $r_{CO2}$, $r_{epox'}$ and $r_{epox''}$. For the catalysts of the present invention, $r_{epox'}$ will be the same as, or similar to, $r_{epox''}$, and both will be slower than $r_{lac1/lac2}$, $r_{anh}$ and $r_{CO2}$.

In certain embodiments, for example, when the catalyst of formula (I) is a catalyst of formula (IA) as defined in the first aspect of the invention, $r_{anh} > r_{CO2} > r_{lac1/lac2} > r_{epox'} \approx r_{epox''}$.

In such embodiments of the second aspect, the first monomer or combination of monomers is an anhydride, and the second monomer or combination of monomers is carbon dioxide. In this case, the single catalyst system will initially selectively form a polyester block (a first block) by polymerising the epoxide and the anhydride. Once the anhydride has been consumed, the metal complex [M] at the end of the polyester chains can polymerise the carbon dioxide with any remaining epoxide to form a polycarbonate block (a second block). For a polyester block and a polycarbonate block to form, it is preferable for the initial reaction mixture to comprise a greater number of molar equivalents of epoxide than the number of molar equivalents of anhydride. In preferred embodiments, the number of molar equivalents of epoxide is 1, 2, 3, 4, 5, 6, 7, 8, 9 or 10 times greater than the number of molar equivalents of anhydride.

In an alternative of such embodiment, the first monomer or combination of monomers is an anhydride, and the second monomer or combination of monomers is a lactide and/or a lactone, in which case, the catalyst system will initially selectively form a polyester block (a first block) by polymerising the epoxide and the anhydride. The ring opening polymerisation will proceed to form a second block once the anhydride monomer has been consumed, and the moiety attached to the metal complex [M] has been converted from an ester (—OC(O)—R) to a group -E-R (preferably —O—R), by using a compound [Y]. The second block will also be a polyester, which is different to the first polyester block. For the above di-block polyester to form, it is preferable for the number of molar equivalents of epoxide, plus the number of molar equivalents of the compound [Y]

to be greater than the number of molar equivalents of anhydride. The compound [Y] is preferably an epoxide (which is preferably the same as the epoxide monomer used in the formation of the first block).

In a further alternative of such embodiment, the first monomer or combination of monomers is carbon dioxide and the second monomer or combination of monomers is a lactide and/or a lactone. In this instance, the catalyst system will initially selectively form a polycarbonate block (a first block) by polymerising the epoxide and the carbon dioxide. The ring opening polymerisation can proceed (thereby forming the second block, which is a polyester) once the carbon dioxide monomer has been consumed (or removed, for example, by the application of a vacuum), and the moiety attached to the metal complex [M] has been converted from a carbonate (—OC(O)O—R) to a group -E-R (preferably —O—R), by using a compound [Y]. Preferably, the number of molar equivalents of epoxide, plus the number of molar equivalents of the compound [Y] is greater than the number of molar equivalents of carbon dioxide. The compound [Y] is preferably an epoxide (which is preferably the same as the epoxide monomer used in the formation of the first block).

In a further alternative embodiment, the first monomer or combination of monomers is carbon dioxide and the second monomer or combination of monomers is an anhydride, in which case, the single catalytic system will initially selectively form a polycarbonate block first, before forming the polyester block (the second block). The initial reaction mixture preferably comprises a greater number of molar equivalents of epoxide than the number of molar equivalents of carbon dioxide.

In a further alternative embodiment, the first monomer or combination of monomers is a lactide and/or a lactone and the second monomer or combination of monomers is carbon dioxide or an anhydride. In this case, the single catalytic system will initially selectively form a first polyester block by ring opening the lactide and/or lactone. Once the lactide and/or lactone has been consumed, the single catalytic system can polymerise the epoxide and the carbon dioxide or anhydride in order to form a second block which is a polycarbonate or a polyester (which is different to the first block), respectively.

In a further embodiment of the second aspect, the reaction mixture comprises a third monomer or combination of monomers selected from a group which is different from the first and second monomers or combination of monomers:
Monomer (i): a lactide and/or a lactone,
Monomer (ii): an anhydride, or
Monomer (iii): carbon dioxide.

Where the rate of insertion of the first and second monomers are as previously described, and where the rate of insertion of the third monomer or combination of monomers into the bond between the metal complex [M] and the ligand —Z—R is slower than both the rate of insertion of the first monomer or combination of monomers into the bond between the metal complex [M] and the ligand —Z—R, and the rate of insertion of the second monomer or combination of monomers into the bond between the metal complex [M] and the ligand —Z—R.

When the third monomer or combination of monomers is Monomer (i), the reaction mixture will comprise a compound [Y].

In certain embodiments, when the first monomer or combination of monomers is an anhydride, the second monomer or combination of monomers is carbon dioxide and the third monomer or combination of monomers is a lactide and/or a lactone, the single catalytic system will initially selectively form a first block (which is a polyester) from the pool of monomers by polymerising the anhydride and the epoxide. Once the anhydride has been consumed, the catalytic system can selectively polymerise the remaining epoxide and the carbon dioxide, thereby forming a second block, which is a polycarbonate. The ring opening of the lactide and/or lactone can proceed to form a third block once the carbon dioxide monomer has been consumed (or removed, for example by the application of a vacuum), and the moiety attached to the metal complex [M] has been converted from a carbonate (—OC(O)O—R) to a group -E-R (preferably —O—R), by using a compound [Y]. It will be appreciated that the third block will be a polyester, which is different to the first block. The number of molar equivalents of epoxide, plus the number of molar equivalents of the compound [Y] is preferably greater than the number of molar equivalents of anhydride, plus the number of molar equivalents of carbon dioxide. The compound [Y] is preferably an epoxide (which is preferably the same as the epoxide monomer used in the formation of the first and second blocks).

In an alternative embodiment, the first monomer or combination of monomers is carbon dioxide, the second monomer or combination of monomers is an anhydride and the third monomer or combination of monomers is a lactide and/or a lactone, in which case the single catalytic system will initially selectively form a first block (which is a polycarbonate) from the pool of monomers by polymerising the carbon dioxide and the epoxide. Once the carbon dioxide has been consumed (or removed, for example by application of a vacuum), the catalytic system can selectively polymerise the remaining epoxide and the anhydride, thereby forming a second block, which is a polyester. The ring opening of the lactide and/or lactone will then proceed to form a third block after the anhydride monomer has been consumed, and the moiety attached to the metal complex [M] has been converted from a carbonate (—OC(O)O—R) to a group -E-R (preferably —O—R), by using a compound [Y]. Preferably, the number of molar equivalents of epoxide, plus the number of molar equivalents of the compound [Y] is preferably greater than the number of molar equivalents of anhydride, plus the number of molar equivalents of carbon dioxide. The compound [Y] is preferably an epoxide (which is preferably the same as the epoxide monomer used in the formation of the first and second blocks).

In a further alternative embodiment, first monomer or combination of monomers is a lactide and/or a lactone, the second monomer or combination of monomers is carbon dioxide and the third monomer or combination of monomers is an anhydride, in which case the single catalytic system will initially ring open the lactide and/or lactone in order to form a polyester block (a first block). Once the lactide and/or lactone has been consumer, the single catalytic system can polymerise the epoxide and the carbon dioxide, thereby forming a polycarbonate block (a second block). After the carbon dioxide has been consumed (or removed, for example by application of a vacuum), the catalytic system can selectively polymerise the remaining epoxide and the anhydride, thereby forming a third block, which is a polyester that is different from the first block. Preferably, the number of molar equivalents of epoxide is greater than the number of molar equivalents of carbon dioxide.

In a further alternative embodiment, first monomer or combination of monomers is a lactide and/or a lactone, the second monomer or combination of monomers is an anhydride and the third monomer or combination of monomers is carbon dioxide, in which case the single catalytic system will initially ring open the lactide and/or lactone in order to form a polyester block (a first block). Once the lactide and/or lactone has been consumed, the single catalytic system can polymerise the epoxide and the anhydride, thereby forming a second block which is a polyester that is different from the first block. Once the anhydride has been consumed, the catalytic system can selectively polymerise the remaining epoxide and the carbon dioxide, thereby forming a third block, which is a polycarbonate.

In particularly preferred embodiments:
the first monomer or combination of monomers is anhydride and the second monomer or combination of monomers is carbon dioxide;
the first monomer or combination of monomers is an anhydride and the second monomer or combination of monomers is a lactide and/or lactone;
the first monomer or combination of monomers is carbon dioxide and the second monomer or combination of monomers is a lactide and/or lactone; and
the first monomer or combination of monomers is anhydride, the second monomer or combination of monomers is carbon dioxide, and the third monomer or combination of monomers is a lactide and/or lactone.

In each of the above embodiments of the second aspect, the anhydride is preferably phthalic anhydride, the epoxide is preferably cyclohexeneoxide, the lactide and/or lactone is preferably caprolactone and the compound [Y] is preferably cyclohexeneoxide. Furthermore, the single catalytic system preferably comprises a catalyst of formula (IA), more preferably, $[L^1Zn_2(OAc)_2]$ or $[L^1Zn_2(OiPr)_2]$.

In a third aspect of the invention, there is provided a method for producing a polyester, comprising contacting a lactone and/or a lactide with a catalyst system having a catalyst of formula (IA):

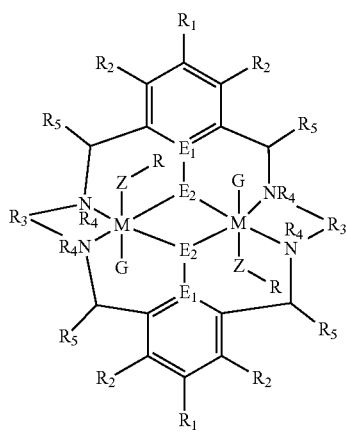

(IA)

wherein
$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;
$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;
$R_4$ is H, or optionally substituted aliphatic, heteroaliphatic, alicyclic, heteroalicyclic, aryl, heteroaryl, alkylheteroaryl or alkylaryl;
$R_5$ is H, or optionally substituted aliphatic, heteroaliphatic, alicyclic, heteroalicyclic, aryl, heteroaryl, alkylheteroaryl or alkylaryl;
$E_1$ is C, $E_2$ is O, S or NH or $E_1$ is N and $E_2$ is O;
R is hydrogen, or optionally substituted aliphatic, heteroaliphatic, alicyclic, heteroalicyclic, aryl, heteroaryl, alkylaryl, alkylheteroaryl silyl, or a polymer;
Z is -E-;
E is —O—, —S—, or $NR^Z$, wherein is H, or optionally substituted aliphatic, heteroaliphatic, alicyclic, heteroalicyclic, aryl, heteroaryl, alkylaryl or alkylheteroaryl;
each G is independently absent or a neutral or anionic donor ligand which is a Lewis base; and
M is Zn(II), Cr(II), Co(II), Mn(II), Mg(II), Fe(II), Ti(II), Cr(III)-Z—R, Co(III)-Z—R, Mn (III)-Z—R, Fe(III)-Z—R, Ca(II), Ge(II), Al(III)-Z—R, Ti(III)-Z—R, V(III)-Z—R, Ge(IV)-(—Z—R)$_2$ or Ti(IV)-(—Z—R)$_2$.

In a fourth aspect of the invention, there is provided method for producing a polyester, comprising contacting an anhydride and an epoxide with a catalyst system having a catalyst of formula (IA):

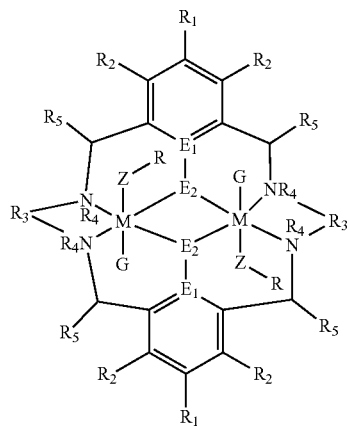

(IA)

wherein
$R_1$ and $R_2$ are independently hydrogen, halide, a nitro group, a nitrile group, an imine, an amine, an ether group, a silyl ether group, a thioether group, a sulfoxide group, a sulfinate group, or an acetylide group or an optionally substituted alkyl, alkenyl, alkynyl, haloalkyl, aryl, heteroaryl, alicyclic or heteroalicyclic;
$R_3$ is optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene may optionally be interrupted by aryl, heteroaryl, alicyclic or heteroalicyclic;
$R_4$ is H, or optionally substituted aliphatic, heteroaliphatic, alicyclic, heteroalicyclic, aryl, heteroaryl, alkylheteroaryl or alkylaryl;
$R_5$ is H, or optionally substituted aliphatic, heteroaliphatic, alicyclic, heteroalicyclic, aryl, heteroaryl, alkylheteroaryl or alkylaryl;
$E_1$ is C, $E_2$ is O, S or NH or $E_1$ is N and $E_2$ is O;
Z is absent, or is selected from -E-, -EX(E)-, or -EX(E)E-;
X is S or C;

E is —O—, —S—, or NR$^Z$, wherein is H, or optionally substituted aliphatic, heteroaliphatic, alicyclic, heteroalicyclic, aryl, heteroaryl, alkylaryl or alkylheteroaryl;

R is hydrogen, or optionally substituted aliphatic, heteroaliphatic, alicyclic, heteroalicyclic, aryl, heteroaryl, alkylaryl, alkylheteroaryl, or silyl, or a polymer; and when Z is absent, R may additional be selected from halide, phosphinate, azide and nitrate;

each G is independently absent or a neutral or anionic donor ligand which is a Lewis base; and M is Zn(II), Cr(II), Co(II), Mn(II), Mg(II), Fe(II), Ti(II), Cr(III)-Z—R, Co(III)-Z—R, Mn (III)-Z—R, Fe(III)-Z—R, Ca(II), Ge(II), Al(III)-Z—R, Ti(III)-Z—R, V(III)-Z—R, Ge(IV)-(—Z—R)$_2$ or Ti(IV)-(—Z—R)$_2$.

The preferred embodiments of the complex of formula (IA) described in the first aspect apply equally to the second, third and fourth aspects.

The preferred embodiments of the compound [Y] as described in the first aspect apply equally to the second aspect.

The methods of the first, second, third and fourth aspects may be carried out in the presence of a solvent. Examples of solvents useful in the first, second, third and fourth aspects include toluene, diethyl carbonate, dimethyl carbonate, dioxane, dichlorobenzene, methylene chloride, propylene carbonate, ethylene carbonate, etc.

In each of the methods of the first, second, third and fourth aspects, the catalyst system may comprise a chain transfer agent.

The chain transfer agent may be any chain transfer agent as defined in WO 2013/034750, the entire contents of which are hereby incorporated by reference. Exemplary chain transfer agents include water, an amine, an alcohol, a thiol, a phosphinate and a carboxylic acid.

The chain transfer agent may be present in a molar ratio of at least 1:1 relative to the metal complex (catalyst of formula (I)). For example, the chain transfer agent is present in a molar ratio of at least 2:1, at least 4:1, at least 8:1, at least 16:1, at least 32:1 or at least 64:1 relative to the metal complex.

The chain transfer agent may be used to control the molecular weight ($M_n$) of the polymers produced by the process of the first, second, third and fourth aspects. Preferably, the molecular weight ($M_n$) of the polymers is from about 1,000 g/mol to about 100,000 g/mol. The molecular weight of the polymers produced can be measured by Gel Permeation Chromatography (GPC) using, for example, a GPC-60 manufactured by Polymer Labs, using THF as the eluent at a flow rate of 1 ml/min on Mixed B columns, manufactured by Polymer Labs. Narrow molecular weight polystyrene standards can be used to calibrate the instrument.

The chain transfer agent may also be used to form polymers produced by the process of first, second, third and fourth aspects which are terminated by hydroxyl groups (i.e. polyol polycarbonates/polyesters). The hydroxyl terminated polymers may be used to produce other polymeric products, such as polyurethane.

In certain embodiments of the first, second, third and fourth aspects, the monomers (i.e. the epoxide, anhydride, lactide and/or lactone) may be purified, for example by distillation, such as over calcium hydride, prior to being used of the methods according to the first, second, third and fourth aspects.

The method of the first, second third and fourth aspects of the invention may be carried out at a temperature of about 0° C. to about 200° C., for example, from about 25° C. to about 140° C., such as from about 50° C. to about 140° C. preferably from about 60° C. to about 100° C. The duration of the process may be up to 168 hours preferably 1 to 24 hours.

The method of the first, second, third and fourth aspects of the invention may be carried out at low catalytic loading, for example, the catalytic loading for the process is preferably in the range of 1:1,000-100,000 catalyst:monomer, more preferably in the region of 1:1,000-50,000 catalyst:monomer, even more preferably in the region of 1:1, 1000-10,000, and most preferably in the region of 1:10,000 catalyst:monomer.

The methods of the first, second, third and fourth aspects may be carried out in the presence of a gas. For example, when the inventive methods comprise $CO_2$ as a reagent, the $CO_2$ may be present alone, or in combination with another gas, such as nitrogen. The methods may be carried out at low pressures, such as 1 atm gas (e.g. 1 atm $CO_2$). However, the methods may also be carried out at pressures above 1 atm, such as 40 atm gas (e.g. 40 atm $CO_2$).

In a fifth aspect of the invention, there is provided a polymer obtainable from the method according to the first, second, third or fourth aspects.

It will be appreciated that the various preferred features described above for formula (IA) may be present in combination *mutatis mutandis*.

EXAMPLES

Example 1

Figure 1:
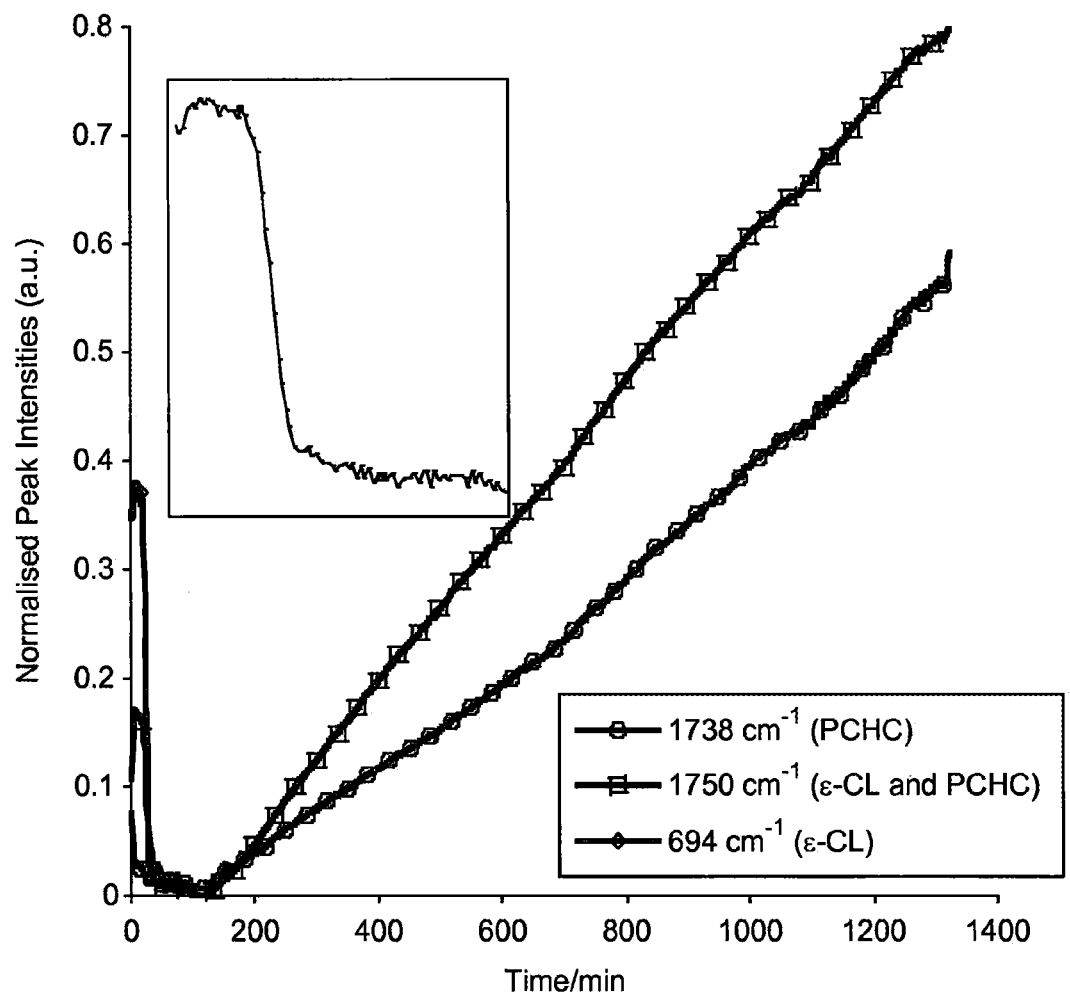
FIG. 1: ATR-IR analysis of PCL-PCHC formation, showing normalised peak intensities for absorptions at 694, 1738 and 1750 cm−1 against time/min.

Ring Opening Polymerisation of a Lactone and Copolymerisation of an Anhydride and an Epoxide Previous studies have shown that complex 1 is an excellent catalyst for the copolymerization of carbon dioxide and cyclohexene oxide (CHO) to yield poly(cyclohexylene carbonate) (PCHC), with a high fidelity (>95%) of carbonate repeat units. Complex 2 was selected as a pre-catalyst from which a range of different catalysts could be prepared by reaction between the phenyl substituents and protic reagents. For example, the reaction between complex 2 and iPrOH yields the di-zinc di-i-propoxide complex, in situ, with release of benzene.

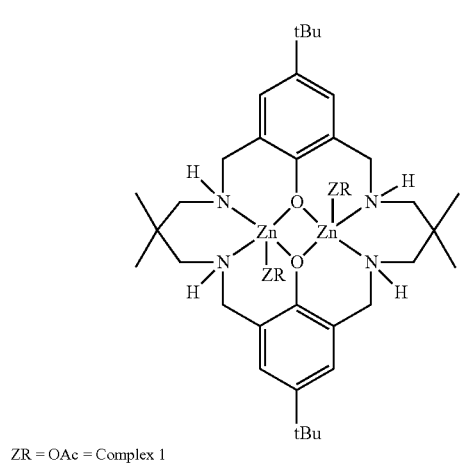

ZR = OAc = Complex 1
ZR = Ph = Complex 2

Complex 2 is capable of copolymerising CHO/$CO_2$, yielding PCHC with an equivalent TON and TOF to 1 (~400, 20, respectively), and >99% of carbonate linkages in the copolymer. The copolymerization is also highly efficient, yielding 98% polymer, with just 2% cyclohexene carbonate by-product.

Catalyst 2, in combination with four equivalents of iPrOH, is an excellent catalyst system for caprolactone (ε-CL) ring-opening polymerisation (ROP), producing poly(caprolactone) (PCL) with a high TON (460)/TOF (2300 h-1), as complex 2 reacts with iPrOH in situ to form $[L^1Zn_2(O^iPr)_2]$.

The PCL has an Mn of 30,000 g/mol.

In contrast, the ROP of caprolactone does not proceed at all using catalyst 1, when ε-CL is used alone, or in combination with iso-propyl alcohol. Furthermore, exposure of the initiating system 2/$^i$PrOH and ε-CL to 1 bar pressure of $CO_2$ completely deactivates the catalyst and prevents any ROP occurring.

Thus, it can be seen that for ε-CL ROP alkoxide groups can initiate polymerization, whereas carbonate and carboxylate groups cannot.

Complexes 1 and 2 are also efficient catalyst for the copolymerization of CHO and phthalic anhydride (PA), yielding the polyester poly(cyclohexylene phthalic)ester (PCHPE), with a high TON (1000)/TOF (50 h$^{-1}$) and high proportion of ester chain linkages (>99%).

TABLE 1

Performance of Catalysts 1 and 2 for Polyester and Polycarbonate Formation

| Monomers | Catalyst | Time (h) | TON[a] | TOF[b] (h$^{-1}$) | Mn[c] (g · mol$^{-1}$) | PDI[c] |
|---|---|---|---|---|---|---|
| CHO/$CO_2$[d] | 1 | 24 | 439 | 18 | 6200 | 1.19 |
| CHO/$CO_2$[d] | 2 | 20 | 408 | 20 | 5035 | 1.08 |
| ε-CL[e] | 1 + iPrOH | 24 | — | — | — | — |
| ε-CL[e] | 2 + iPrOH | 0.2 | 460 (92%) | 2300 | 30,000 | 1.47 |

[a]Turn-over-number (TON) = moles monomer consumed/moles catalyst added, where moles monomer consumed is determined from the % conversion observed in the $^1$H NMR spectrum of the crude polymer,
[b]Turn-over-frequency (TOF) = TON/time (h),
[c]Determined by size exclusion chromatography, calibrated against narrow Mw Polystyrene standards (see ESI).
[d]Polymerization conducted at 80° C., 1 bar $CO_2$ pressure, 0.1 mole % catalyst in neat CHO.
[e]Polymerization conducted at 80° C., 0.2 mole % catalyst, 0.8 mole % iPrOH (4 eq.) in neat ε-CL.
f) Polymerization conducted at 100° C., 0.1 mole % catalyst in 1:9 mixture of pthalic anhydride:cyclohexene oxide,
g) based on PA conversion.

The PCHPE has an $M_n$ of 4000 g/mol, and a narrow PDI (1.33).

Example 2

Preparing a poly(caprolactone-co-cyclohexylene carbonate) Block Copolymer by Sequential Monomer Addition Reacting complex 2 (as set out in Example 1), with 4 eq. iPrOH, results in a catalyst having a zinc alkoxide propagating species. ε-CL dissolved in CHO is exposed to this catalyst system, resulting in formation of PCL. After 120 minutes, 1 bar pressure of $CO_2$ is added to the polymerization system.

Scheme 5: Synthesis of block poly(caprolactone-co-cyclohexylene carbonate) PCL-co-PCHC. Reagents and Conditions: i) 0.1 mol% 2, 0,4 mol% iPrOH in neat ε-CL: CHO, 1:9, 80 C., 2h. ii) 1 bar $CO_2$ pressure, 20h.

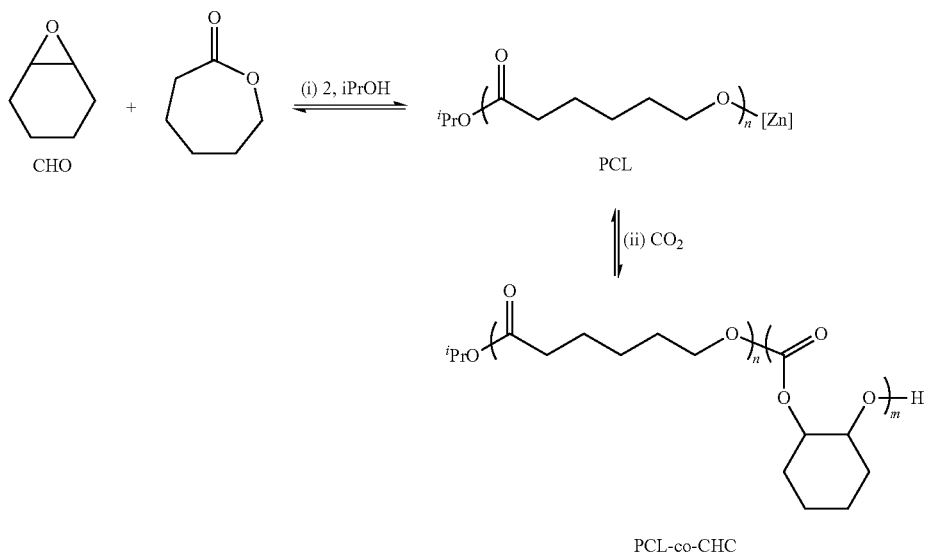

FIG. 1 illustrates the ATR-IR analysis of the polymerization. Initially, ε-CL is polymerized; this can be observed the sharp decrease in intensity of the absorptions at 694 and 1750 cm−1 (inset FIG. 1) due to ε-CL. The complete consumption of ε-CL occurs over just 20 minutes. After 120 minutes, (>5 half-life), 1 bar pressure of $CO_2$ is added to the polymerization system. The ATR-IR analysis shows the immediate formation of polycarbonate, as observed by the increasing intensity of signals at 1750 and 1738 cm$^{-1}$.

The polymerization was stopped after 24 h, the only product was poly(caprolactone-co-cyclohexylene carbonate) PCL-PCHC by GPC. The TON and TOF for the carbonate block formation are 460 and 23 h$^{-1}$, respectively and the carbonate block shows a very high fidelity of carbonate repeat units(>99%).

The block copolymer has Mn of 5170 g/mol, PDI=1.27. Analysis of the integrals for the PCHC vs PCL blocks, in the $^1$H NMR spectrum, shows an approximate composition of 3:1, PCHC:PCL, which matches well with the composition predicted on the basis of stoichiometry (3.5:1).

Example 3

Preparing a poly(caprolactone-co-cyclohexylene carbonate) Block Copolymer by Sequential Monomer Addition Cyclohexene oxide (2.2 mL, 21.5 mmol), ε-caprolactone (277 μL, 2.5 mmol) and complex 1 (20 mg, 25.0 μmol) were added to a Schlenk tube. The vessel was heated at 353 K, under $N_2$, for 1 h then de-gassed and 1 bar of $CO_2$ was added. The vessel was heated for 20 h. A sample of the crude product was analysed by $^1$H NMR spectroscopy to determine the conversion and selectivity. Any unreacted monomers were removed, in vacuo, to yield the product as a white powder. $M_n$=4,810, PDI=1.28.

Example 4

Production of Di-Block and Tri-Block Copolymers

It can be seen from Example 2 that catalyst 2 can selectively polymerize ε-CL, in the presence of CHO, to produce PCL with good control of the $M_n$. Removal of an aliquot from the polymerization after 120 mins, shows complete consumption of the ε-CL monomer and formation of PCL of $M_n$ 6950 g/mol (PDI: 1.51).

The zinc-alkoxide polymer chain end can be further reacted with 50 eq. of phthalic anhydride (vs. 800 equivalents of CHO) to produce a block copolyester (PCL-CHPE). Removal of an aliquot from the reaction mixture after 400 mins shows the complete consumption of PA has occurred yielding a diblock copolyester with $M_n$ 7360 g/mol (PDI: 1.62). Using an excess of CHO ensures that the growing polymer chain end is a zinc alkoxide species (vs. a zinc carboxylate which would be formed if excess PA were applied). This zinc alkoxide species was reacted with a further 200 equivalents of ε-CL to produce an ABA type triblock copolyester (PCL-PCHPE-PCL). The triblock copolymer has an Mn 12680 g/mol (PDI: 1.70).

An ABC type block copolyester carbonate is produced by reacting ε-CL with catalyst 2/iPrOH catalyst system, in CHO, to produce a zinc alkoxide chain terminated PCL dissolved in CHO. This PCL is then reacted with 50 eq. of PA, and the zinc alkoxide species initiates the copolymerization of CHO and PA. Because CHO is present in excess and the reaction is run to complete consumption of PA, the growing polymer chain is terminated by a zinc alkoxide species. The diblock polymer is then exposed to 1 bar pressure of carbon dioxide, and the copolymerization of carbon dioxide and CHO progresses to form a PCL-PCHPE-PCHC, an ABC type copolymer.

Scheme 6: Illustrates the synthesis of various block copolymers, including PCL-co-CHPE, PCL-co-CHPE-co-CL (ABA) and PCL-co-CHPE-co-CHC (ABC). Reagents and conditions: (i) 0.1 mol% catalyst 2 (0.4 mol% iPrOH) in neat ε-CL:CHO, 1:4,100° C. (ii) 50 eq. PA, 100° C. (iii) 1 bar CO2, 100° C., (iv) 200 eq. ε-CL, 100° C.

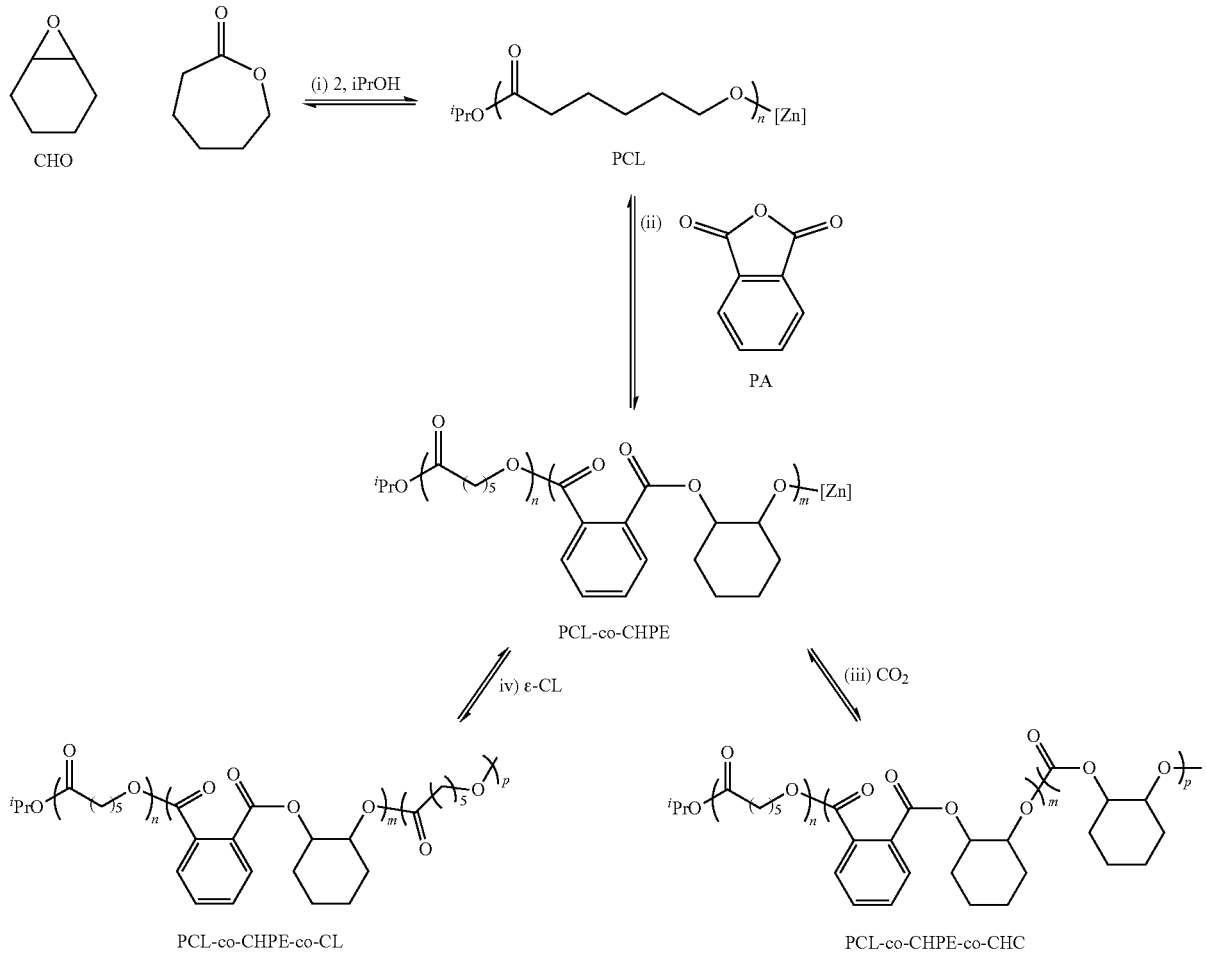

Example 5

Production of Di-Block Using Complex 1

Complex 1 (10.0 mg, 1.25×10$^{-2}$ mmol), phthalic anhydride (37.0 mg, 0.25 mmol) and ε-CL (210.0 μL, 1.88 mmol) were dissolved in CHO (505.0 μL, 5.00 mmol) under N$_2$ protection in a screw vial charged with a stir bar. The mixture was then heated to 100° C. and left to react under inert atmosphere for 2 h. The relative molar ratio of [Zinc cat.]/[CHO]/[PA]/[ε-CL] were as described in Table 2. The obtained block copolymers were precipitated using cold MeOH.

Scheme 7: Synthesis route of PCHPE-b-PCL using mixed monomer feedstock..

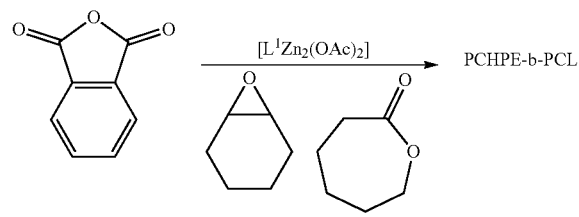

TABLE 2

Synthesis of PCHPE-b-PCL from a mixed monomer feedstock of CHO, PA and ε-CL.

| Entry | [cat.]/[CHO]/[PA]/[ε-CL] | TOF of PA (h$^{-1}$) | $M_n$ (kDa) | $M_w/M_n$ |
|---|---|---|---|---|
| 1 | 1/500/20/100 | ~13 | 12.2 | 1.42 |
| 2 | 1/500/20/150 | ~13 | 15.8 | 1.43 |
| 3 | 1/500/20/200 | ~13 | 18.7 | 1.57 |
| 4 | 1/500/10/150 | ~10 | 22.5 | 1.46 |
| 5 | 1/500/40/150 | ~14 | 28.0 | 1.52 |
|   |   |   | 3.9 | 1.03 |

Figure 2:
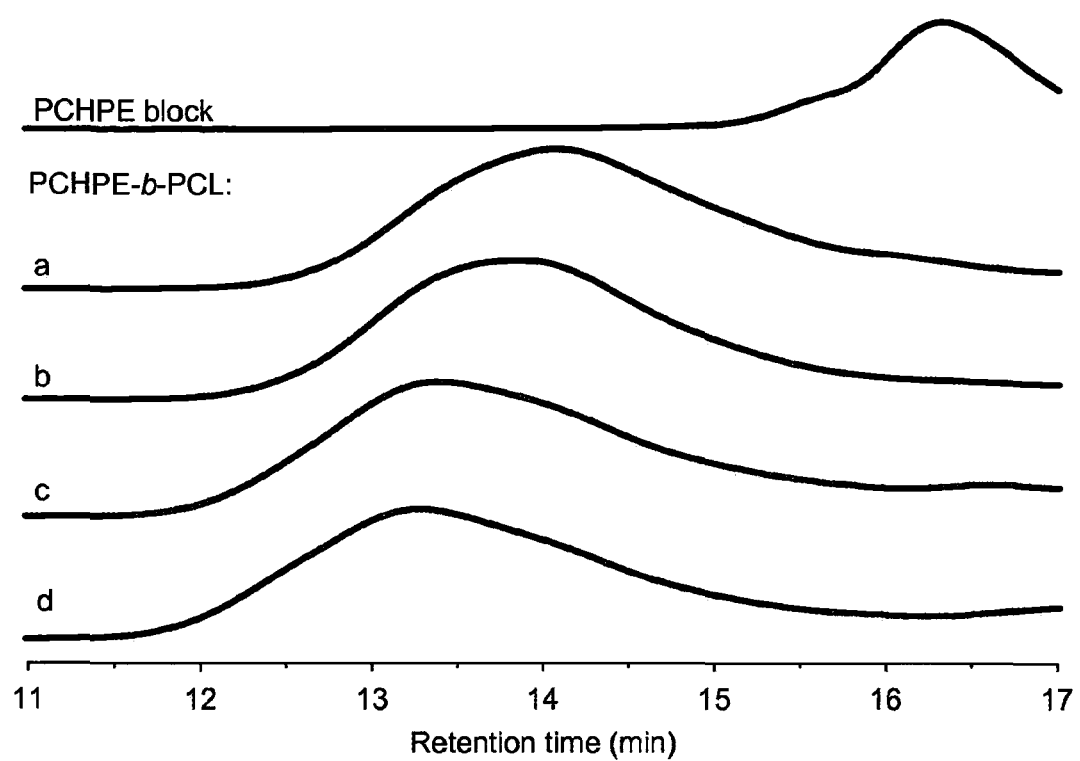
FIG. 2: GPC traces of PCHPE-b-PCL and PCHPE block copolymer. Curves a-d correspond to entries 1-4 in Table 2, respectively.

FIG. 2 shows GPC traces of PCHPE-b-PCL and PCHPE blocks. Curves a-d correspond to entries 1-4 in Table 2, respectively.

Figure 3:
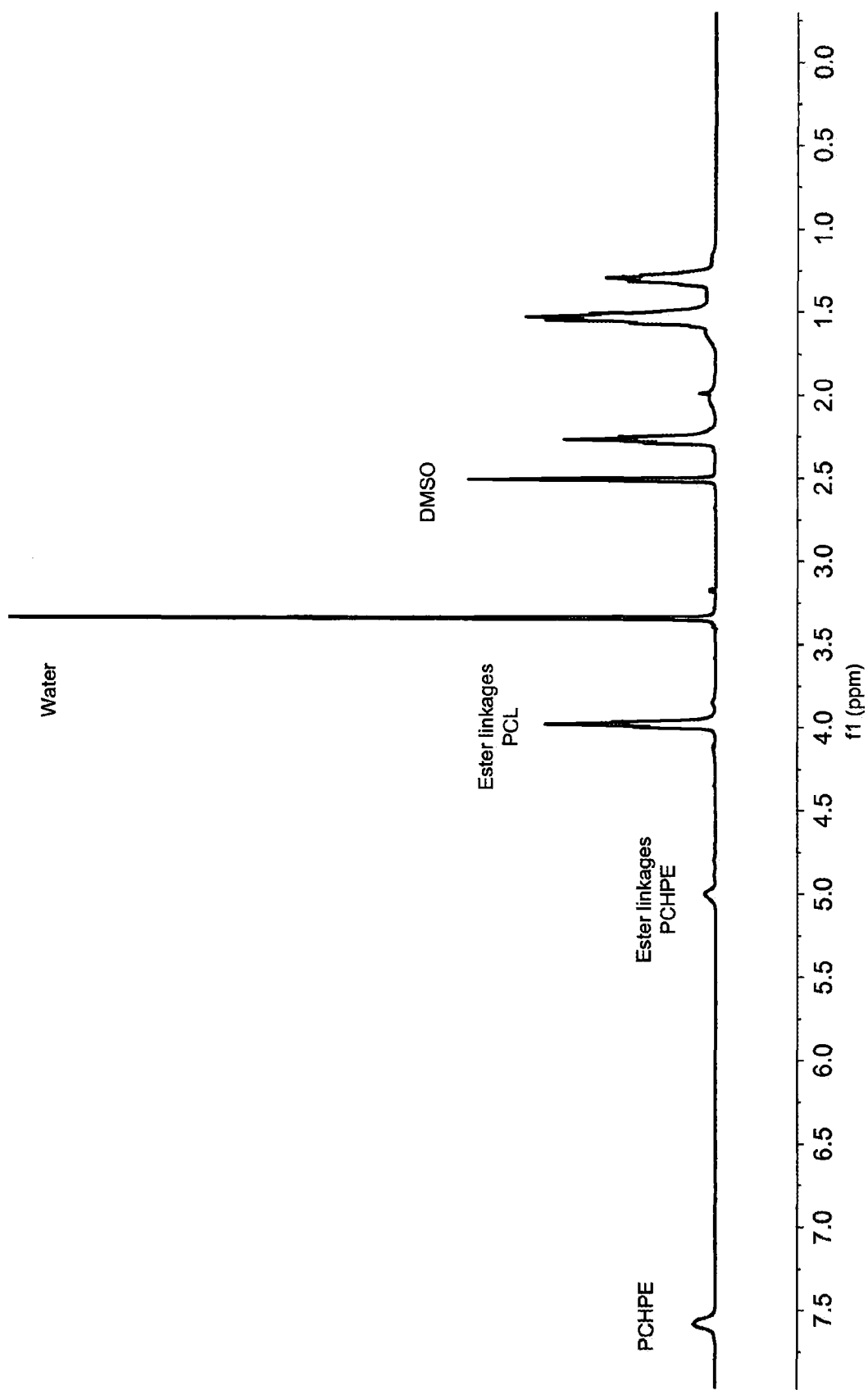
FIG. 3: $^1$H NMR spectrum (CDCl$_3$, 298 K) of PCHPE-PCL copolymer. The plot illustrates the formation of both POPE and PCL blocks.

FIG. 3 shows $^1$H NMR spectrum (CDCl$_3$, 298 K) of the PCHPE-PCL copolymer. The plot illustrates the formation of both PCHPE and PCL blocks.

Example 6

Ring Opening of Cyclic Esters

The following reactions demonstrate the ring opening of lactides and lactones using the catalysts of the invention.

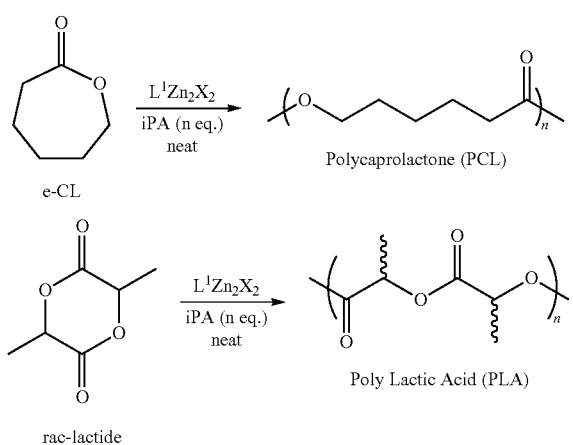

TABLE 3

Polyester formation via ROP of cyclic esters.

| X | Monomer | cat./$^i$PA/M | T (° C.) | Time (h) | Conv.$^a$ (%) | $M_n{}^b$ (g·mol$^{-1}$) | PDI$^b$ |
|---|---|---|---|---|---|---|---|
| OAc | ε-CL | 1/4/500 | 80 | 2 h 30 | 0 | — | — |
| OAc | rac-LA | 1/4/500 | 80 | 24 h | 0 | — | — |
| C$_6$H$_5$ | ε-CL$^c$ | 1/4/500 | 80 | <10 mn | 91.7 | 29970 | 1.47 |
| C$_6$H$_5$ | ε-CL | 1/4/500 | r.t. | 23 h$^e$ | >99 | 41480 | 1.40 |
| C$_6$H$_5$ | rac-LA$^d$ | 1/4/200 | 80 | 15 h$^e$ | >99 | 12585 | 1.30 |
| C$_6$H$_5$ | rac-LA | 1/4/200 | r.t. | 2 h | 96.6 | 11125 | 1.16 |
| C$_6$H$_5$ | rac-LA | 1/-/200 | r.t. | 2 h | 92.6 | 28185 | 1.49 |

Reaction conditions: [M]$_0$ = 1M, DCM as solvent;
$^a$Determined by $^1$H NMR spectroscopy;
$^b$Determined by GPC with polystyrene standards;
$^c$neat, ε-CL as solvent;
$^d$toluene as solvent;
$^e$non-optimized time.

Example 7

Ring Opening of Cyclic Esters Initiated by Complex 1/Epoxide System

The following reactions demonstrate the ring opening of lactides and lactones using the catalysts of the invention in the presence of epoxide.

i. Controlled Polymerization of ε-CL Initiated by Complex1/Epoxide System

Cyclohexene oxide (2.55 mL, 25 mmol), ε-caprolactone (0.831 mL, 7.5 mmol) and L$^1$Zn$_2$OAc$_2$ (10 mg, 0.0125 mmol) were added to a Schlenk tube. The vessel was heated at 80° C. as described in Table 4. The unreacted monomers were removed in vacuo.

TABLE 4

Polyester formation via ROP of cyclic esters

| Time (min) | Conv.$^a$ (%) | $M_n{}^b$ (g·mol$^{-1}$) | PDI$^b$ |
|---|---|---|---|
| 20 | 9.8 | 6,000 | 1.23 |
| 30 | 26.5 | 17,500 | 1.25 |
| 34 | 33.3 | 19,100 | 1.19 |
| 38 | 53.8 | 35,900 | 1.28 |
| 42 | 66.5 | 44,500 | 1.38 |
| 46 | 86 | 59,000 | 1.33 |
| 56 | 93.0 | 65,600 | 1.34 |

Reaction conditions: Mixed monomer as solvent, 80° C., L$^1$Zn$_2$(OAc)$_2$ as catalyst, cat/CHO/eCL = 1/2000/600;
$^a$Conversion of monomer determined by $^1$H NMR spectroscopy;
$^b$Experimental $M_n$ determined by GPC in THF, using polystyrene standards and times correction factor 0.54 for PLA to determine absolute molecular weight.

Figure 4:
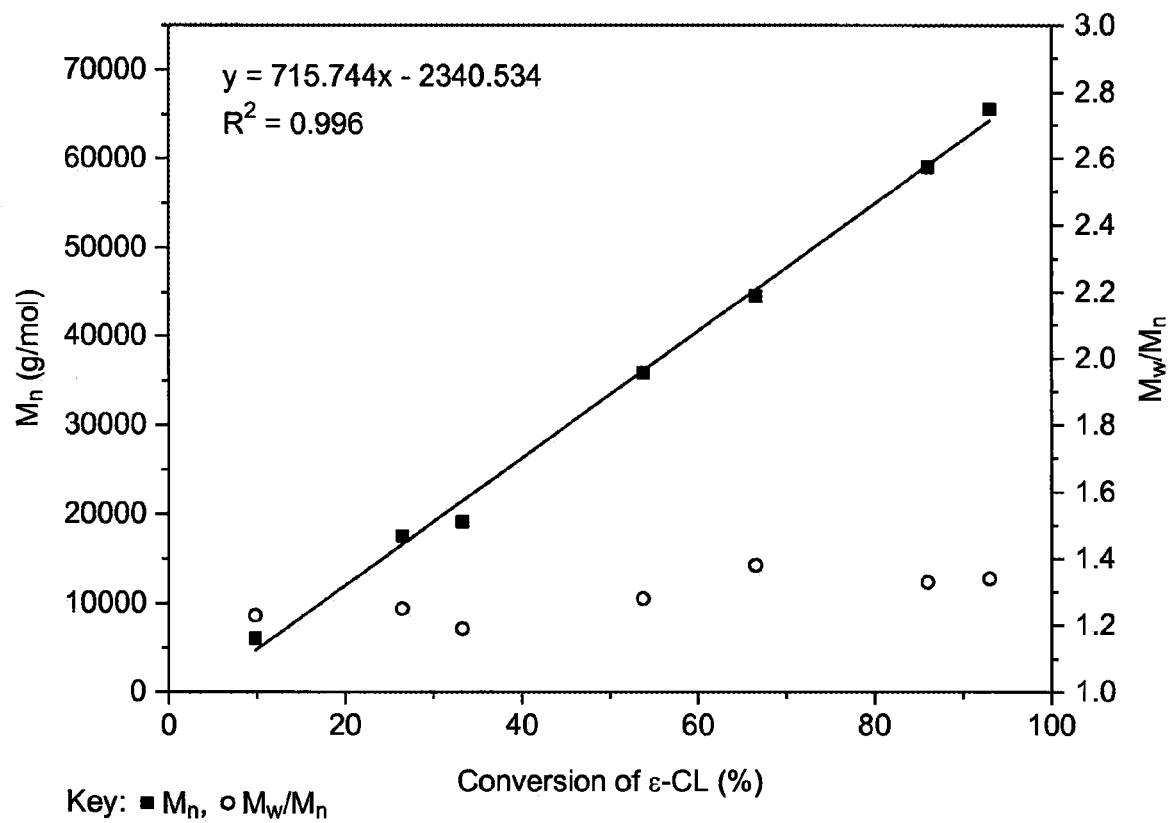
FIG. 4: $M_n$ and $M_w/M_n$ vs mol % of ε-CL conversion of PCL homopolymer catalysed by [L$^1$Zn$_2$(OAc)$_2$]/CHO system at 80° C.

FIG. 4 shows $M_n$ and $M_w/M_n$ vs mol % of ε-CL conversion of PCL homopolymer catalyzed by [L$^1$Zn$_2$(OAc)$_2$]/CHO system at 80° C.

ii. Variation of Ratio Catalyst/Epoxide for ε-CL ROP.

L$^1$Zn$_2$OAc$_2$ (15 mg, 0.0188 mmol), cyclohexene oxide, ε-caprolactone and toluene were added to a Schlenk tube (molar ratio cat/CHO/ε-CL as described in Table 5). The vessel was heated at 80° C. as described in Table 5. The unreacted monomers were removed in vacuo.

TABLE 5 eCL polymerisation initiated by catalyst/epoxide systems

| Cat | cat./CHO/eCL | Temp. (° C.) | Conc. | Time (h) | Conv$^a$ (%) | $M_n{}^b$ (g/mol) | PDI$^d$ |
|---|---|---|---|---|---|---|---|
| L$^1$Zn$_2$OAc$_2$ | 1/0/100 | 80 | 1M | 5 | 0 | — | — |
| L$^1$Zn$_2$OAc$_2$ | 1/5/100 | 80 | 1M | 5 | 88 | 11500 | 1.41 |
| L$^1$Zn$_2$OAc$_2$ | 1/10/100 | 80 | 1M | 5 | 86 | 10500 | 1.25 |
| L$^1$Zn$_2$OAc$_2$ | 1/20/100 | 80 | 1M | 5 | 88 | 8300 | 1.36 |
| L$^1$Zn$_2$OAc$_2$ | 1/50/100 | 80 | 1M | 5 | 87 | 7300 | 1.31 |
| L$^1$Mg$_2$OAc$_2$ | 1/10/100 | 80 | 1M | 5 | 100 | 8150 | 1.25 |
| L$^1$Mg$_2$OAc$_2$ | 1/20/100 | 80 | 1M | 5 | 100 | 6300 | 1.66 |
| L$^1$Mg$_2$OAc$_2$ | 1/50/100 | 80 | 1M | 5 | 93 | 4500 | 1.41 |

$^a$Conversion of monomer determined by $^1$H NMR spectroscopy;
$^b$Experimental $M_n$ determined by GPC in THF, using polystyrene standards and times correction factor 0.56 for eCL to determine absolute molecular weight;
$^c$Calculated $M_n$ value obtained from the relation [eCL]/[cat.] × conv × 114/2 (Assuming two polymer chains formed per catalyst);
$^d$$M_w/M_n$;
$^e$Calculated $M_n$ value obtained from the relation [eCL]/[cat.] × conv × 114 iii. Polymerization of Rac-Lactide Initiated by Catalyst/Epoxide Systems $L^1Zn_2OAc_2$ (15 mg, 0.0188 mmol), cyclohexene oxide, rac-lactide and toluene were added to a Schlenk tube (molar ratio cat/CHO/LA as described in Table 6). The vessel was heated at 80° C. as described in Table 6. The unreacted monomers were removed in vacuo.

TABLE 6

Polymerization of rac-lactide initiated by catalyst/epoxide systems

| Cat. | cat./CHO/LA | Temp. (° C.) | Conc. | Time (h) | Conv$^a$ (%) | $M_n^b$ (g/mol) | PDI$^d$ |
|---|---|---|---|---|---|---|---|
| $L^1Zn_2OAc_2$ | 1/10/100 | 80 | 1M | 5 | 31 | 3700 | 1.26 |
| $L^1Zn_2OAc_2$ | 1/10/100 | 100 | 1M | 5 | 97 | 4100 | 2.07 |
| $L^1Zn_2OAc_2$ | 1/0/100 | 100 | 1M | 5 | 0 | — | — |
| $L^1Zn_2OAc_2$ | 1/1/100 | 100 | 1M | 5 | 3.4 | 210 | 1.21 |
| $L^1Zn_2OAc_2$ | 1/2/100 | 100 | 1M | 5 | 25 | 1150 | 1.20 |
| $L^1Zn_2OAc_2$ | 1/5/100 | 100 | 1M | 5 | 44 | 3500 | 1.25 |
| $L^1Zn_2OAc_2$ | 1/20/100 | 100 | 1M | 5 | 98 | 6900 | 1.33 |
| $L^1Mg_2OAc_2$ | 1/2/100 | 100 | 1M | 2 | 6 | 260 | 1.00 |
| $L^1Mg_2OAc_2$ | 1/5/100 | 100 | 1M | 2 | 91 | 2800 | 1.95 |
| $L^1Mg_2OAc_2$ | 1/20/100 | 100 | 1M | 2 | 98 | 3100 | 1.80 |
| $L^1Mg_2OAc_2$ | 1/50/100 | 100 | 1M | 2 | 78 | 2400 | 1.29 |

$^a$Conversion of monomer determined by $^1$H NMR spectroscopy;
$^b$Experimental $M_n$ determined by GPC in THF, using polystyrene standards and times correction factor 0.58 for LA to determine absolute molecular weight;
$^c$ $M_w/M_n$.

Figure 5:
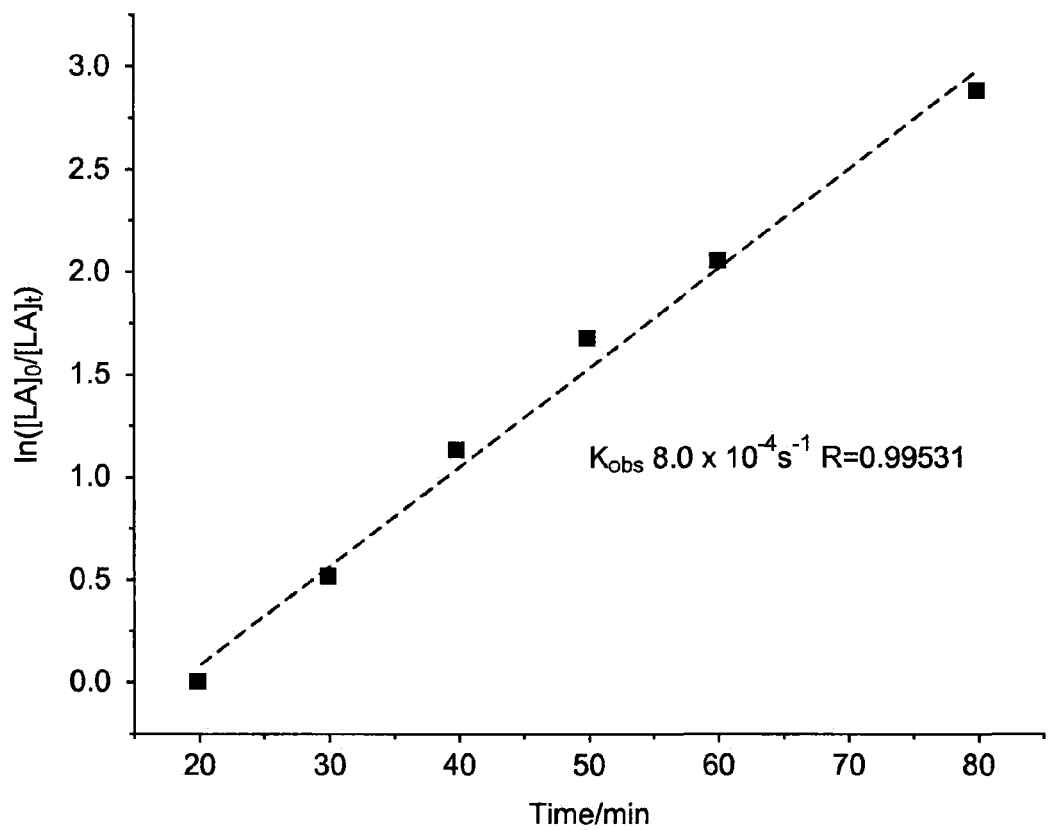
FIG. 5: Plot of In{[LA]$_0$/[LA]$_t$} vs time, showing a polymerisation kinetics with a first-order dependence on lactide concentration, initiated by [L$^1$Mg$_2$OAc$_2$]/CHO system (cat/CHO/LA=1/10/100,100° C.).

FIG. 5 features a plot of $\ln\{[LA]_0/[LA]_t\}$ vs time showing a polymerisation kinetics with a first-order dependence on lactide concentration, initiated by $L^1Mg_2OAc_2$/CHO system (cat/CHO/LA=1/10/100, 100° C.).

Example 8

Copolymerisation of and Epoxide and an Anhydride

The following reactions demonstrate the copolymerisation of and epoxide and an anhydride using the catalysts of the invention.

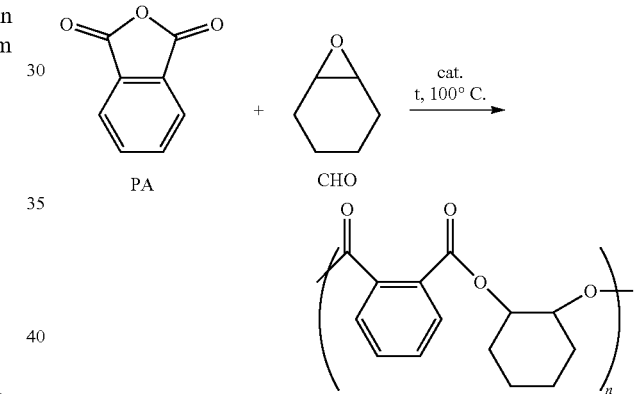

TABLE 7

Polyester synthesis via CHO/anhydride copolymerization.

| Catalyst | CHO/anhydrie (eq./eq.) | Solvent | T (° C.) | Time (h) | Conv. (%)$^{a,b}$ | % polyesters$^b$ | Mn$^c$ (g/mol) | PDI$^c$ |
|---|---|---|---|---|---|---|---|---|
| $L^1Zn_2(OAc)_2$ | CHO/MA 100/100 | Toluene [M]$_0$ = 2.4M | 100 | 18 | 92 | 67 | 12700, 4330 | 1.09, 1.03 |
| $L^1Zn_2(OAc)_2$ | CHO/PA 100/100 | Toluene [M]$_0$ = 1.25M | 100 | 22 | 27 | 90 | 5100, 2000 | 1.07, 1.07 |
| $L^1Zn_2(OAc)_2$ | CHO/PA 800/100 | neat | 100 | 20$^d$ | >99$^e$ | >99 | 4000 | 1.33 |
| $L^1Mg_2(OAc)_2$ | CHO/PA 800/100 | neat | 100 | 6 | 52 | 88 | | |
| $L^1Mg_2(OAc)_2$ | CHO/PA 100/100 | Toluene [M]$_0$ = 2.5M | 100 | 22 | 19 | 83 | 2570 | 1.20 |
| $L^1Mg_2(OAc)_2$ | CHO/PA 800/100 | neat | 100 | 1 | 97$^e$ | >99 | 12670, 5470 | |

$^a$Determined by $^1$H NMR spectroscopy;
$^b$Estimated on CHO consumption;
$^c$Determined by GPC with polystyrene standards;
$^d$Non-optimized time;
$^e$Estimated on PA consumption.

TABLE 8

Polyester synthesis via styrene oxide (SO)/anhydride copolymerization.

| Catalyst | SO/anhydrie (eq./eq.) | Time (h) | Conv. (%)[a,b] | % polymer[b] | Mn[c] (g/mol) | PDI[c] |
|---|---|---|---|---|---|---|
| $L^1Zn_2(OAc)_2$ | SO/MA 200/200 | 16[d] | >95 | 81 | 3400 | 1.90 |
| $L^1Zn_2(OAc)_2$ | SO/MA 500/500 | 6[e] | >95 | 74 | 2980 | 1.51 |
| $L^1Zn_2(OAc)_2$ | SO/PA 200/200 | 22[d] | >95 | 77 | 2340 | 1.49 |

Reaction conditions: reaction in toluene, 100° C., $[M]_0$ = 2.5M,
[a]Determined by $^1$H NMR spectroscopy;
[b]Estimated on SO consumption,
[c]Determined by GPC with polystyrene standards;
[d]Non-optimized time;
[e]Monitored by ATR-IR.

Example 9

Synthesis of Polyester-Polycarbonate Block Polymers

PCL-PCHC

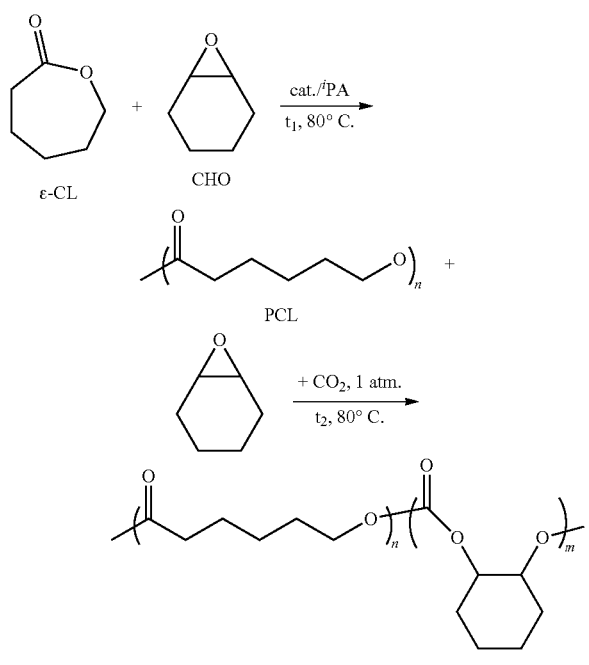

TABLE 9

PCL-PCHC via step polymerization procedure.

| ε-CL/ CHO | Cat (eq.) | Co-cat (eq.) | $t_1$ (h) | ε-CL conv. (%)[a] | $t_2$ (h) | CHO conv. (%)[a] | TON | TOF (h$^{-1}$) |
|---|---|---|---|---|---|---|---|---|
| 500/500 | 2 | iPA (4 eq) | 0.5 | 94 | 20 | 23.2 | 115 | 5.8 |
| 100/900 | 2 | iPA (4 eq) | 3 | 94 | 16 | 34.4 | 310 | 19.4 |
| 100/90 | 2 | iPA (4 eq) | 2 | 93 | 16 | 66.5 | 698 | 37.4 |
| 100/900 | 2 | iPA (4 eq) | 2 | — | 20 | 51.3 | 461 | 23.1 |
| 100/900 | 1 | — | 1 | >99 | 21 | 53 | 477 | 22.7 |

Reaction conditions: $L^1Zn_2Ph_2$ (1 eq.) in the presence of iPA (4 eq.), 80° C., desired time, neat (monomer mix as solvent),
[a]Determined by $^1$H NMR spectroscopy.

Figure 6:
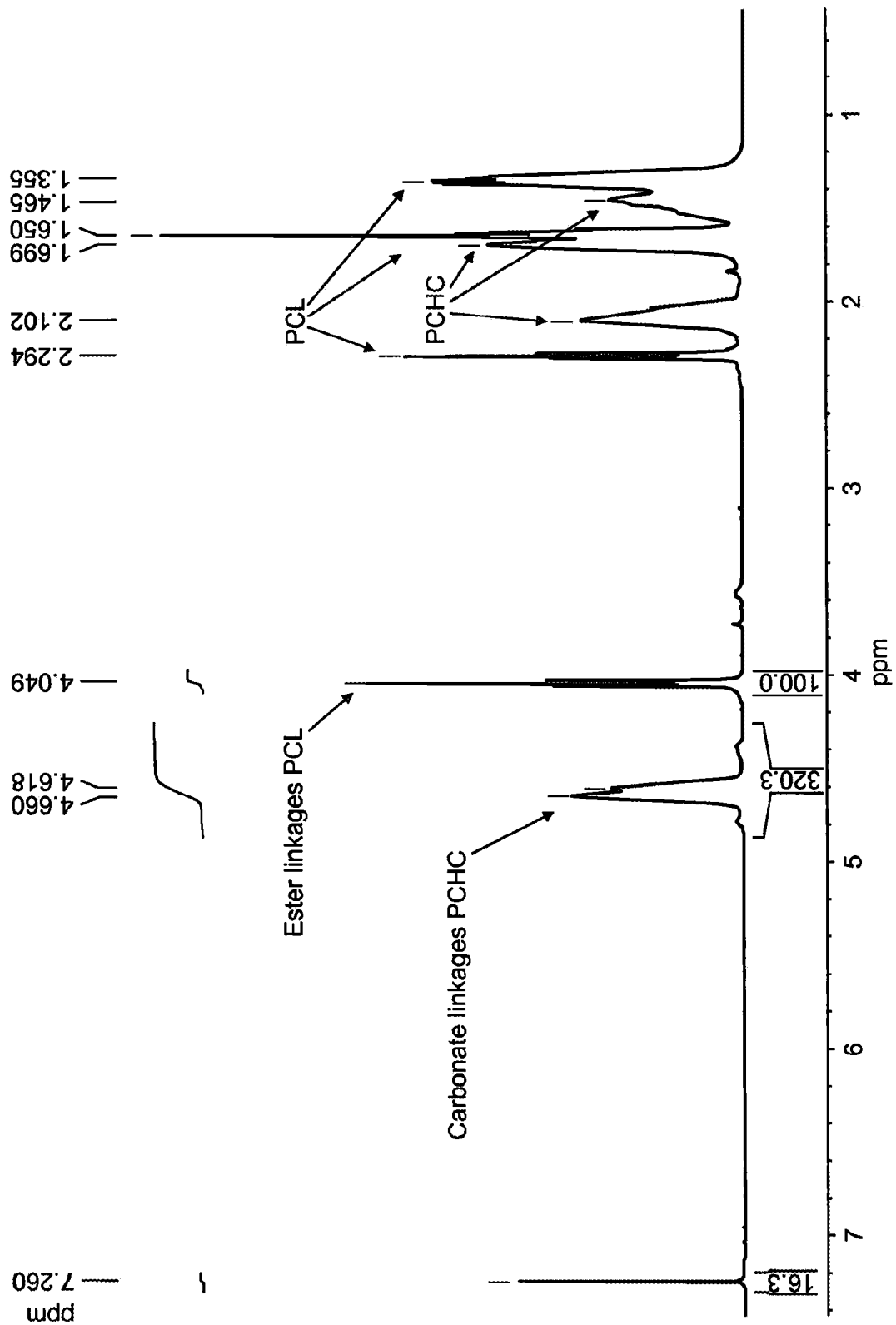
FIG. 6: $^1$H NMR spectrum (CDCl$_3$, 298 K) of PCL-PCHC copolymer. The plot illustrates the formation of both PCHC and PCL blocks.

FIG. 6: $^1$H NMR spectrum (CDCl$_3$, 298 K) of PCL-PCHC copolymer. The plot illustrates the formation of both PCHC and PCL blocks when initiated by cat 1 (Table 9, entry 5).

TABLE 10

PCL-b-PCHC bloc polymer characterization.

| E-CL/ CHO | Mn[a] (g·mol$^{-1}$) | PDI[a] | % poly-carbonate[b] | Mn[a] (g·mol$^{-1}$) | PDI[a] | % poly-carbonate[b] |
|---|---|---|---|---|---|---|
| 500/500 | 20782 | 1.43 | 8.6 | | | |
| 100/900 | 4808 | 1.65 | 57 | 7572 | 1.16 | 30.5 |
| 100/900 | 4355 | 1.34 | 71 | | | |
| 100/900 | 5170 | 1.27 | 76 | | | |
| 100/900 | 4810 | 1.38 | 74 | | | |

[a]Determined by GPC with polystyrene standards,
[b]Determined by $^1$H NMR spectroscopy by comparison of PCL and PCHC signals, respectively.

PE-PCHC ("One-Pot" Procedure)

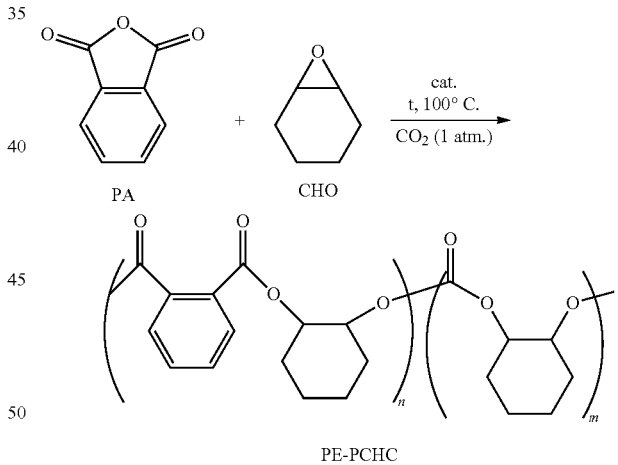

TABLE 11

Polyester-polycarbonate bloc polymers obtained via one-pot polymerization procedure.

| ε-CL/ CHO (eq.) | t (h) | CHO conv. (%)[a] | % poly-mer[a] | % poly-carbonate[a] | TON | TOF (h$^{-1}$) | Mn[b] | PDI[b] |
|---|---|---|---|---|---|---|---|---|
| 100/900 | 21.8 | 15 | 81 | 75 | 134 | 6.1 | 3965 | 1.33 |
| 200/2000 | 22.2 | 18 | 91 | 96 | 362 | 16.5 | 4290 | 1.12 |

Reaction conditions: $L^1Zn_2(OAc)_2$ (1 eq.), 1 atm $CO_2$, 100° C., desired time, neat (CHO as solvent),
[a]Determined by $^1$H NMR spectroscopy,
[b]Determined by GPC with polystyrene standards.

Figure 7:
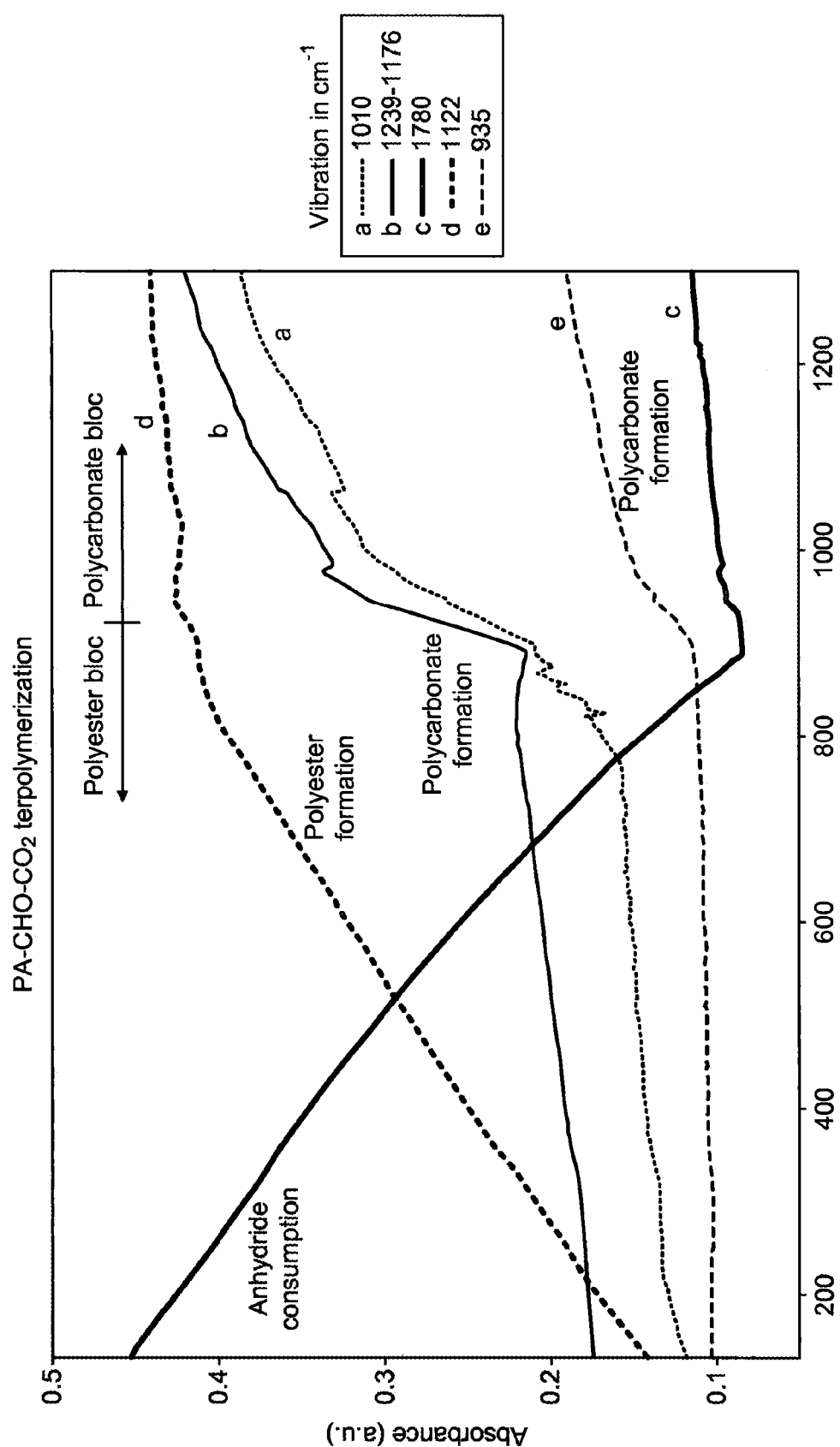
FIG. 7: ATR-IR analysis of "one-pot" reaction between phthalic anhydride (PA), cyclohexeneoxide (CHO), and carbon dioxide.

The second reaction in Table 11 was monitored by ATR-IR spectroscopy (see FIG. 7). FIG. 7 shows that anhydride is consumed as the polyester first block is produced.

Polyester formation terminates and polycarbonate second block formation begins once all anhydride monomer has been consumed.

Figure 8:
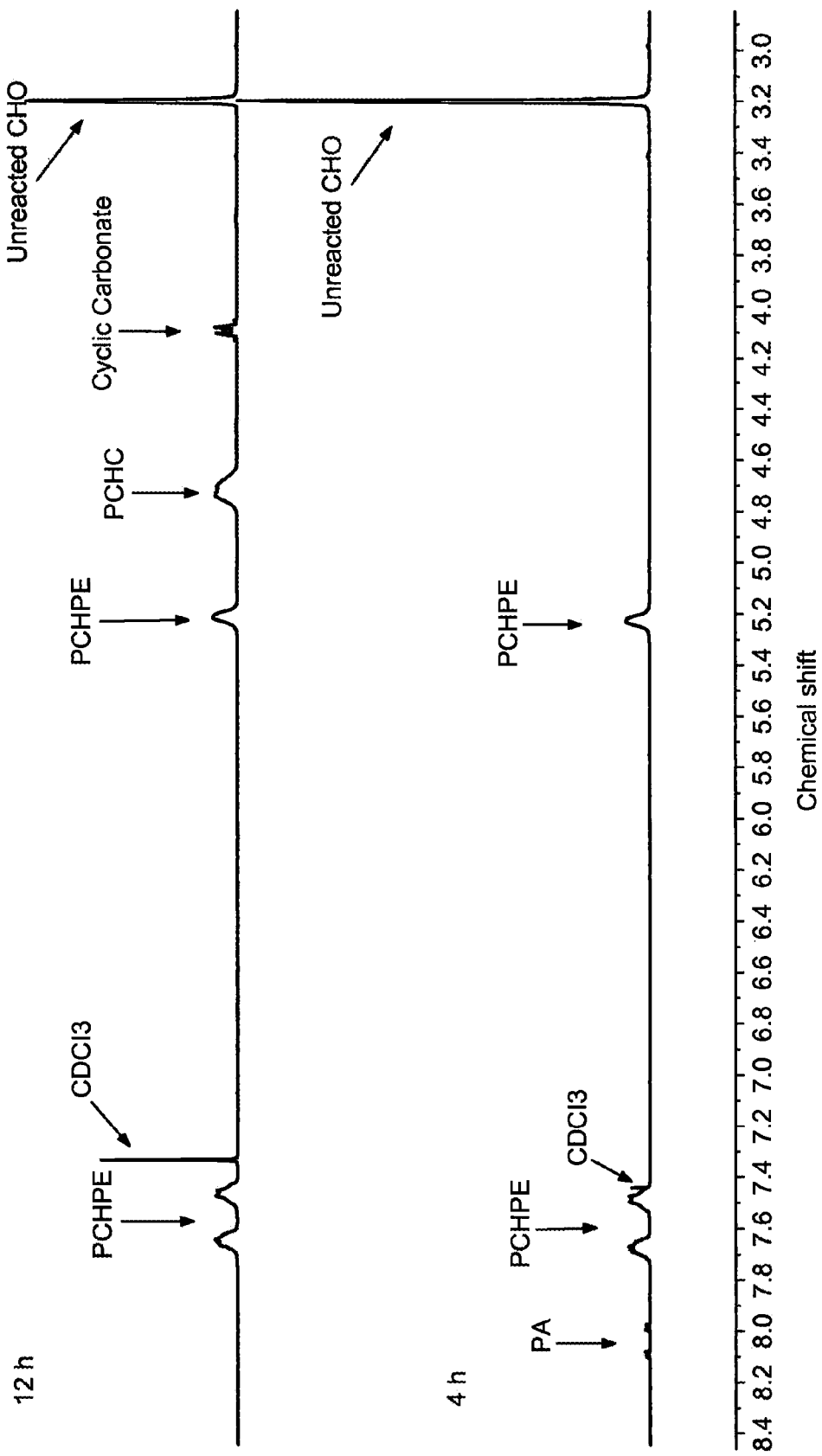
FIG. 8: $^1$H NMR spectra for terpolymerization reaction using L$^1$Zn$_2$(OAc)$_2$. Spectra show that PA is fully consumed before PCHC is formed.

FIG. 8 features $^1$H NMR spectra for the terpolymerization reaction using the complex $L^1Zn_2(OAc)_2$ Reaction conditions: 1:100:800. Cat:PA:CHO, 100° C. under 1 bar $CO_2$. Spectra show that PA is fully consumed before PCHC is formed. Thus, aliquot after 4 h shows almost complete consumption of PA (by 1H NMR spectroscopy) and no formation of PCHC. At the end of the reaction (24 h), aliquot show formation of PCHC.

Example 9

Preparation Polymers from Epoxide, Carbon Dioxide, Anhydride and Lactone Monomers

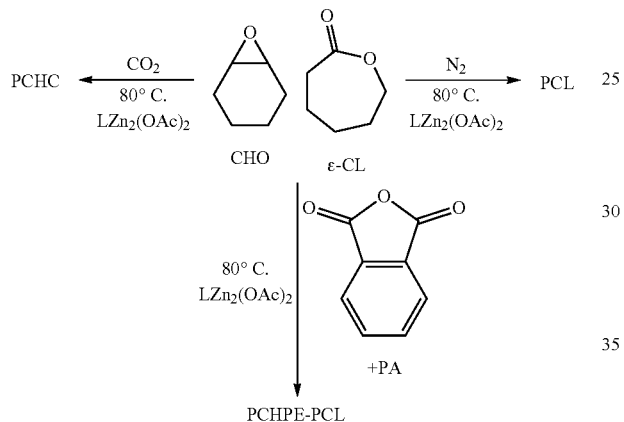

TABLE 12

Polyester, polycarbonate and polycarbonate-polyester block copolymers obtained via one-pot polymerization procedure

| CHO | ε-CL | $CO_2$ | PA | T (° C.) | t (h) | Conv. (%) | Mn (g/mol) | PDI |
|---|---|---|---|---|---|---|---|---|
| 900 | 100 | 1 atm. | — | 80 | 15 h | 12.4 | 1040 | 1.08 |
| 400 | 200 | — | 50 | 100 | 10 h | Full | 8140 | 2.00 |
| 20 | 200 | — | — | 80 | 2 h | Full | 21040 | 1.41 |

Formation of PCHC in the presence of ε-CL: Cyclohexene oxide (1.1 mL, 10.75 mmol), ε-caprolactone (138.6 μL, 1.2 mmol) and $L^1Zn_2OAc_2$ (10 mg, 0.012 mmol) were added to a Schlenk tube. The vessel was degassed then $CO_2$ was added and let under stirring for 30 mn at r.t. The vessel was then heated at 80° C. under $CO_2$ atmosphere (1 atm.) for 15 h. The unreacted monomers were removed in vacuo (Mn=1040 g/mol, PDI=1.08).

Figure 9:
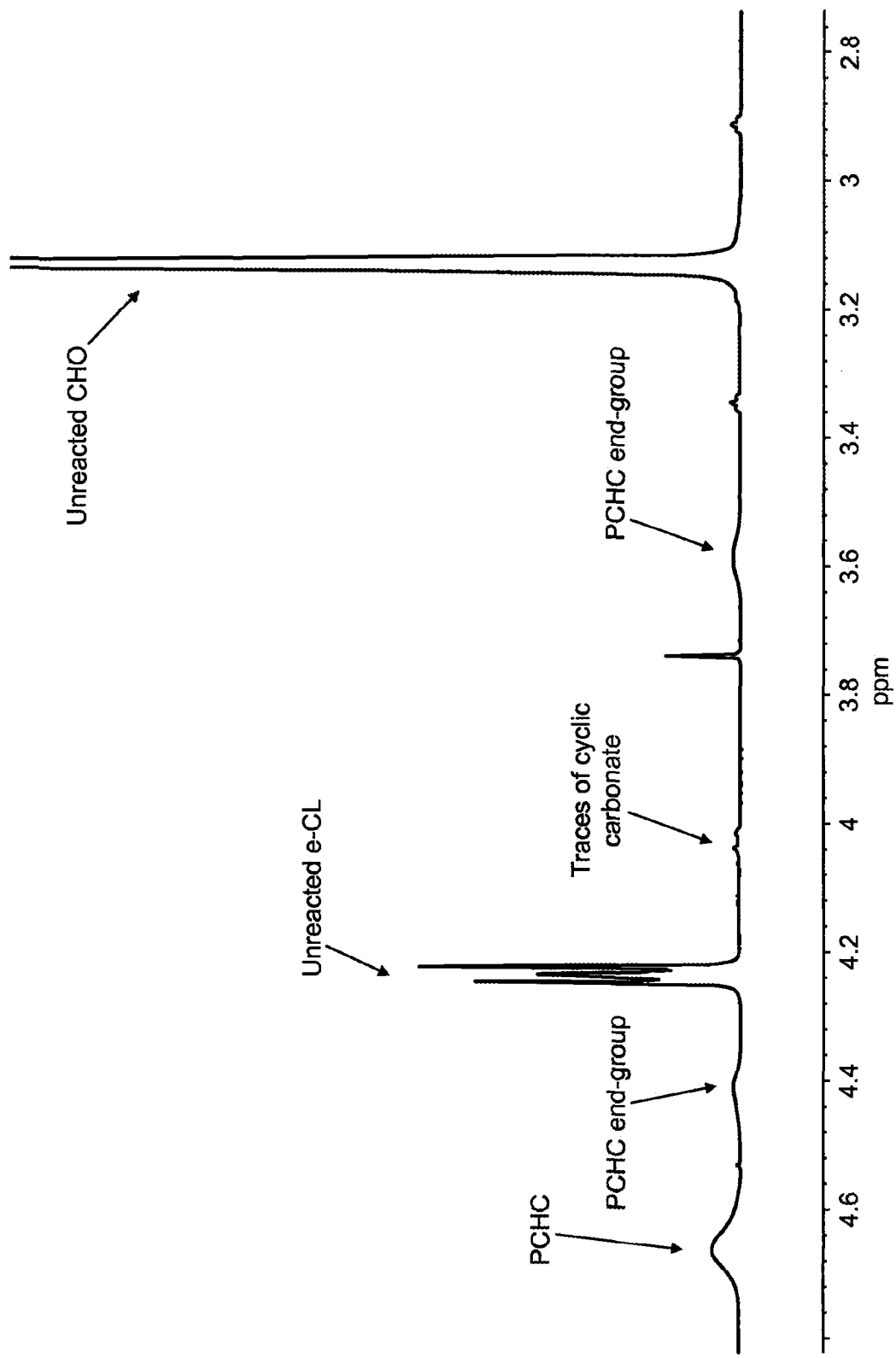
FIG. 9: $^1$H NMR spectrum (CDCl$_3$, 298 K) showing formation of PCHC in the presence of ε-CL, with no formation of PCL (4.00 ppm) or ether linkages (3.45 ppm).

FIG. 9: $^1$H NMR spectrum (CDCl$_3$, 298 K) showing formation of PCHC in the presence of ε-CL, with no formation of PCL (4.00 ppm) or ether linkages (3.45 ppm) (Table 12, Entry 1).

PCHPE-PCL formation: Cyclohexene oxide (1 mL, 10.0 mmol), ε-caprolactone (554 μL, 5.0 mmol), phtallic anhydride (185.2 mg, 0.625 mmol) and $L^1Zn_2OAc_2$ (20 mg, 0.025 mmol) were added to a Schlenk tube. The vessel was heated at 100° C. under stirring for 10 h (monitored by ATR-IR). The unreacted monomers were removed in vacuo (Mn=8140 g/mol, PDI=2.00).

Figure 10:
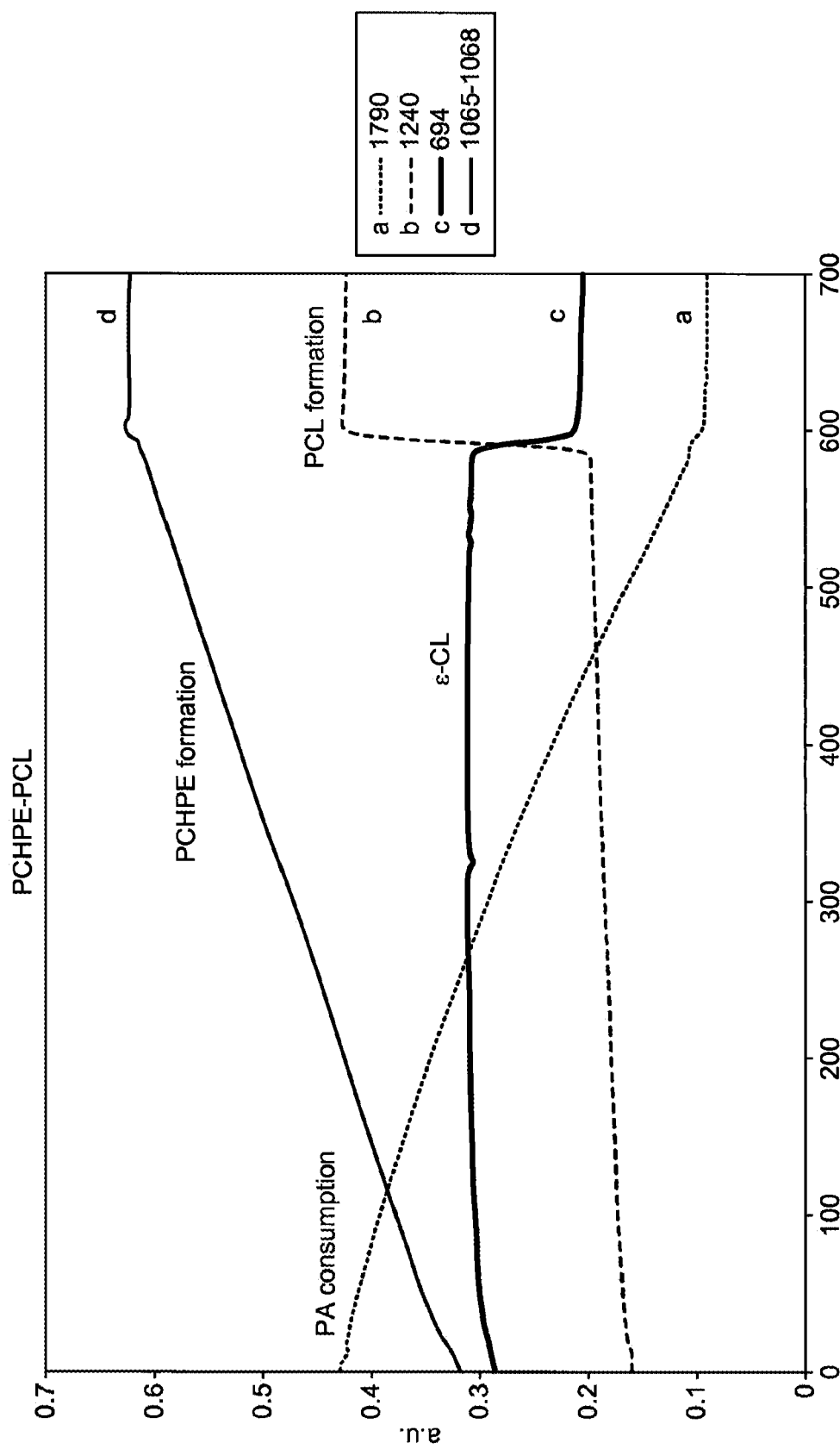
FIG. 10: ATR-IR analysis of "one-pot" reaction between phthalic anhydride (PA), cyclohexeneoxide (CHO) and caprolactone (ε-CL).

FIG. 10 shows an ATR-IR trace for PCHPE-PCL formation. This figure shows that the anhydride is consumed as the polyester block forms. When all of the anhydride is consumed, ring opening of the lactone occurs.

PCL formation (in the presence of 10 mol % of CHO): Cyclohexene oxide (25 μL, 0.25 mmol), ε-caprolactone (277 μL, 2.5 mmol) and $L^1Zn_2OAc_2$ (10 mg, 0.0125 mmol) were added to a Schlenk tube. The vessel was heated at 80° C. under stirring for 2 h. The unreacted monomers were removed in vacuo (Mn=21040 g/mol, PDI=1.41).

Figure 11:
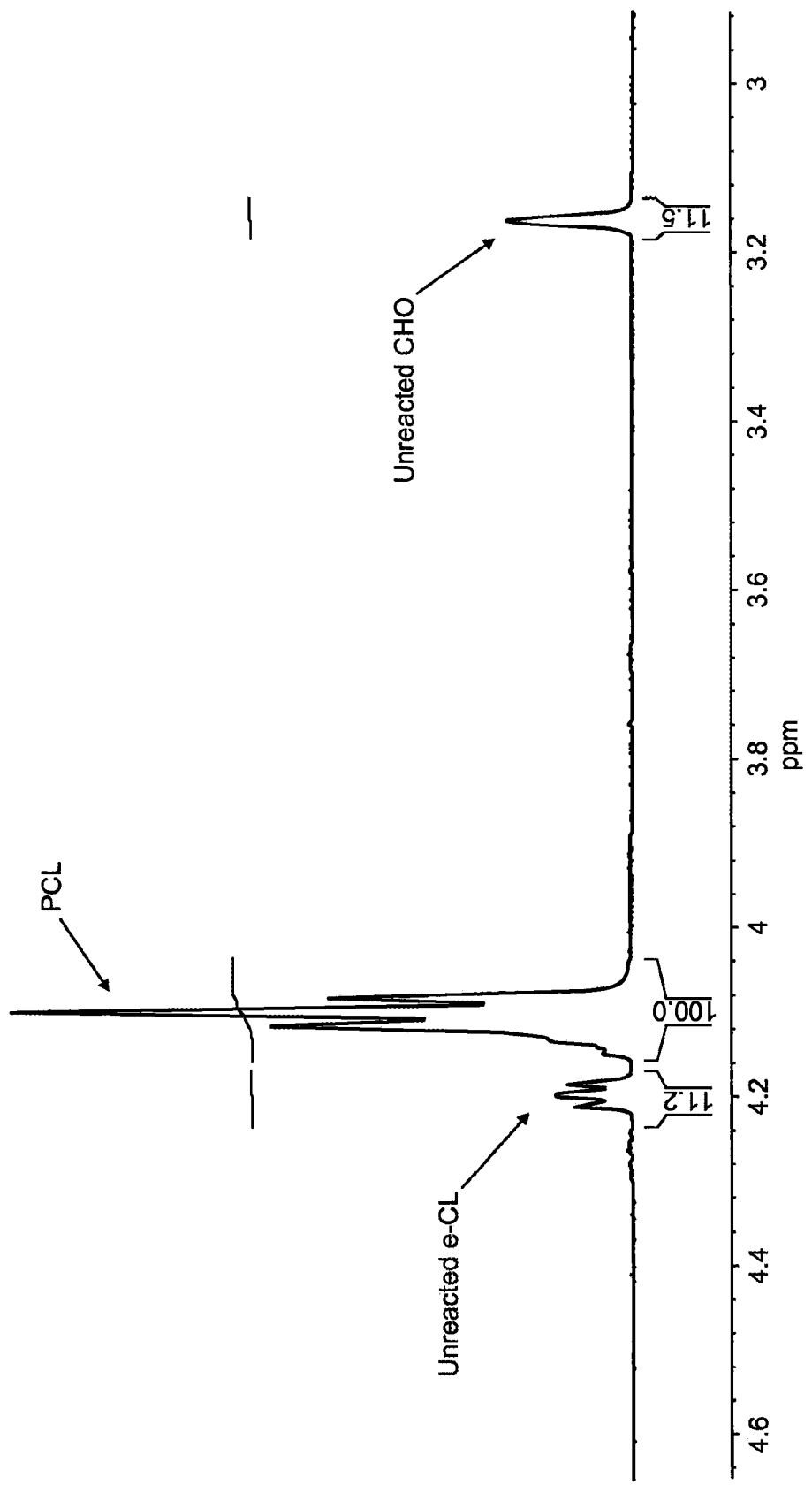
FIG. 11: $^1$H NMR spectrum (CDCl$_3$, 298 K) showing formation of PCL in the presence of CHO, without polymerization of CHO (absence of (poly)ether linkage at 3.45 ppm).

FIG. 11 is a $^1$H NMR spectrum (CDCl$_3$, 298 K) showing formation of PCL in the presence of CHO, without polymerization of CHO (absence of (poly)ether linkage at 3.45 ppm).

Example 10

Preparing a poly(cyclohexylene carbonate-co-caprolactone) Block Copolymer by Sequential Monomer Addition A) Cyclohexene oxide (2.3 mL, 22.5 mmol), ε-caprolactone (277 μL, 2.5 mmol), and 1 (40 mg, 50.0 μmol) were added to a Schlenk tube. The vessel was degassed at 298 K, then $CO_2$ was added. The vessel was left under a $CO_2$ atmosphere, at 298 K, for a few minutes and was then heated to 353 K, with continuous reaction stirring, for 3.5 h. Then, the $CO_2$ was removed from the reaction via 6 vacuum-nitrogen cycles, over a period of 15 min. The vessel was maintained at 353 K for 3 h. A sample of the crude product was analysed by $^1$H NMR spectroscopy to determine the conversion and selectivity. Any unreacted monomers were removed, in vacuo, to yield the product as an oily white wax. $M_n$=3,490 g/mol, PDI=1.48.

B) Cyclohexene oxide (2.3 mL, 22.5 mmol), ε-caprolactone (277 μL, 2.5 mmol), and 1 (40 mg, 50.0 μmol) were added to a Schlenk tube. The vessel was degassed at 298 K, then $CO_2$ was added. The vessel was left under a $CO_2$ atmosphere, at 298 K, for a few minutes and was then heated to 353 K, with continuous reaction stirring, for 4 h. Then, the $CO_2$ was removed from the reaction via 6 vacuum-nitrogen cycles, over a period of 15 min. The vessel was maintained at 353 K for 2 h. A sample of the crude product was analysed by $^1$H NMR spectroscopy to determine the conversion and selectivity. Any unreacted monomers were removed, in vacuo, to yield the product as an oily white wax. $M_n$=2,349 g/mol, PDI=1.49.

Figure 12:
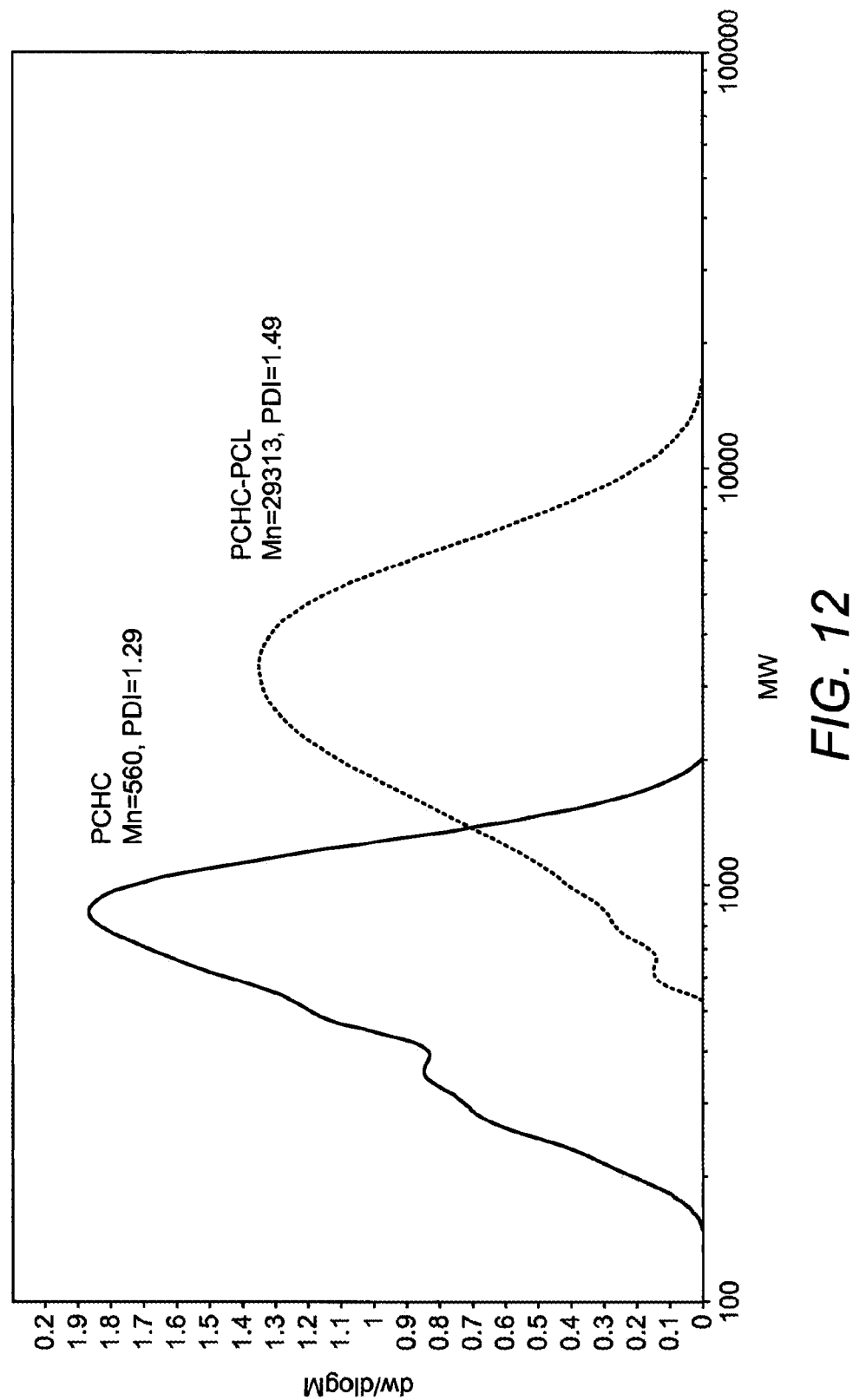
FIG. 12: SEC stack plot showing the analysis of PCHC-PCL formation. The "PCHC" trace shows the analysis of an aliquot removed after 4 h, which showed 10% CHO conversion and PCHC formation, with $M_n$ 530 g/mol. At this point, the $CO_2$ was removed leading to ε-CL ROP. After 2 h, a second aliquot was removed showing>99% conversion of ε-CL and formation of PCHC-PCL of $M_n$ 2350 g/mol.

FIG. 12 features a SEC stack plot showing the analysis of PCHC-PCL formation according to the conditions described in example 10-B. The "PCHC" trace shows the analysis of an aliquot removed after 4 h, which showed 10% CHO conversion and PCHC formation, with $M_n$ 530 g/mol. At this point, the $CO_2$ was removed leading to CL ROP. After 2 h, a second aliquot was removed was >99% conversion of CL and formation of PCHC-PCL of $M_n$ 2350 g/mol.

Figure 13:
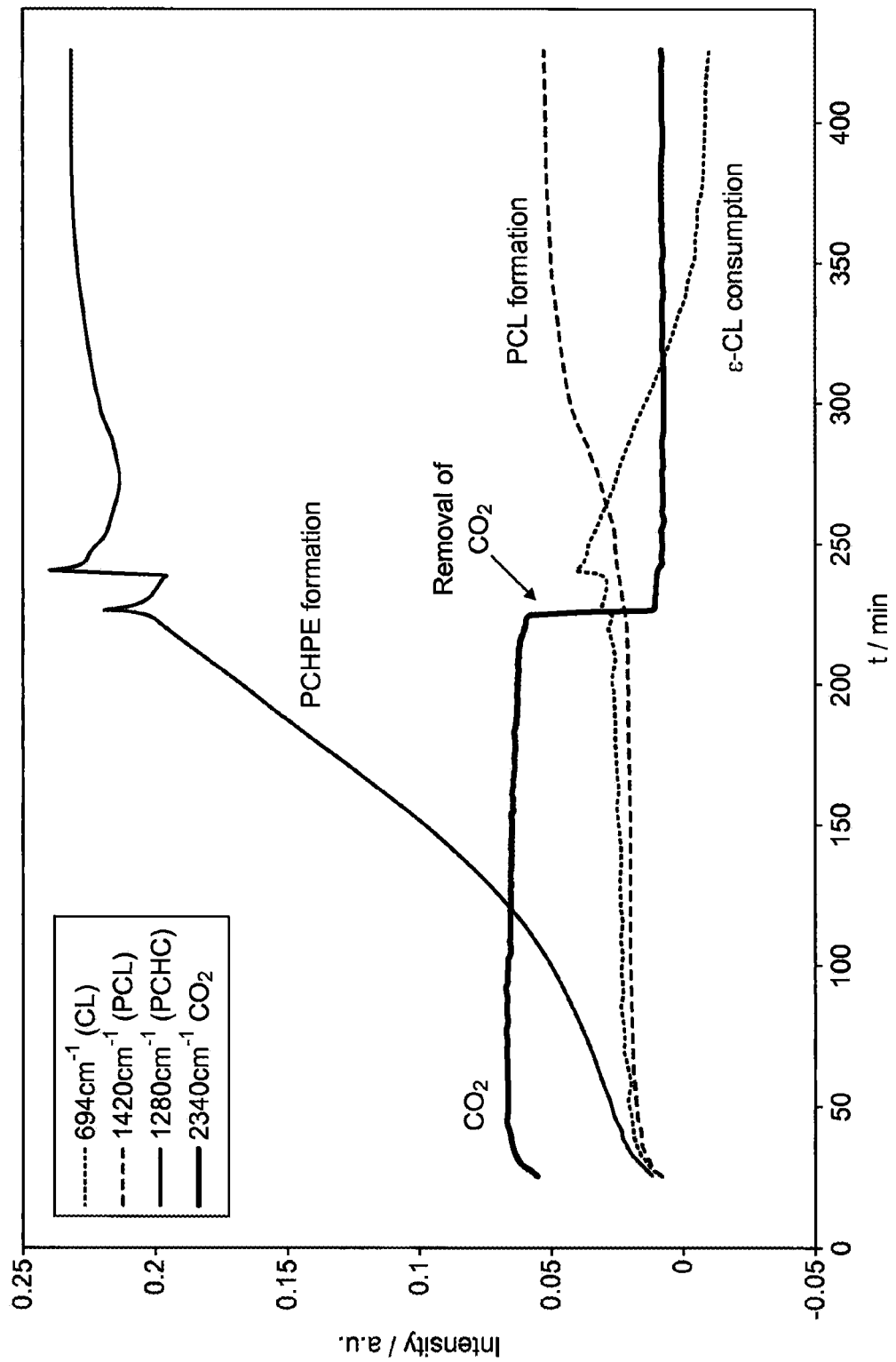
FIG. 13: Plot of changes in intensity of IR resonances where PCHC-PCL is formed by: 1) by ROCOP of CHO/$CO_2$, 2) removal of $CO_2$ and 3) ROP of CL.

FIG. 13 shows changes in intensity of IR resonances where PCHC-PCL is formed by: 1) by ROCOP (ring opening copolymerisation) of CHO/$CO_2$, 2) removal of $CO_2$ and 3) ROP of CL.

Example 9

Use of Various Epoxides as Switch Reagent for PCL Production

LZn$_2$(OAc)$_2$ (1 eq), ε-caprolactone (200 eq), and epoxide (800 eq) were added to a schlenk tube. The mixture was heated to 80° C. for 3 hours. After 3 hours a NMR aliquot was taken to determine conversion and the excess epoxide was removed by vacuum. The polymer was precipitated from THF by methanol.

TABLE 13

Ring-opening polymerization of ε-CL initiated by a catalyst/epoxide system[a]

| Cat/Epoxide/e-CL | Epoxide | Solvent | Conversion[a] (%) | Mn[b] (g/mol) | PDI[b] |
|---|---|---|---|---|---|
| 1/800/200 | SO | Neat[c] | 99 | 5336 | 1.28 |
| 1/800/200 | VCHO | Neat[c] | 90 | 9486 | 1.4 |
| 1/10/100 | SO | Toluene [e-CL] = 1M | 99 | 21040 | 1.6 |
| 1/10/100 | VCHO | Toluene [e-CL] = 1M | 90 | 13470 | 1.5 |

[a]Reaction conditions: 80° C., 3 hr;
[b]Determined by $^1$H NMR spectroscopy;
[c]Determined by GPC calibrated with polystyrene standards;
[c]Mixed epoxide used as solvent.
VCHO = 4-vinylcyclohexene oxide;
SO = styrene oxide.

Example 10

Formation of Triblock PCL-PCHC-PCL

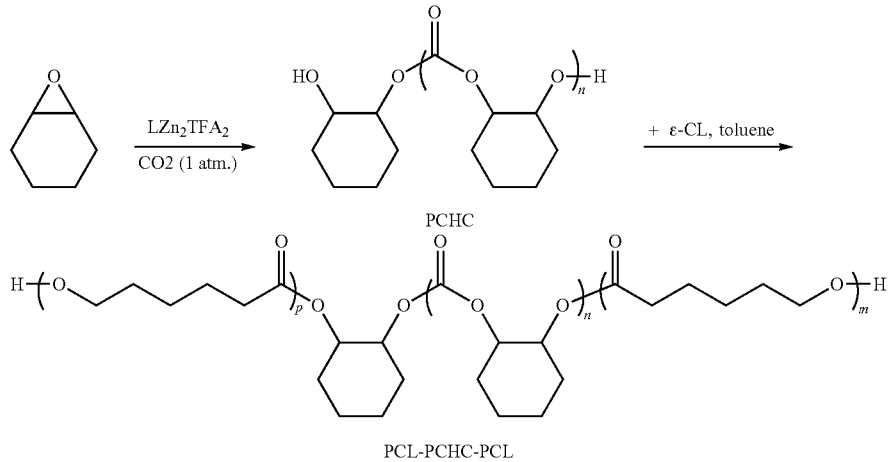

PCL-PCHC-PCL

L$^1$Zn$_2$(TFA)$_2$ and CHO were added to a Schlenk tube. The cyclohexene oxide was degassed before being left to stir under 1 atm of CO$_2$ at 80° C. for 16 h. The carbon dioxide was removed and replaced with nitrogen. Toluene was added to dissolve the PCHC, the desired quantity of ε-caprolactone was then added. Upon completion, the solvent was removed by vacuum and the polymer precipitated from THF by the addition of excess methanol.

TABLE 14

Formation of triblock PCL-PCHC-PCL

| Entry | CHO (eq.) | ε-CL (eq.) | [ε-CL][a] | Conversion[b] (%) CHO | ε-CL | Mn (PDI)[c] (g/mol) PCHC | PCL-PCHC-PCL[d] |
|---|---|---|---|---|---|---|---|
| 1 | 1000 | 400 | 5 | 32 | 100 | 7,697 (1.12) | 22,165 (1.78) 29,313 (1.53)[e] |
| 2 | 1000 | 400 | 1 | 36 | 87 | 5,644 (1.09) | 15,000 (1.28) |

Reaction conditions:
i): L$^1$Zn$_2$(TFA)$_2$, 18 h, 1 atm CO$_2$, 80° C.;
ii): addition of toluene and ε-CL, 3 h, N$_2$
[a]Concentration of ε-CL in toluene;
[b]Determined by $^1$H NMR spectroscopy;
[c]Determined by GPC calibrated with polystyrene standards,
[d]Crude polymer before purification,
[e]after purification THF/methanol.
TFA = trifluoroacetate (OCOCF$_3$).

Figure 14:
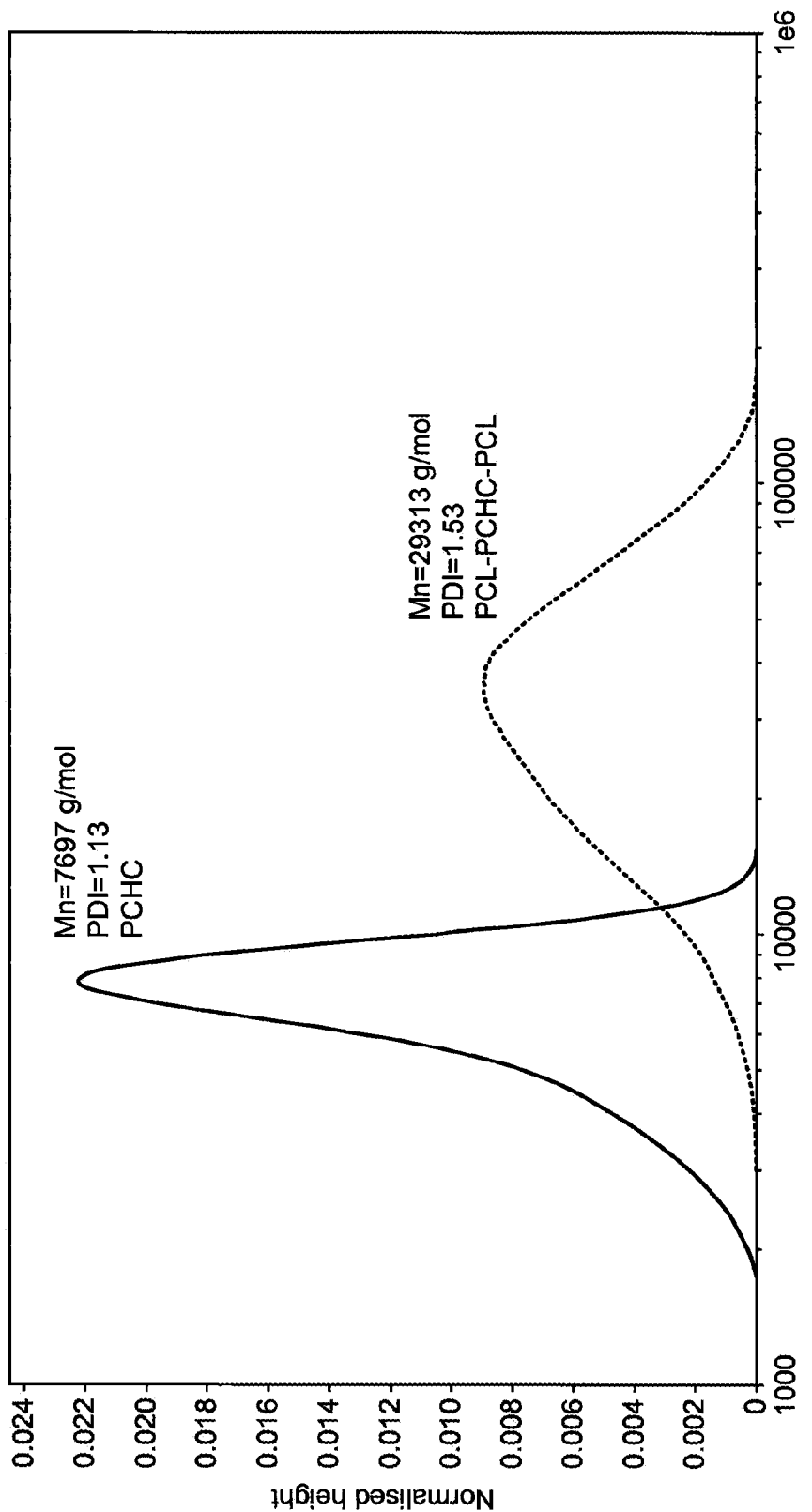
FIG. 14: SEC trace showing the molecular weight distribution PCHC and purified PCL-PCHC-PCL as described in Table 14, Entry 1.

FIG. 14 shows an SEC trace showing the molecular weight distribution PCHC and purified PCL-PCHC-PCL as described in Table 14, Entry 1.

Figure 15:
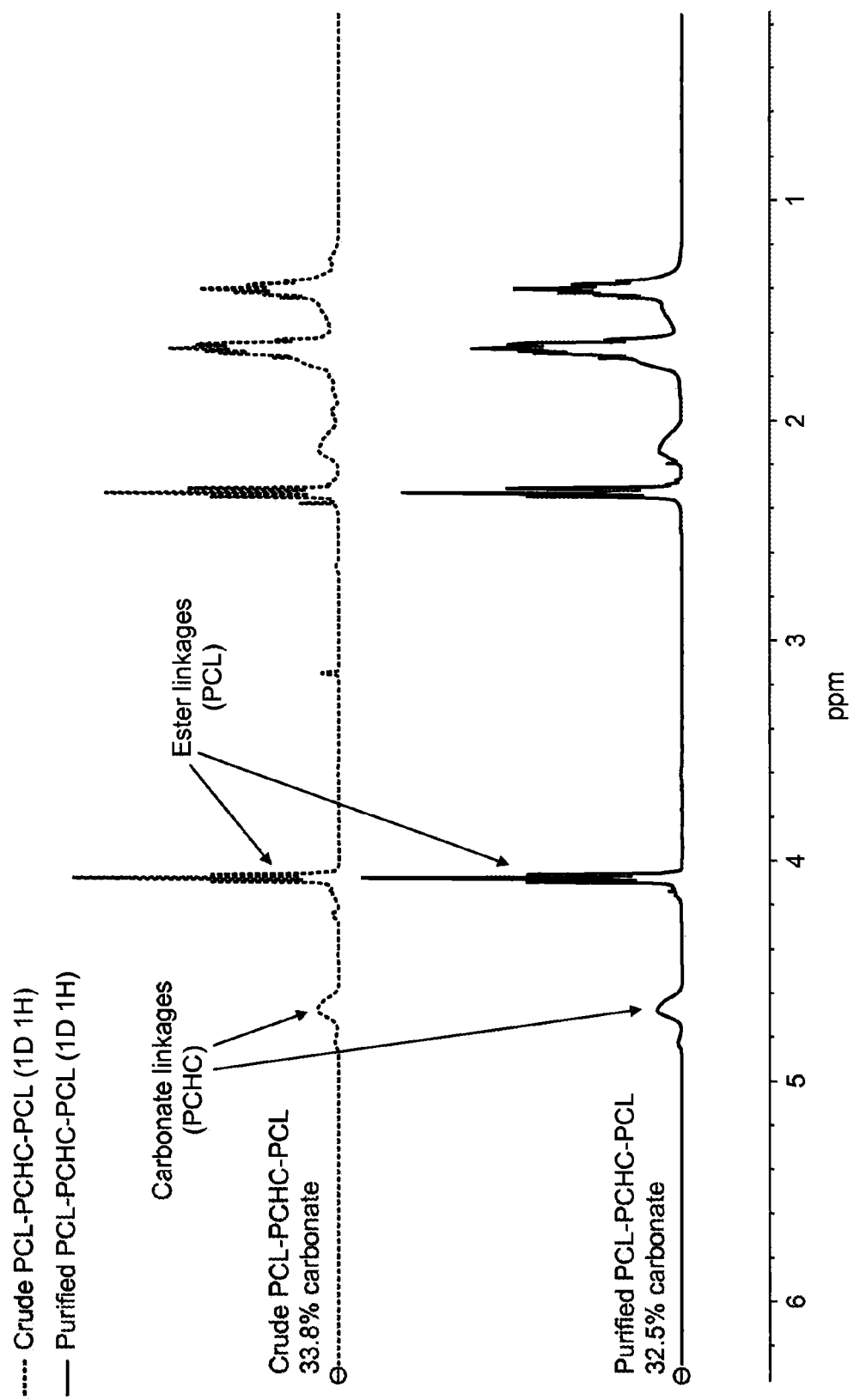
FIG. 15: $^1$H NMR spectrum showing the carbonate content of crude PCL-PCHC-PCL and purified PCL-PCHC-PCL.

FIG. 15 shows the $^1$H NMR spectrum showing the carbonate content of crude PCL-PCHC-PCL and purified PCL-PCHC-PCL. There is no significant difference in relative intensities (carbonate content) consistent with block copolymer formation.

Figure 16:
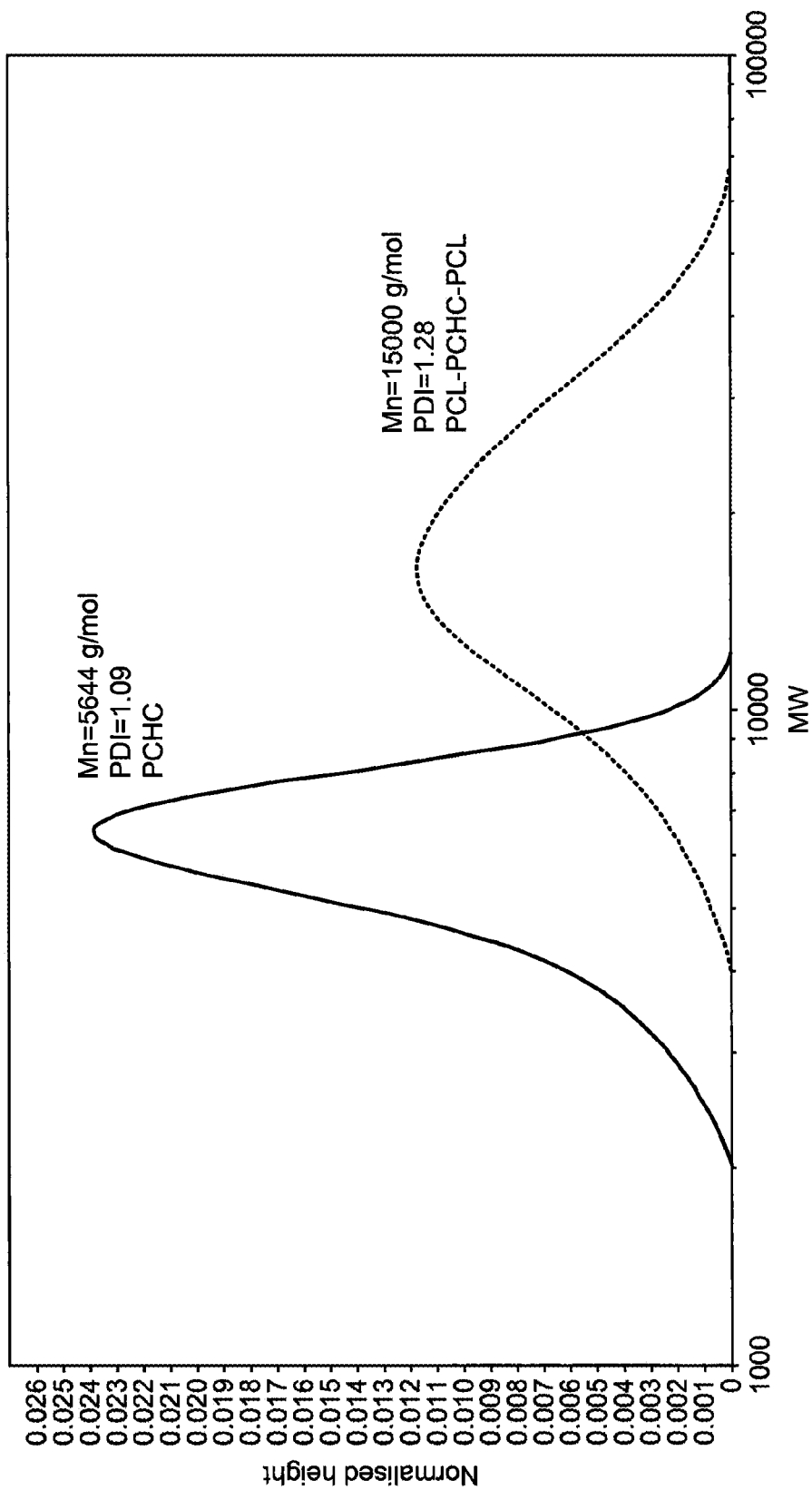
FIG. 16: SEC trace showing the molecular weight distribution PCHC and crude PCL-PCHC-PCL as described in Table 14, Entry 2.

FIG. 16 shows an SEC trace showing the molecular weight distribution PCHC and crude PCL-PCHC-PCL as described in Table 14, Entry 2.

Example 11

ε-CL Polymerization in the Presence of Chain Transfer Agent (CTA)

e-CL polymerization with CHO as solvent in the presence of ethylene glycol (EG): Catalyst, cyclohexene oxide (1000 eq), ε-caprolactone (200 eq) and ethylene glycol (10 eq) were added to a Schlenk tube. The mixture was heated to 80° C. for 2 hours and then, the excess cyclohexene oxide was removed by vacuum. The polymer was precipitated from THF by methanol.

e-CL polymerization with toluene as solvent in the presence of ethylene glycol (EG): Catalyst, cyclohexene oxide (40 eq), ε-caprolactone (400 eq), ethylene glycol (30 eq) and toluene were added to a Schlenk tube. The mixture was heated to 80° C. for 2 hours. After 2 hours the excess cyclohexene oxide removed by vacuum. The polymer was precipitated from THF by methanol.

TABLE 15

Polymerization of e-CL in the presence of CTA.

| Entry | ε-CL (eq.) | CHO (eq.) | EG (eq.) | [e-CL]$^a$ (mol/L) | Conv.$^b$ (%) | $M_{n(exp)}$$^c$ | PDI$^c$ |
|---|---|---|---|---|---|---|---|
| P10 | 100 | 1000 | — | — | 100 | 2779 | 1.36 |
| P14 | 200 | 1000 | 10 | — | 100 | 4272 | 1.26 |
| P17 | 400 | 20 | 10 | 5 | 100 | 4319 | 1.30 |
| P24 | 200 | 1000 | 30 | — | 100 | 9069 | 1.35 |
| P29 | 400 | 10 | 30 | 5 | 93 | 2754 | 1.18 |

Reaction conditions: 80° C., 2 h;
$^a$concentration of ε-CL in toluene;
$^b$Determined by $^1$H NMR spectroscopy;
d) determined by GPC calibrated with polystyrene standards.

Figure 17:
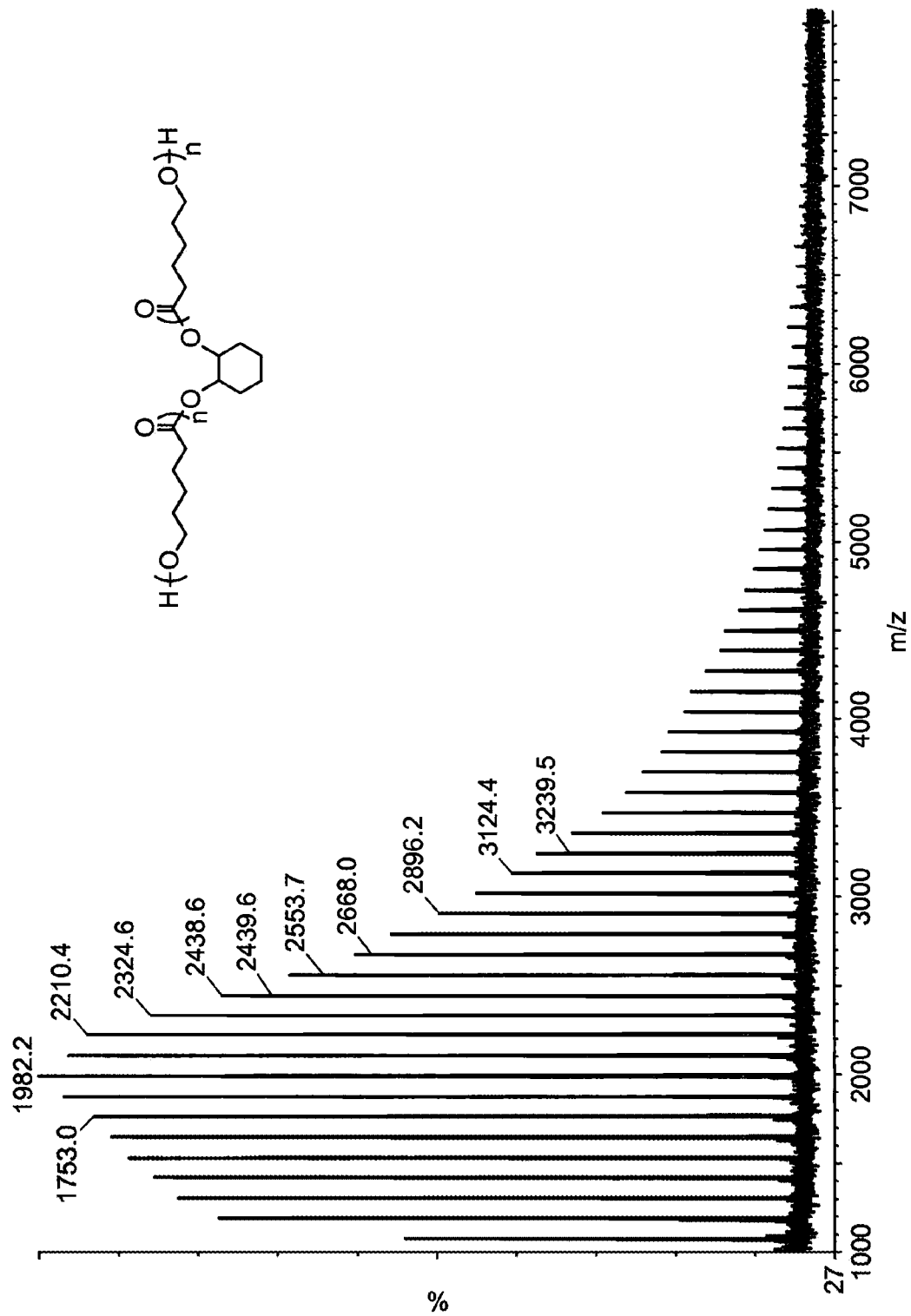
FIG. 17: MALDI TOF mass spectra of PCL obtained in neat CHO in the absence of ethylene glycol.
Figure 18:
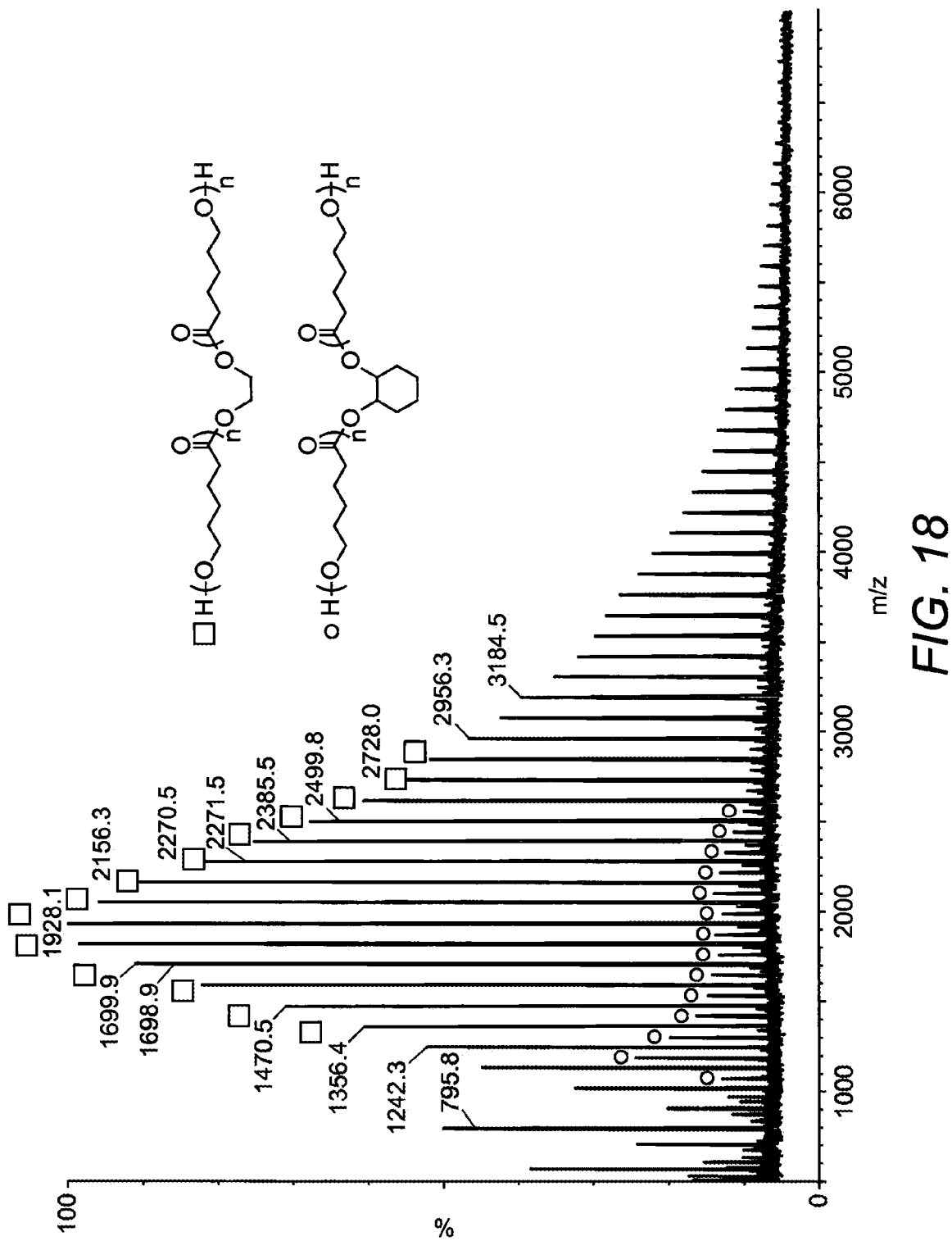
FIG. 18: MALDI TOF mass spectra of PCL obtained in toluene in the presence of ethylene glycol.

FIG. 17 shows a MALDI TOF mass spectra of PCL obtained in neat CHO in the absence of EG (Table 15, P10). Polyol series calculated for $[(C_6H_{10}O_2)_n+C_6H_{12}O_2+K]^+=[(114.07)_n+116.16+39.1]^+$ FIG. 18 shows a MALDI TOF mass spectra of PCL obtained in toluene in the presence of EG (Table 15, P29). Square series calculated for $[(C_6H_{10}O_2)_n+C_2H_6O_2+K]^+=[(114.07)_n+63.04+39.1]^+$; circular series calculated for $[(C_6H_{10}O_2)_n+C_6H_{12}O_2+K]^+=[(114.07)_n+116.16+39.1]^+$.

The invention claimed is:

1. A method for producing a block copolymer, said block copolymer having a first and second block, using a single catalytic system, wherein the single catalytic system comprises a catalyst of formula (I):

(I)

Wherein:
[M] is a metal complex having at least one metal atom M coordinated by a ligand system;

M is Zn, Cr, Co, Mn, Mg, Fe, Ti, Ca, Ge, Al, Mo, W, Ru, Ni, or V;

Z is absent, or is independently selected from -E-, -EX(E)-, or EX(E)E-;

X is C or S;

each E is independently selected from O, S, or NR$^Z$, wherein R$^Z$ is H, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, or optionally substituted alkylheteroaryl;

R is hydrogen, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, optionally substituted alkylheteroaryl, silyl, or a polymer; and when Z is absent, R may additionally be selected from halide, phosphinate, azide, or nitro;

the method comprising the steps of:
a) providing a mixture comprising:
  i. an epoxide;
  ii. a first monomer or combination of monomers selected from a group (i) to (iii):
    Monomer (i): a lactide and/or a lactone,
    Monomer (ii): an anhydride, or
    Monomer (iii): carbon dioxide, and
  iii. a second monomer or combination of monomers selected from a different group (i) to (iii) to that selected for the first monomer or combination of monomers:
    Monomer (i): a lactide and/or a lactone,
    Monomer (ii): an anhydride, or
    Monomer (iii): carbon dioxide; and
b) contacting the mixture with the single catalytic system;
wherein the rate of insertion of the first monomer or combination of monomers into the bond between the metal complex [M] and the ligand —Z—R is faster than the rate of insertion of the second monomer or combination of monomers into the bond between the metal complex [M] and the ligand —Z—R;
wherein when the first monomer or combination of monomers is Group (i), either —Z—R is -E-R, or the mixture comprises a compound [Y],
wherein when the second monomer or combination of monomers is Group (i), the mixture comprises a compound [Y]; and
wherein compound [Y] is capable of converting the group —Z—R, wherein Z is absent or a group selected from -E-X(E)- or -E-X(E)E-, to a group —Z—R wherein Z is -E-.

2. The method according to claim 1, wherein the mixture further comprises a third monomer or combination of monomers selected from a group which is different from the first and second monomers or combination of monomers:
Monomer (i): a lactide and/or a lactone,
Monomer (ii): an anhydride, or
Monomer (iii): carbon dioxide;
wherein the rate of insertion of the first and second monomers are as claimed in claim 1, and wherein the rate of insertion of the third monomer or combination of monomers into the bond between the metal complex [M] and the ligand —Z—R is slower than the rate of insertion of the first and second monomers or combination of monomers into the bond between the metal complex [M] and the ligand —Z—R; and wherein when the third monomer or combination of monomers is Monomer (i), the reaction mixture comprises a compound [Y].

3. The method according to claim 1, wherein the compound [Y] is a compound having a three, four, or five membered saturated ring and at least one heteroatom selected from O, S, or N.

4. The method according to claim 1, wherein the catalyst has the following formula:

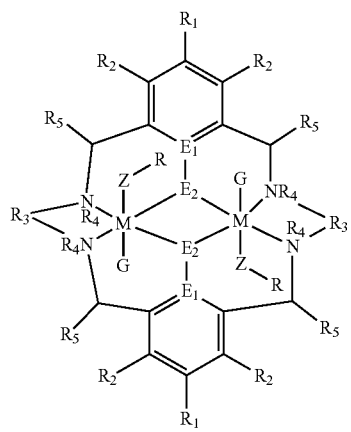

(I)

wherein
- $R_1$ and $R_2$ are each independently hydrogen, halide, a nitro group, a nitrile group, an imine, an amine, an ether group, a silyl ether group, a thioether group, a sulfoxide group, a sulfinate group, an acetylide group, an optionally substituted alkyl, an optionally substituted alkenyl, an optionally substituted alkynyl, an optionally substituted haloalkyl, an optionally substituted aryl, an optionally substituted heteroaryl, an optionally substituted alicyclic, or an optionally substituted heteroalicyclic;
- $R_3$ is optionally substituted alkylene, optionally substituted alkenylene, optionally substituted alkynylene, optionally substituted heteroalkylene, optionally substituted heteroalkenylene, optionally substituted heteroalkynylene, optionally substituted arylene, optionally substituted heteroarylene, or optionally substituted cycloalkylene, wherein alkylene, alkenylene, alkynylene, heteroalkylene, heteroalkenylene, and heteroalkynylene may optionally be interrupted by aryl, heteroaryl, alicyclic, or heteroalicyclic;
- $R_4$ is H, optionally substituted aliphatic, optionally substituted heteroaliphatic, optionally substituted alicyclic, optionally substituted heteroalicyclic, optionally substituted aryl, optionally substituted heteroaryl, optionally substituted alkylheteroaryl, or optionally substituted alkylaryl;
- $R_5$ is H, optionally substituted aliphatic, optionally substituted heteroaliphatic, optionally substituted alicyclic, optionally substituted heteroalicyclic, optionally substituted aryl, optionally substituted heteroaryl, optionally substituted alkylheteroaryl, or optionally substituted alkylaryl;
- $E_1$ is C, $E_2$ is O, S, or NH; or $E_1$ is N, and $E_2$ is O;
- Z is absent, or selected from -E-, -EX(E)-, or -EX(E)E-;
- X is C or S;
- each E is independently selected from O, S, or $NR^Z$, wherein $R^Z$ is H, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, or optionally substituted alkylheteroaryl;
- R is hydrogen, optionally substituted aliphatic, optionally substituted heteroaliphatic, alicyclic, optionally substituted heteroalicyclic, optionally substituted aryl, optionally substituted heteroaryl, optionally substituted alkylaryl, optionally substituted alkylheteroaryl, silyl, or a polymer; and when Z is absent, R may additionally be selected from halide, phosphinate, azide, or nitro;
- each G is independently absent, or a neutral or anionic donor ligand which is a Lewis base;
- M is Zn(II), Cr(II), Co(II), Mn(II), Mg(II), Fe(II), Ti(II), Cr(III)-Z—R, Co(III)-Z—R, Mn(III)-Z—R, Fe(III)-Z—R, Ca(II), Ge(II), Al(III)-Z—R, Ti(III)-Z—R, V(III)-Z—R, Ge(IV)-(—Z—R)$_2$, or Ti(IV)-(—Z—R)$_2$.

5. The method according to claim 1, wherein each E is O.

6. The method according to claim 1, wherein M is Zn(II) or Mg(II).

7. The method according to claim 1, wherein the catalyst is selected from:

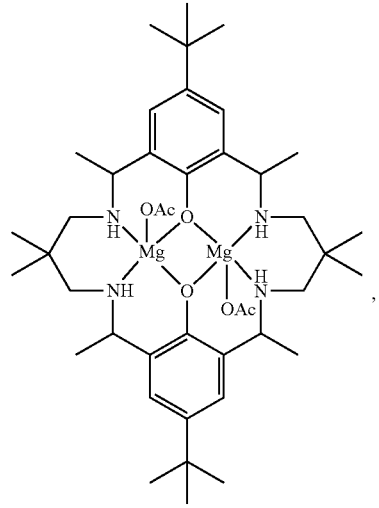

[L$^4$Mg$_2$(OAc)$_2$]

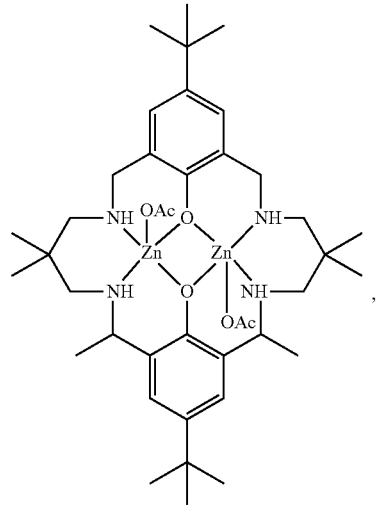

[L$^1$Zn$_2$(OAc)$_2$]

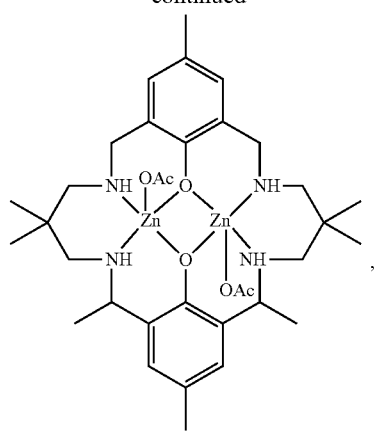
[L²Zn₂(OAc)₂]
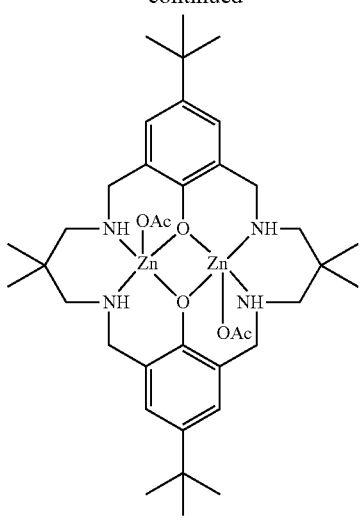
[L¹Zn₂(OAc)₂]
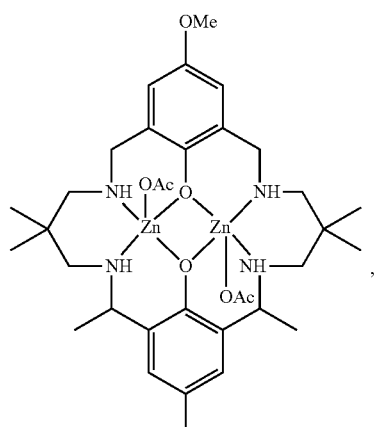
[L³Zn₂(OAc)₂]
[L²Zn₂(OAc)₂]
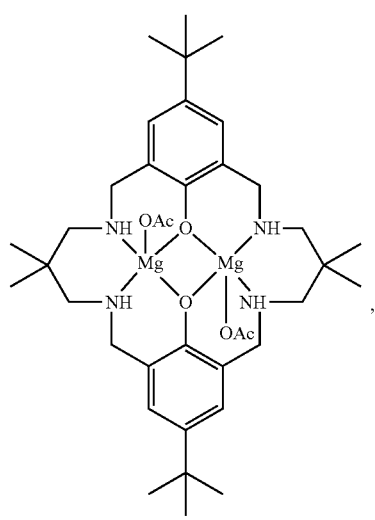
[L¹Mg₂(OAc)₂]
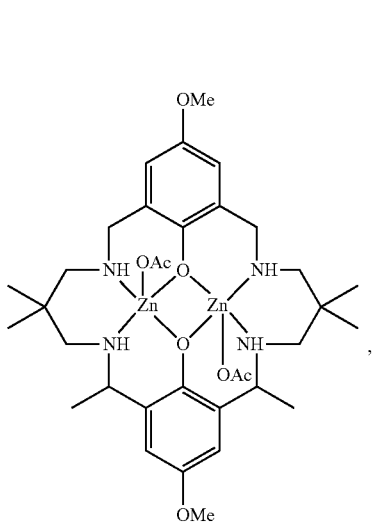
[L³Zn₂(OAc)₂]

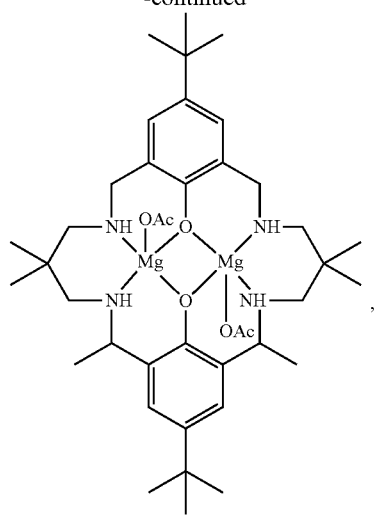
[L¹Mg₂(OAc)₂]
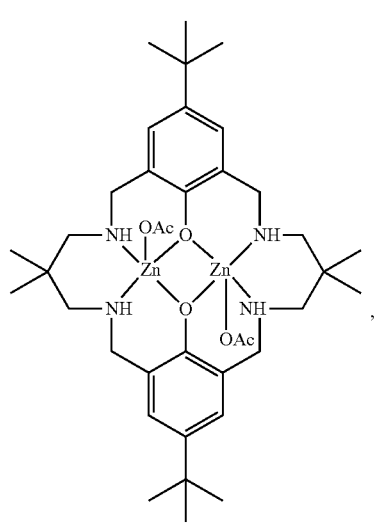
[L¹Zn₂(OAc)₂]
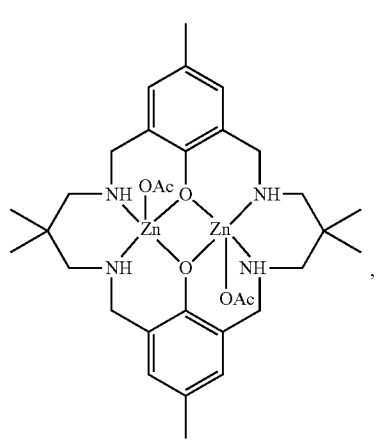
[L²Zn₂(OAc)₂]
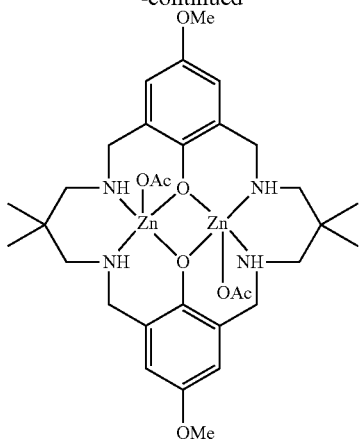
[L³Zn₂(OAc)₂]
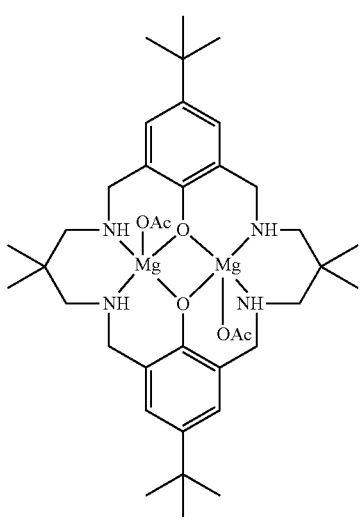
[L¹Mg₂(OAc)₂]
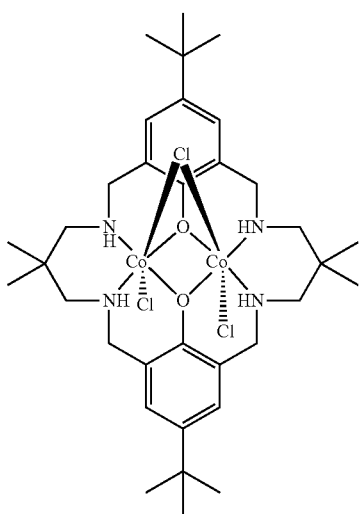
[L¹Co₂Cl₃]⁻ [B-H]⁺

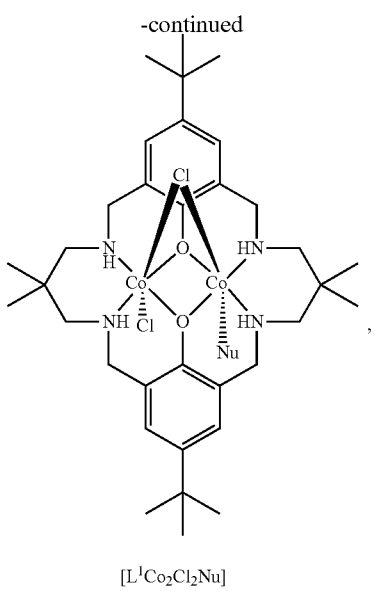

[L¹Co₂Cl₂Nu]

[L¹Mg₂Cl₂(methylimidazole)],
[L₁Mg₂Cl₂(dimethylaminopyridine)],
[L₁Mg₂Br₂(dimethylaminopyridine)],
[L¹Zn₂(F₃CCOO)₂],
[L¹Zn₂(OOCC(CH₃)₃)₂],
[L¹Zn₂(OC₆H₅)₂],
[L¹Fe₂Cl₄],
[L¹Co₂(OAc)₃],
[L¹Zn₂(adamantyl carbonate)₂],
[L₁Zn₂(pentafluorobenzoate)₂],
[L¹Zn₂(diphenylphosphinate)₂],
[L¹Zn₂(bis(4-methoxy)phenyl phosphinate)₂],
[L¹Zn₂(hexanoate)₂],
[L¹Zn₂(octanoate)₂],
[L¹Zn₂(dodecanoate)₂],
[L¹Mg₂(F₃CCOO)₂],
[L¹Mg₂Br₂],
[L¹Zn₂(C₆F₅)₂],
[L¹Zn₂(C₆H₅)₂], or
[L¹Zn₂(OiPr)₂];
wherein [B—H]+ represents any counterion; and Nu is N-methylimidazole, pyridine, or dimethylaminopyridine.

8. The method according to claim 1, wherein the catalyst system comprises a chain transfer agent.

9. A polymer as produced by the method according to claim 1.

10. The method according to claim 3, wherein the compound [Y] is an epoxide, an aziridine, an episulfide, an oxetane, a thietane, an azetidine, a saturated furan, a saturated thiophene, a pyrrolidine, or a saturated four-membered carbon ring where two adjacent carbon atoms are replaced by —Y—C(Y)—,
wherein each Y is independently selected from O, S, or NRʸ, and
Rʸ is H, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, or optionally substituted alkylheteroaryl.

11. The method according to claim 3, wherein the compound [Y] is an epoxide.

12. The method according to claim 4, wherein $E_1$ is C; and $E_2$ is O.

13. The method according to claim 4, wherein $R_1$ is hydrogen, halide, an amine, an ether group, a thioether group, optionally substituted alkyl, optionally substituted alkenyl, optionally substituted alkynyl, optionally substituted haloalkyl, optionally substituted aryl, optionally substituted heteroaryl, optionally substituted alicyclic, or optionally substituted heteroalicyclic.

14. The method according to claim 4, wherein $R_2$ is hydrogen, optionally substituted alkyl, optionally substituted aryl, or optionally substituted heteroaryl.

15. The method according to claim 4, wherein $R_4$ is hydrogen, optionally substituted alkyl, optionally substituted aryl, or optionally substituted heteroaryl.

16. The method according to claim 4, wherein $R_5$ is hydrogen, optionally substituted alkyl, optionally substituted aryl, or optionally substituted heteroaryl.

17. The method according to claim 4, wherein M is selected from Zn(II), Mg(II), Co(II), Co(III)-Z—R, Cr(II), Cr(III)-Z—R, Mn(II), Mn(III)-Z—R, Al(III)-Z—R, Fe(II), or Fe(III)-Z—R.

18. The method according to claim 1, wherein the epoxide has the following formula:

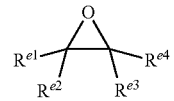

wherein each $R^{e1}$, $R^{e2}$, $R^{e3}$, and $R^{e4}$ is independently selected from hydrogen, halogen, hydroxyl, nitro, alkoxy, aryloxy, heteroaryloxy, amino, alkylamino, imine, nitrile, acetylide, carboxylate, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, optionally substituted alkylheteroaryl, or a polymeric species; or two or more of $R^{e1}$, $R^{e2}$, $R^{e3}$, and $R^{e4}$ can be taken together to form a saturated, partially saturated, or unsaturated 3 to 12 membered optionally substituted ring system, optionally containing one or more heteroatoms.

19. The method according to claim 1, wherein the anhydride has the following formula:

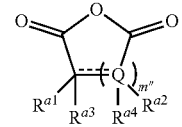

wherein m" is 1, 2, 3, 4, 5, or 6;
each $R^{a1}$, $R^{a2}$, $R^{a3}$, and $R^{a4}$ is independently selected from hydrogen, halogen, hydroxyl, nitro, alkoxy, aryloxy, heteroaryloxy, amino, alkylamino, imine, nitrile, acetylide, carboxylate, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, optionally substituted alkylheteroaryl, or a polymeric species; or
two or more of $R^{e1}$, $R^{e2}$, $R^{e3}$, and $R^{e4}$ can be taken together to form a saturated, partially saturated, or unsaturated 3 to 12 membered optionally substituted ring system, optionally containing one or more heteroatoms; or can be taken together to form a double bond;
each Q is independently C, O, N, or S; and
wherein $R^{a3}$ and $R^{a4}$ are either present, or absent, and ===== can either be ===== or —, according to the valency of Q.

20. The method according to claim 1, wherein the lactone has the following formula:

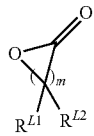

wherein m is an integer from 1 to 20; and
$R^{L1}$ and $R^{L2}$ are independently selected from hydrogen, halogen, hydroxyl, nitro, alkoxy, aryloxy, heteroaryloxy, amino, alkylamino, imine, nitrile, acetylide, carboxylate, optionally substituted aliphatic, optionally substituted heteroaliphatic, optionally substituted alicyclic, optionally substituted heteroalicyclic, optionally substituted aryl, optionally substituted heteroaryl, optionally substituted alkylaryl, or optionally substituted alkylheteroaryl; or
wherein two or more of $R^{L1}$ and $R^{L2}$ can be taken together to form a saturated, partially saturated or unsaturated 3 to 12 membered optionally substituted ring system, optionally containing one or more heteroatoms.

* * * * *

UNITED STATES PATENT AND TRADEMARK OFFICE
CERTIFICATE OF CORRECTION

PATENT NO. : 10,696,797 B2
APPLICATION NO. : 16/019246
DATED : June 30, 2020
INVENTOR(S) : Charlotte Katherine Williams et al.

It is certified that error appears in the above-identified patent and that said Letters Patent is hereby corrected as shown below:

In the Claims

In Claim 7, at Column 59, Lines 25-40, should read:

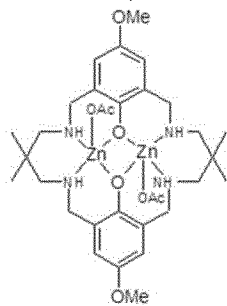

In Claim 7, at Column 60, Lines 26-44, should read:

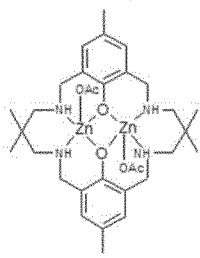

Signed and Sealed this
Third Day of November, 2020

Andrei Iancu
*Director of the United States Patent and Trademark Office*

CERTIFICATE OF CORRECTION (continued)
U.S. Pat. No. 10,696,797 B2

In Claim 7, at Column 60, Lines 49-65, should read:

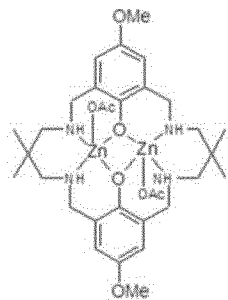

In Claim 7, at Column 61, Lines 1-23, should read:

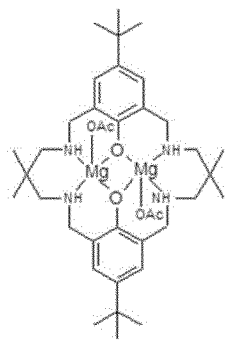

In Claim 7, at Column 63, Line 33, the text:
"[L₁Zn₂(pentafluorobenzoate)₂],"
Should be replaced with the formula:
--"[L¹Zn₂(pentafluorobenzoate)₂],--.